(12) United States Patent  
Fujimura et al.

(10) Patent No.: US 11,038,355 B2  
(45) Date of Patent: Jun. 15, 2021

(54) POWER TRANSMISSION SYSTEM PREVENTING POWER TRANSMISSION EFFICIENCY FROM DEGRADING DUE TO DELAY, AND CAPABLE OF REDUCING EFFECTS OF HIGH FREQUENCY NOISE

(71) Applicant: PANASONIC INTELLECTUAL PROPERTY MANAGEMENT CO., LTD., Osaka (JP)

(72) Inventors: Motohiko Fujimura, Osaka (JP); Masahiro Yamaoka, Osaka (JP); Atsushi Yamamoto, Kyoto (JP); Taiki Nishimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 16/490,498

(22) PCT Filed: Feb. 26, 2018

(86) PCT No.: PCT/JP2018/007007  
§ 371 (c)(1),  
(2) Date: Aug. 30, 2019

(87) PCT Pub. No.: WO2018/159547  
PCT Pub. Date: Sep. 7, 2018

(65) Prior Publication Data  
US 2020/0014215 A1    Jan. 9, 2020

(30) Foreign Application Priority Data

Mar. 3, 2017 (JP) .............................. JP2017-040797

(51) Int. Cl.  
*H02J 3/00* (2006.01)  
*H02J 4/00* (2006.01)  
(Continued)

(52) U.S. Cl.  
CPC ............... *H02J 4/00* (2013.01); *H02M 3/155* (2013.01); *H02M 5/293* (2013.01)

(58) Field of Classification Search  
CPC ........................................................ H02J 4/00  
(Continued)

(56) References Cited

U.S. PATENT DOCUMENTS

2003/0095424 A1   5/2003   Oates  
2012/0173035 A1   7/2012   Abe  
(Continued)

FOREIGN PATENT DOCUMENTS

JP     2003-009543 A    1/2003  
JP     2003-087159 A    3/2003  
(Continued)

OTHER PUBLICATIONS

International Search Report and Written Opinion dated Mar. 27, 2018, issued in International Patent Application No. PCT/JP2018/007007; with partial English translation.

(Continued)

*Primary Examiner* — Rexford N Barnie  
*Assistant Examiner* — Dru Parries  
(74) *Attorney, Agent, or Firm* — McDermott Will & Emery LLP

(57) ABSTRACT

A code modulator comprises: a first filter circuit connected between a pair of input ports, a second filter circuit connected between a pair of output ports, and a third filter circuit connected in parallel to each of switch circuits. A code demodulator comprises: a fourth filter circuit connected between a pair of input ports, a fifth filter circuit connected between a pair of output ports, and a sixth filter circuit connected in parallel to each of switch circuits.

16 Claims, 59 Drawing Sheets

(51) Int. Cl.
  *H02M 3/155* (2006.01)
  *H02M 5/293* (2006.01)
(58) Field of Classification Search
  USPC .......................................................... 307/31
  See application file for complete search history.

(56) References Cited

U.S. PATENT DOCUMENTS

| | | |
|---|---|---|
| 2012/0185708 A1 | 7/2012 | Rekimoto et al. |
| 2013/0226484 A1 | 8/2013 | Rouvala et al. |

FOREIGN PATENT DOCUMENTS

| | | | |
|---|---|---|---|
| JP | 2003-528562 A | 9/2003 |
| JP | 2011-091954 A | 5/2011 |
| JP | 5612718 B2 | 10/2014 |
| JP | 5612920 B2 | 10/2014 |

OTHER PUBLICATIONS

English translation of the International Preliminary Report on Patentability issued in International Application No. PCT/JP2018/007007, dated Sep. 12, 2019.

Fig.12A

THIRD IMPLEMENTATION EXAMPLE (AC→AC)

MODULATION CODE OF CODE MODULATOR 2A m1: c1a 0
m2: c1b 0
m3: 0 c1a
m4: 0 c1b

DEMODULATION CODE OF CODE DEMODULATOR 4A d1: c1a 0
d2: c1b 0
d3: 0 c1a
d4: 0 c1b $$\begin{cases} c1a = [1\ 0\ 1\ 1\ 1\ 0\ 0] \\ c1b = [0\ 1\ 0\ 0\ 0\ 1\ 1] \\ m1 = [\underbrace{1\ 0\ 1\ 1\ 1\ 0\ 0}_{c1a}\ \underbrace{0\ 0\ 0\ 0\ 0\ 0\ 0}_{0}] \end{cases}$$

Fig.12B

FOURTH IMPLEMENTATION EXAMPLE (DC→DC)

MODULATION CODE OF CODE MODULATOR 2A m1: c1a c1b
m2: c1b c1a
m3: 0 0
m4: 0 0

DEMODULATION CODE OF CODE DEMODULATOR 4A d1: c1a c1b
d2: c1b c1a
d3: 0 0
d4: 0 0

$$\begin{cases} c1a = [1\ 0\ 1\ 1\ 1\ 0\ 0] \\ c1b = [0\ 1\ 0\ 0\ 0\ 1\ 1] \\ m1 = [\underbrace{1\ 0\ 1\ 1\ 1\ 0\ 0}_{c1a}\ \underbrace{0\ 1\ 0\ 0\ 0\ 1\ 1}_{c1b}] \end{cases}$$

TIME →

TIME →

TIME →

POWER TRANSMISSION SYSTEM PREVENTING POWER TRANSMISSION EFFICIENCY FROM DEGRADING DUE TO DELAY, AND CAPABLE OF REDUCING EFFECTS OF HIGH FREQUENCY NOISE

CROSS-REFERENCE OF RELATED APPLICATIONS

This application is the U.S. National Phase under 35 U.S.C. § 371 of International Patent Application No. PCT/JP2018/007007, filed on Feb. 26, 2018, which in turn claims the benefit of Japanese Application No. 2017-040797, filed on Mar. 3, 2017, the entire disclosures of which Applications are incorporated by reference herein.

TECHNICAL FIELD

The present disclosure relates to a power transmitter apparatus which transmits power (electric power) via a transmission path, a power receiver apparatus which receives power via a transmission path, and a power transmission system including the power transmitter apparatus and the power receiver apparatus.

BACKGROUND ART

In recent years, power supplies of renewable energy, typically photovoltaic power generation, wind power generation, and biofuel power generation, are increasingly used, as well as conventional power supplies provided by power companies, such as thermal power generation, hydropower generation, and nuclear power generation. In addition, apart from large-scale commercial power networks currently provided, local and small-scale power networks capable of achieving local production and local consumption of power have been being spread worldwide in order to reduce losses of long-distance power transmission.

In a small-scale power network, power can be supplied self-sufficiently by using a natural energy power generator, and electric load equipment capable of efficient power regeneration. This type of power network is highly promising as a power transmission system for supplying electricity to non-electrified areas, such as desert oasis and remote islands.

For example, each of Patent Documents 1 to 3 discloses a power transmission system which transmits power from a power supply to a load via a power line.

CITATION LIST

Patent Documents

PATENT DOCUMENT 1: Japanese Patent Publication No. JP 5612718 B

PATENT DOCUMENT 2: Japanese Patent Publication No. JP 5612920 B

PATENT DOCUMENT 3: Japanese Patent laid-open Publication No. JP 2011-091954 A

SUMMARY OF INVENTION

Technical Problem

In order to transmit power from a power supply to a load via a power line, a power transmission system includes: a power transmitter apparatus which transmits power supplied from the power supply via a transmission path; and a power receiver apparatus which receives the power via the transmission path and supplies the power to the load. When transmitting power from the power transmitter apparatus to the power receiver apparatus in the power transmission system thus configured, it may be required to surely synchronize between the power transmitter apparatus and the power receiver apparatus with each other. If a delay occurs between the power transmitter apparatus and the power receiver apparatus for some reason, then power transmission efficiency may degrade.

An object of the present disclosure is to solve the aforementioned problems, and to provide a power transmitter apparatus capable of preventing power transmission efficiency from degrading due to a delay between the power transmitter apparatus and a power receiver apparatus.

Solution to Problem

According an aspect of the present disclosure, a power transmitter apparatus transmits power to at least one power receiver apparatus via a transmission path. The power transmitter apparatus is provided with: a code modulation circuit connected to a power supply via a first reactor and supplied with source power from the power supply, the code modulation circuit modulating the source power to generate a code-modulated wave by code modulation using a modulation code based on a code sequence, and transmitting the code-modulated wave to the power receiver apparatus via the transmission path; and a control circuit that controls the code modulation circuit. The code modulation circuit is provided with: first and second ports connected to the power supply via the first reactor, third and fourth ports connected to the transmission path, a first switch circuit connected between the first and third ports, a second switch circuit connected between the second and third ports, a third switch circuit connected between the first and fourth ports, and a fourth switch circuit connected between the second and fourth ports, The control circuit sets a first state to the code modulation circuit, the first state defined in which the first and fourth switch circuits are turned on, and the second and third switch circuits are turned off. The control circuit sets a second state to the code modulation circuit, the second state defined in which the first and fourth switch circuits are turned off, and the second and third switch circuits are turned on. The control circuit sets a third state to the code modulation circuit during transition from the first state to the second state, and during transition from the second state to the first state, the third state defined in which all the first to fourth switch circuits are turned on. The power transmitter apparatus is further provided with at least one of: a first filter circuit connected between the first and second ports, a second filter circuit connected between the third and fourth ports, and a third filter circuit connected in parallel to each of the first to fourth switch circuits.

These generic and specific aspects may be implemented as a system, as a method, or as any combination of systems and methods.

Advantageous Effects of Invention

According to the power transmitter apparatus of one aspect of the present disclosure, it is possible to prevent power transmission efficiency from degrading due to a delay between the power transmitter apparatus and a power receiver apparatus.

BRIEF DESCRIPTION OF DRAWINGS

FIG. 12A is a diagram showing an example of a modulation code of the code modulator 2A and a demodulation code of the code demodulator 4A in the power transmission system according to the second embodiment, as a third implementation example in which alternating-current power is transmitted and received.

FIG. 12B is a diagram showing an example of a modulation code of the code modulator 2A and a demodulation code of the code demodulator 4A in the power transmission system according to the second embodiment, as a fourth implementation example in which direct-current power is transmitted and received.

DESCRIPTION OF EMBODIMENTS

Findings Underlying Present Disclosure

Figure 1:
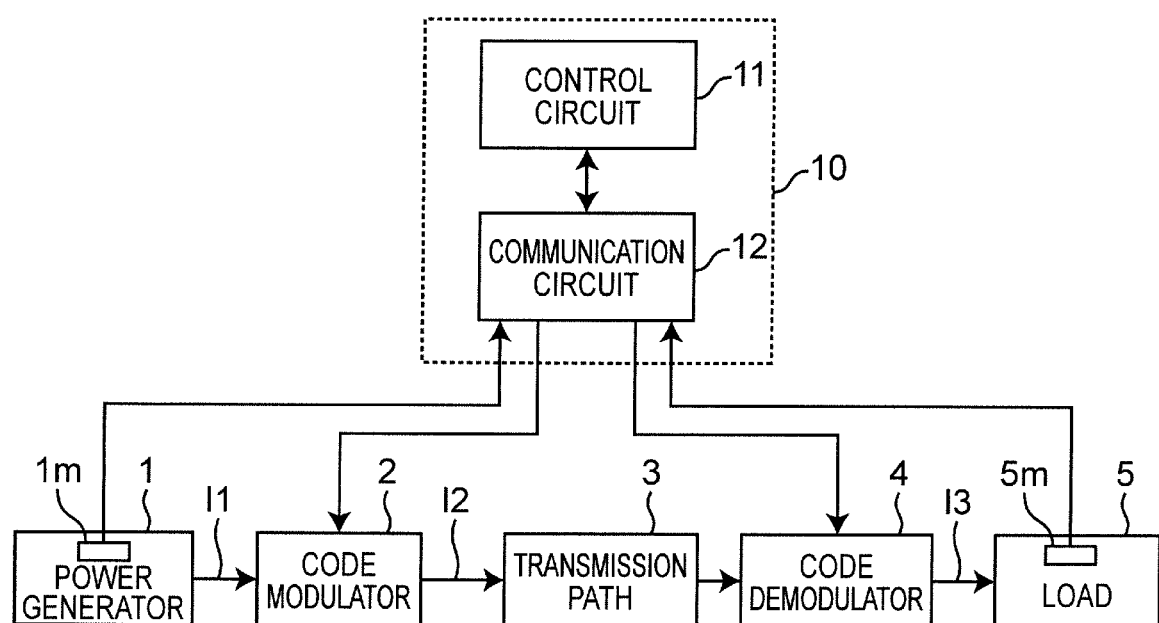
FIG. 1 is a block diagram showing a configuration of a power transmission system according to a first embodiment.

Patent Document 1 discloses an interconnection apparatus for power transmitter apparatuses, the interconnection apparatus being capable of transmitting and receiving power among a plurality of power systems. According to Patent Document 1, the interconnection apparatus is provided with a converter and an inverter. For power transmission, the converter converts transmitting power from alternating current to direct current, and the converted power is transmitted to the interconnection apparatus connected to a receiving power system. At the interconnection apparatus of the receiving power system, the inverter converts the power so as to have a desired frequency, thus providing power having an optimum frequency for the power system to which the interconnection apparatus is connected. Moreover, Patent Document 2 discloses a configuration further provided with a power storage apparatus, in addition to the components of Patent Document 1.

On the other hand, Patent Document 3 discloses a method of transmitting power from a plurality of power transmitter apparatuses to a plurality of power receiver apparatuses. According to Patent Document 3, power is transmitted from the plurality of power transmitter apparatuses to the plurality of power receiver apparatuses in a time division manner. According to Patent Document 3, control signals are wirelessly transmitted among the power transmitter apparatuses and the power receiver apparatuses in order to transmit and receive power.

However, according to Patent Documents 1 and 2, the interconnection apparatus is provided with the inverter and converter, and basically, individual power transmission cables are required for all combinations of the power systems transmitting and receiving power. According to Patent Documents 1 and 2, the interconnection apparatus may be configured so as to reduce the number of power transmission cables, however, in any case, a large number of power transmission cables are required. Thus, installation costs and the cables' material costs increase. In addition, the interconnection apparatus should be provided with the same number of pairs of the inverter and the converter as the number of the power systems to be connected. Accordingly, the cables' costs may increase, and costs may further increase due to the increased size of the interconnection apparatus.

In addition, according to Patent Document 3, it is possible to transmit and receive power among the plurality of power transmitter apparatuses and the plurality of power receiver apparatuses in a time division manner, and advantageously, it is possible to reduce the number of power transmission cables. However, in case of time-division power transmission, it is not possible to transmit and receive power among the plurality of power systems, simultaneously. In other words, it may not be possible to immediately handle a power demand from a load connected to a power receiver. Furthermore, when transmitting and receiving power among a large number of pairs of the power transmitter apparatuses and the power receiver apparatuses, only a short time is allocated for one pair of the power transmitter apparatus and the power receiver apparatus to transmit and receive power, and therefore, large pulse power is transmitted via the power transmission cable. Accordingly, the transmission cable with a high power durability is required, and thus, it may increase costs. In addition, since time intervals in which power can not be received occur, it may be required to provide the power receiver apparatuses with a buffer for large power. Furthermore, in order to transmit and receive power in a time division manner, time-synchronization is required among the plurality of power transmitter apparatuses and the plurality of power receiver apparatuses. In order to achieve such synchronization, very accurate controls among the apparatuses are required, and thus, it may increase the entire system costs.

As described above, according to both Patent Documents 1 and 2, a large number of power transmission cables are used, and therefore, it is not possible to reduce the power transmission cables by multiplexed power transmission. Further, the interconnection apparatus requires a pair of inverter and converter for each of the power transmission cables, and therefore, it is not possible to reduce the size of the interconnection apparatus. Accordingly, it is difficult to transmit and receive power among a large number of power systems. On the other hand, according to Patent Document 3, power is transmitted and received among the plurality of power transmitter apparatuses and the plurality of power receiver apparatuses via the power transmission cables in a time division manner, thus reducing the number of the power transmission cables. However, it is not possible to provide a transmission system capable of transmitting and receiving power among the plurality of power systems, simultaneously. Accordingly, there is a demand for a power transmission system with a reduced number of power transmission cables, and capable of transmitting and receiving power from a plurality of power transmitter apparatuses to a plurality of power receiver apparatuses, simultaneously, and more reliably, while reducing sizes and thicknesses of the power transmitter apparatuses and the power receiver apparatuses.

Further, as described above, when transmitting power from a power transmitter apparatus to a power receiver apparatus in a power transmission system, it may be required to surely synchronize the power transmitter apparatus and the power receiver apparatus. If a delay occurs between the power transmitter apparatus and the power receiver apparatus for some reason, then power transmission efficiency may degrade.

Based on the above consideration, the inventors provide the following aspects of the invention.

Hereinafter, embodiments according to the present disclosure will be described with reference to the drawings. In the following embodiments, similar constituent elements are denoted by identical reference numerals.

An object of the present disclosure is to provide a power transmitter apparatus, a power receiver apparatus, and a power transmission system capable of preventing power transmission efficiency from degrading due to a delay between the power transmitter apparatus and the power receiver apparatus. In first to third embodiments, we describe preparatory overviews of power transmission systems. Thereafter, in fourth to eighth embodiments, we describe power transmission systems which solves the problems.

First Embodiment

FIG. 1 is a block diagram showing a configuration of a power transmission system according to the first embodiment. Referring to FIG. 1, the power transmission system according to the first embodiment is provide with a power generator 1, a code modulator 2, a transmission path 3, a code demodulator 4, a load 5, and a controller 10. The transmission path 3 is, for example, a wired transmission path including two power lines, or a wireless transmission path.

The controller 10 is provided with a control circuit 11 and a communication circuit 12. The control circuit 11 communicates with the code modulator 2 and the code demodulator 4 via the communication circuit 12, and controls operations of the code modulator 2 and the code demodulator 4.

In the power transmission system of FIG. 1, the code modulator 2 operates as a power transmitter apparatus, and the code demodulator 4 operates as a power receiver apparatus. The code modulator 2 modulates first power to generate a code-modulated wave by code modulation using a modulation code based on a code sequence, and transmits the code-modulated wave to the code demodulator 4 via the transmission path 3. The code demodulator 4 receives the code-modulated wave from the code modulator 2 via the transmission path 3, and demodulates the received code-modulated wave to generate second power by code demodulation using a demodulation code based on a code sequence identical to the code sequence of the modulation code used for the code modulation. The first power is, for example, direct-current power generated by the power generator 1, and is shown as a generated current I1 in FIG. 1. The code-modulated wave is alternating-current power modulated by code modulation, and is shown as a modulated current I2 in FIG. 1. The second power is, for example, direct-current power to be supplied to the load 5, and is shown as a demodulated current I3 in FIG. 1.

The power transmission system of FIG. 1 is further provided with power meters 1m and 5m. The power meter 1m is first power measuring means which measures an amount of the first power. More specifically, the power meter 1m measures an amount of direct-current power generated by the power generator 1 and transmitted from the power generator 1 to the code modulator 2. The power meter 1m may be provided to the power generator 1, or disposed between the power generator 1 and the code modulator 2. The power meter 5m is second power measuring means for measuring an amount of the second power. More specifically, the power meter 5m measures an amount of direct-current power transmitted from the code demodulator 4 to the load 5, and used by the load 5. The power meter 5m may be provided to the load 5, or may be disposed between the code demodulator 4 and the load 5. The amounts of powers measured by the power meters 1m and 5m are transmitted to the controller 10.

The controller 10 controls operations of the code modulator 2 and the code demodulator 4 based on the amounts of powers received from the power meters 1m and 5m. For example, the controller 10 transmits control signals to the code modulator 2 and the code demodulator 4, the control signals including synchronization signals for synchronizing the code modulator 2 and the code demodulator 4 to each other, thus achieving code modulation and code demodulation of power in an accurately synchronized manner.

The controller 10 sets a modulation code to the code modulator 2, and a demodulation code to the code demodulator 4, based on one code sequence. The code sequence of the modulation code used for modulation by the code modulator 2, and the code sequence of the demodulation code used for demodulation by the code demodulator 4 may be set in advance to the code modulator 2 and the code demodulator 4. In addition, for example, the controller 10 may transmit, as the control signals, the code sequence of the modulation code used for modulation by the code modulator 2, and the code sequence of the demodulation code used for demodulation by the code demodulator 4. Further, the controller 10 may transmit, as the control signals, only information specifying the code sequences, without transmitting the code sequences themselves, so that the code modulator 2 and the code demodulator 4 to generates the code sequences, respectively. In this case, it is possible to achieve code modulation and code demodulation between the code modulator 2 and the code demodulator 4 corresponding to each other in an accurately synchronized manner.

Figure 2:
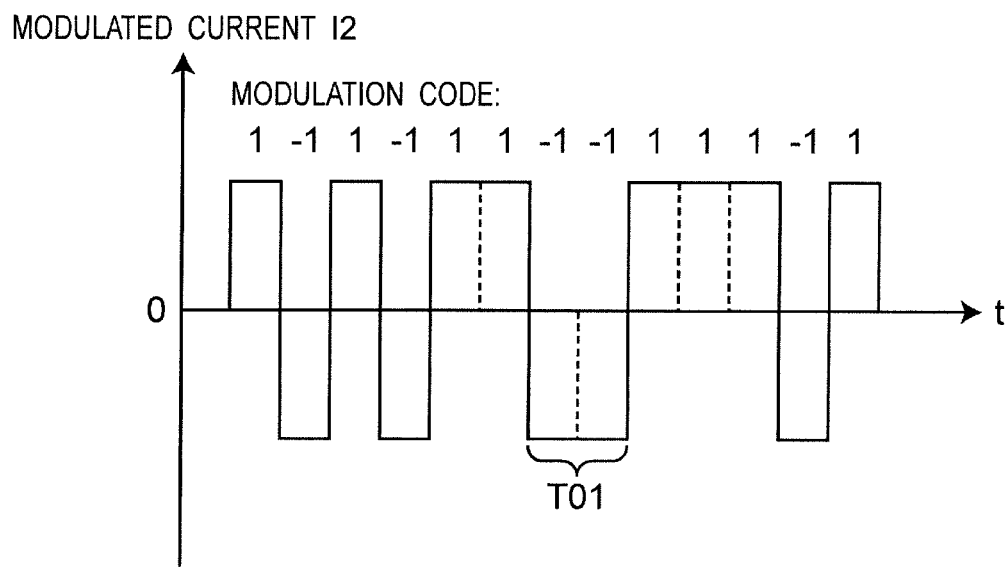
FIG. 2 is a waveform in diagram showing an exemplary signal waveform of a modulated current I2 of the power transmission system of FIG. 1.

FIG. 2 is a waveform diagram showing an exemplary signal waveform of the modulated current I2 of the power transmission system of FIG. 1. In addition, FIG. 3 is a waveform diagram showing an exemplary signal waveform of a modulated current I2 of a communication system according to a comparison example.

The code modulator 2 of FIG. 1 modulates a current of power, which is generated by the power generator 1, by code modulation using a modulation code based on a predetermined code sequence. In this case, the code modulator 2 generates an alternating-current code-modulated wave made of currents flowing in directions corresponding to code values of "1" and "−1.", respectively, as shown in FIG. 2. This code-modulated wave can transmit power in both periods of positive current flows, and periods of negative current flows (e.g., period T01 of FIG. 2). While the first embodiment indicates an example in which direct-current power is modulated by code modulation, alternating-current power may be modulated by code modulation as in a second embodiment described below.

Figure 3:
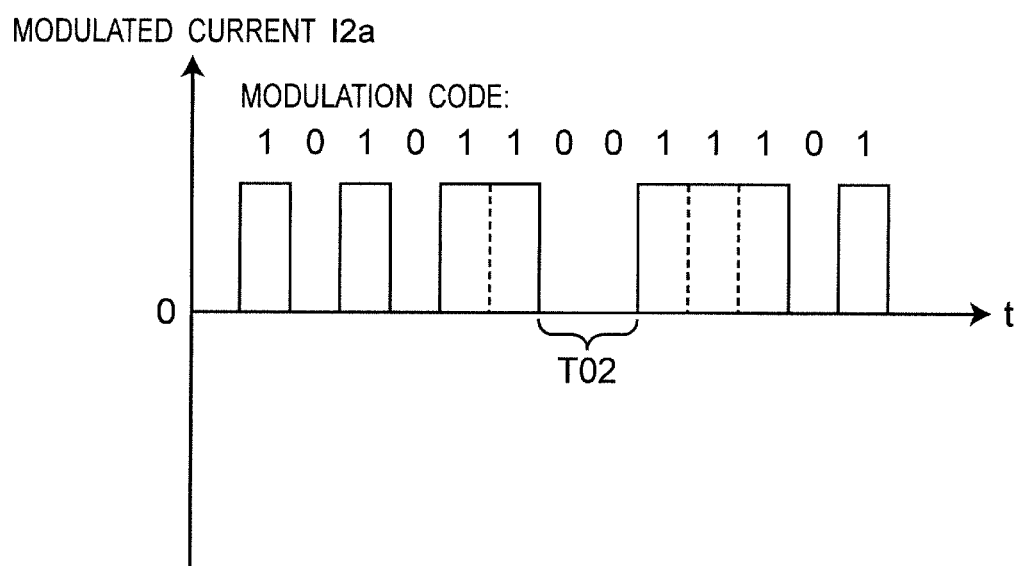
FIG. 3 is a waveform diagram showing an exemplary signal waveform of a modulated current I2 of a communication system according to a comparison example.

In the data transmission system according to the comparison example, e.g., to be used for communication, code values of "1" and "0" are typically used for code modulation, as shown in FIG. 3. However, according to the code-modulated wave as shown in FIG. 3, when the code value of the modulation code is "0" (e.g., period T02 of FIG. 3), a modulated current or voltage becomes zero, that is, a period of no power transmission occurs. Such periods of no power transmission may reduce overall power transmission efficiency. More specifically, for the case of communication, since information such as data should be transmitted in an accurately synchronized manner, it is only required that the code demodulator accurately distinguish between "0" and "1". On the other hand, for the case of power transmission, a power loss due to the period of no power transmission is not permissible from a viewpoint of efficiency in use of energy. Accordingly, by using an alternating-current code-modulated wave flowing in directions corresponding to the code values of "1" and "−1", respectively, as shown in FIG. 2, it is possible to transmit power with higher transmission efficiency than that of the comparison example.

Figure 4:
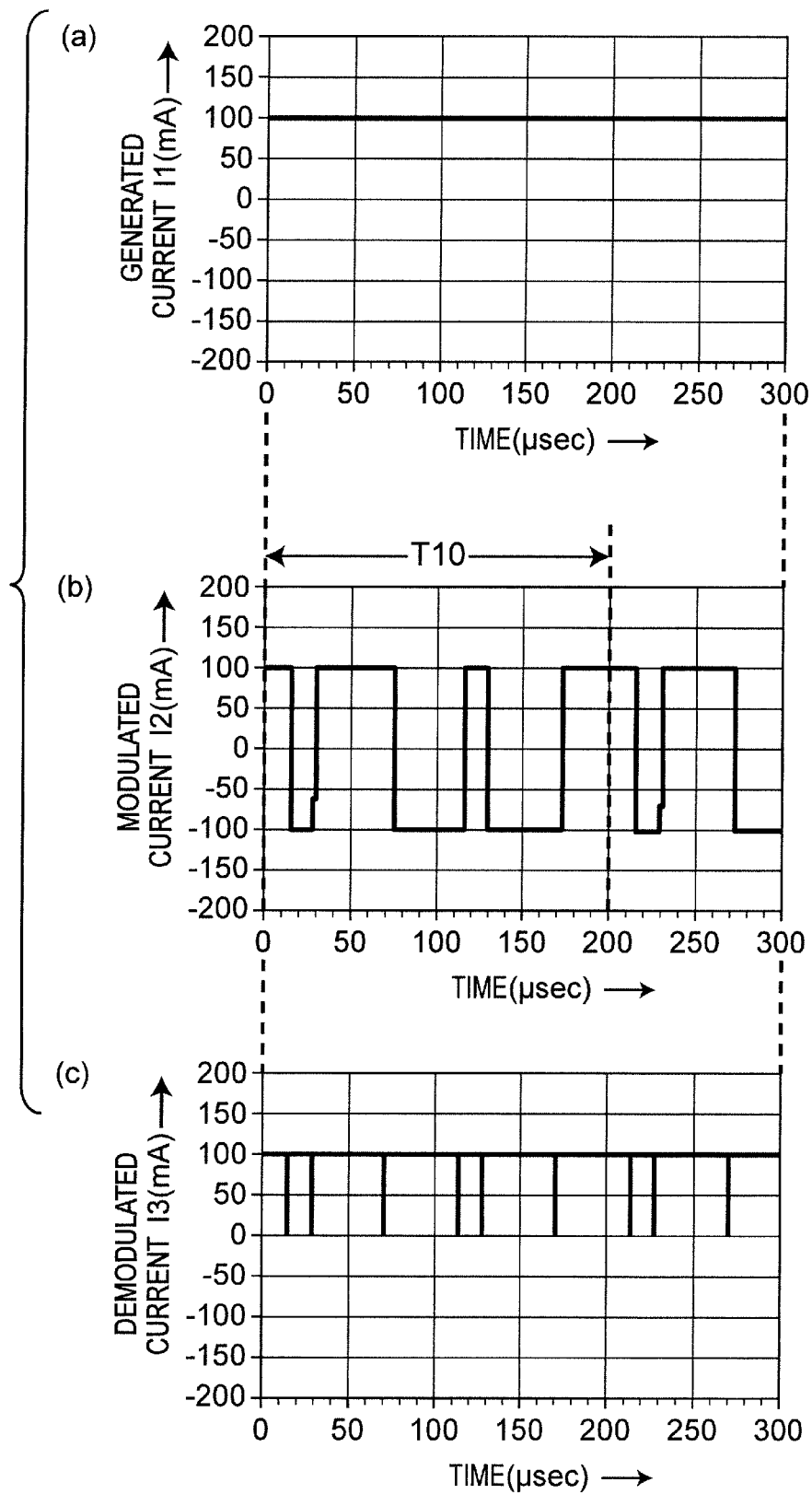
FIG. 4 is a waveform diagram showing exemplary signal waveforms in the power transmission system of FIG. 1, in which: (a) shows a signal waveform of a generated current I1; (b) shows a signal waveform of a modulated current I2; and (c) shows a signal waveform of a demodulated current I3.

FIG. 4 is a waveform diagram, where (a) to (c) show exemplary signal waveforms in the power transmission system of FIG. 1. In FIG. 4, (a) shows a signal waveform of the generated current I1, (b) shows a signal waveform of the modulated current I2, and (c) shows a signal waveform of the demodulated current I3. The power generator 1 generates the direct-current generated current I1. The code modulator 2 multiplies the generated current I1 by a modulation code m0 to generate the alternating-current modulated current I2. The code demodulator 4 multiplies the modulated current I2 by a demodulation code d0 identical to the modulation code m0 to reproduce the direct-current power generated by the power generator 1, and supply the reproduced direct-current power to the load 5.

Referring to FIG. 4, T10 indicates a period of one cycle of the modulation code m0 and the demodulation code d0. The same also applies to subsequent drawings.

According to the exemplary signal waveform of FIG. 4, the direct-current generated current I1 (FIG. 4(a)) is multiplied by the modulation code m0 having a frequency of 35 kHz, to generate the modulated current I2 (FIG. 4(b)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". The code value "1" of the modulation code m0 indicates that the code modulator 2 outputs a current in the same direction as the direction of an inputted current, and the code value "−1" of the modulation code m0 indicates that the code modulator 2 outputs a current in the direction opposite to the direction of the inputted current. Similarly, the code value "1" of the demodulation code d0 indicates that the code demodulator 4 outputs a current in the same direction as the direction of an inputted current, and the code value "−1" of the demodulation code d0 indicates that the code demodulator 4 outputs a current in the direction opposite to the direction of the inputted current.

For example, the modulation code m0 and the demodulation code d0 are given as follows.

$$m0=[1\ -1\ 1\ 1\ 1\ -1\ -1\ -1\ 1\ -1\ -1\ -1\ 1\ 1] \quad (1)$$

$$d0=m0=[1\ -1\ 1\ 1\ 1\ -1\ -1\ -1\ 1\ -1\ -1\ -1\ 1\ 1] \quad (2)$$

Subsequently, the modulated current I2 of the code-modulated wave generated by the modulation code m0 is multiplied by the demodulation code d0. This multiplication is denoted as follows.

$$m0 \times d0 = [1\ 1\ 1\ 1\ 1\ 1\ 1\ 1\ 1\ 1\ 1\ 1\ 1\ 1] \quad (3)$$

As apparent from Mathematical Expression (3), the demodulated current I3 (FIG. 4(c)) is obtained, which is direct current similarly to the original generated current I1.

As described above, it is possible to achieve direct-current power transmission in an accurately synchronized manner, without power loss, by using the code modulator 2 and the code demodulator 4 according to the present embodiment. In addition, it is possible to achieve efficient power transmission for a longer period, for example, by repeatedly using the modulation code m0 and demodulation code d0 as described above.

Further, the modulation code m0 can be divided into its first half code portion m0a, and its second half code portion m0b, as follows.

$$m0a=[1\ -1\ 1\ 1\ 1\ -1\ -1] \quad (4)$$

$$m0b=[-1\ 1\ -1\ -1\ -1\ 1\ 1] \quad (5)$$

In this case, the code portion m0b is generated by inverting the sign of the code value of each bit of the code portion m0a. More specifically, when the code value of a certain bit of the code portion m0a is "1", the code value of a corresponding bit of the code portion m0b is "−1". Similarly, when the code value of a certain bit of the code portion m0a is "−1.", the code value of a corresponding bit of the code portion m0b is "1".

Figure 5:
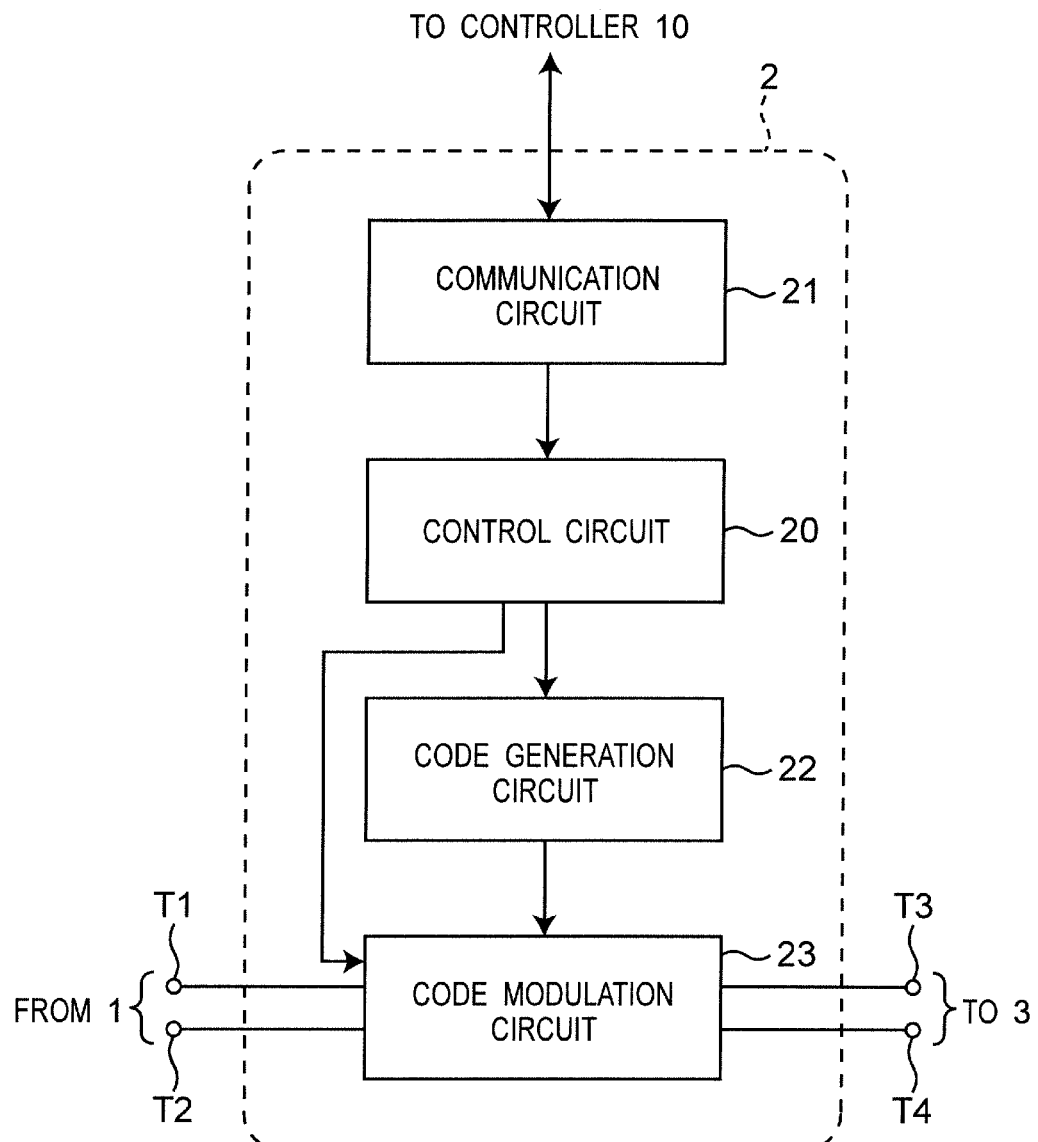
FIG. 5 is a block diagram showing a configuration of a code modulator 2 of FIG. 1.

FIG. 5 is a block diagram showing a configuration of the code modulator 2 of FIG. 1. Referring to FIG. 5, the code modulator 2 is provided with a control circuit 20, a communication circuit 21, a code generation circuit 22, and a code modulation circuit 23. The communication circuit 21 receives a synchronization signal and a control signal from the controller 10, the control signal including a code sequence itself or information specifying the code sequence, and outputs the received signals to the control circuit 20. In this case, the synchronization signal may be, for example, trigger signals to start and end modulation, or time information indicating a start time and an end time of modulation. Based on the control signal, the control circuit 20 controls the code generation circuit 22 so as to generate a modulation code based on a code sequence and output the modulation code to the code modulation circuit 23, and controls start and end of operation of the code modulation circuit 23. The code modulation circuit 23 has input ports T1 and T2 (first and second ports) connected to the power generator 1, and output ports T3 and T4 (third and fourth ports) connected to the transmission path 3.

Figure 6:
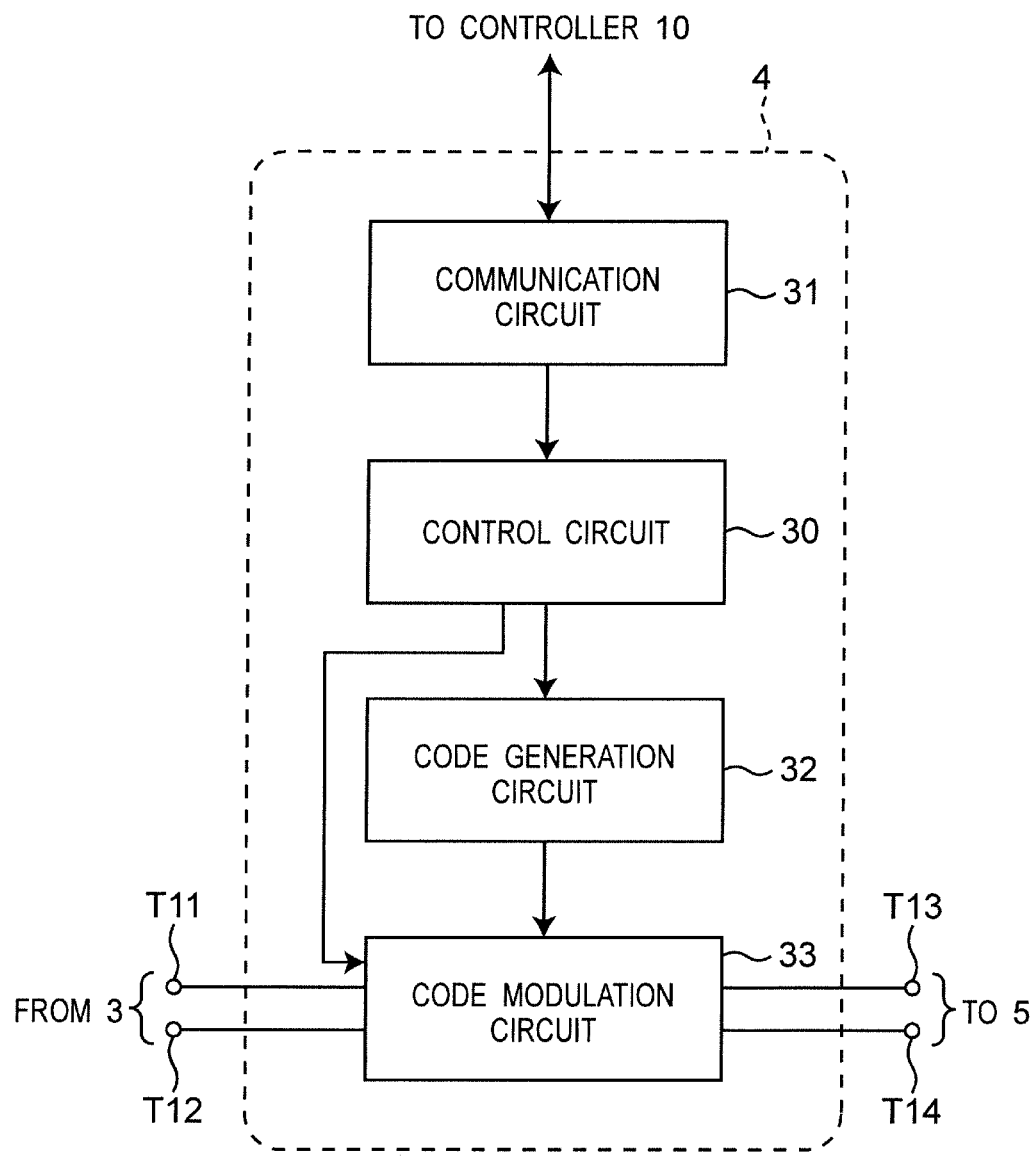
FIG. 6 is a block diagram showing a configuration of a code demodulator 4 of FIG. 1.

FIG. 6 is a block diagram showing a configuration of the code demodulator 4 of FIG. 1. Referring to FIG. 6, The code demodulator 4 is provided with a control circuit 30, a communication circuit 31, a code generation circuit 32, and a code demodulation circuit 33. The communication circuit 31 receives a synchronization signal and a control signal from the controller 10, the control signal including a code sequence itself or information specifying the code sequence, and outputs the received signals to the control circuit 30. In this case, the synchronization signal may be, for example, trigger signals to start and end demodulation, or time information indicating a start time and an end time of demodulation. Based on the control signal, the control circuit 30 controls the code generation circuit 32 so as to generate a demodulation code based on a code sequence and output the demodulation code to the code demodulation circuit 33, and controls start and end of operation of the code demodulation circuit 33. The code demodulation circuit 33 has input ports T11 and T12 (fifth and sixth ports) connected to the transmission path 3, and output ports T13 and T14 (seventh and eighth ports) connected to the load 5.

Note that in the power transmission system of FIG. 1, the control signals from the controller 10 to the code modulator 2 and the code demodulator 4 may be transmitted via control signal lines different from the transmission path 3, or may be transmitted via the transmission path 3 in a manner multiplexed with the code-modulated wave using some multiplexing scheme. In the latter case, it is possible to omit cables provided for communication from the controller 10 to the code modulator 2 and the code demodulator 4, and reduce cost.

Figure 7:
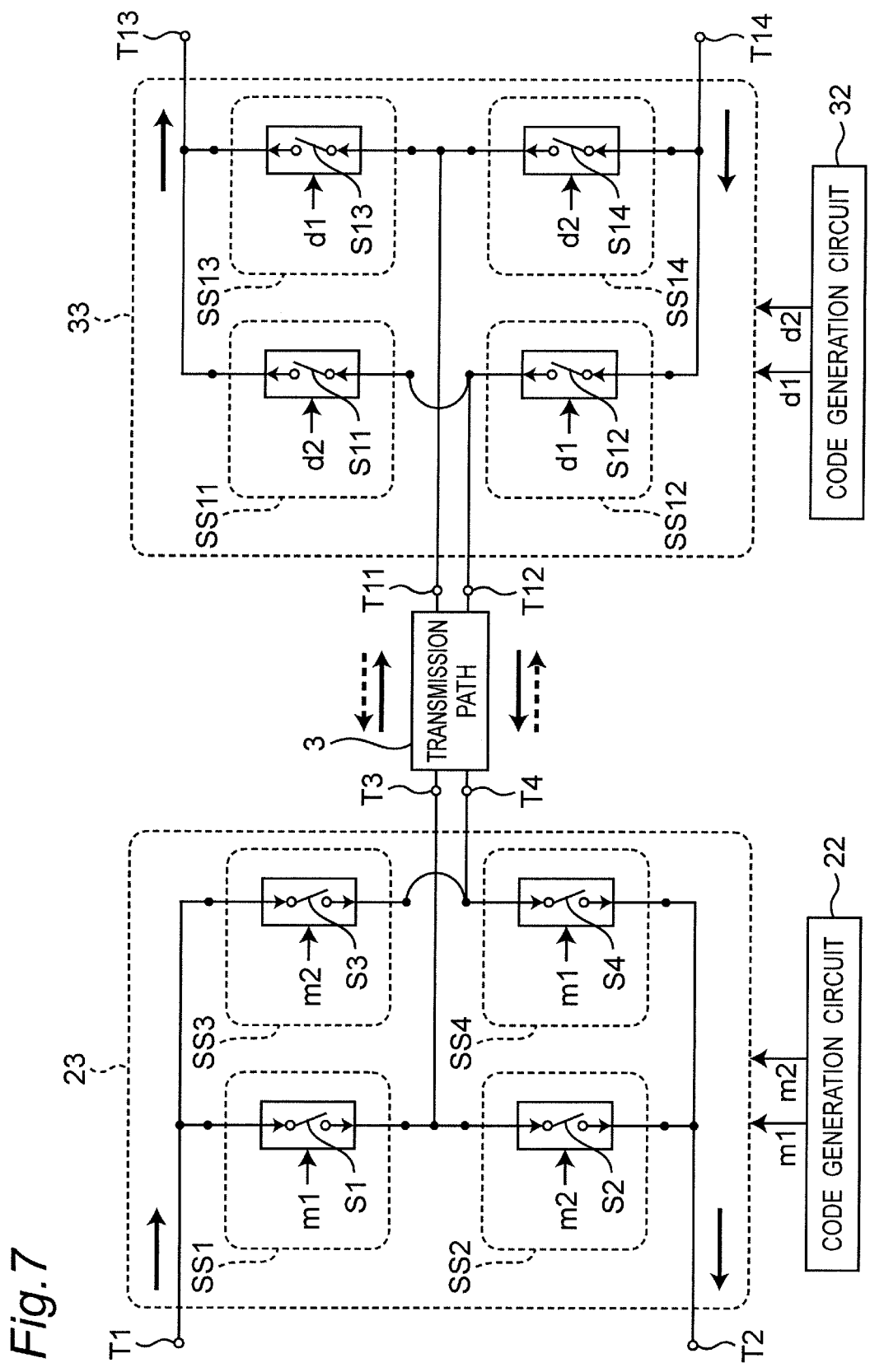
FIG. 7 is a block diagram showing configurations of a code modulation circuit 23 and a code demodulation circuit 33 of FIG. 1.

FIG. 7 is a block diagram showing configurations of the code modulation circuit 23 and the code demodulation circuit 33 of FIG. 1. Referring to FIG. 7, the code modulation circuit 23 is provided with first to fourth switch circuits SS1 to SS4 connected in a bridge configuration. The switch circuits SS1 to SS4 include unidirectional switch elements S1 to S4, respectively, each made of, for example, a metal-oxide-semiconductor (MOS) transistor. In addition, the code demodulation circuit 33 is provided with fifth to eighth switch circuits SS11 to SS14 connected in a bridge configuration. The switch circuits SS11 to SS14 include unidirectional switch elements S11 to S14, respectively, each made of, for example, an MOS transistor.

The code generation circuit 22 generates and outputs the modulation codes m1 and m2 to the code modulation circuit 23 under control of the control circuit 20, in order to operate the code modulator 2 according to the modulation code m0 as described above. The switch elements S1 and S4 of the code modulation circuit 23 are controlled according to the modulation code m1, and the switch elements S2 and S3 of the code modulation circuit 23 are controlled according to the modulation code m2. Each of the modulation codes m1 and m2 has code values "1" and "0". For example, when a signal of the code value "1" is inputted to each of the switch elements S1 to S4, each of the switch elements S1 to S4 is turned on. When a signal of the code value "0" is inputted to each of the switch elements S1 to S4, each of the switch elements S1 to S4 is turned off. Note that switch elements other than the switch elements S1 to S4 described in the present specification operate in a similar manner. In this case, the switch elements S1 to S4 have directionality as follows. When the switch element S1 is turned on, the switch element S1 outputs a generated current inputted from the port T1, to the port T3. When the switch element S3 is turned on, the switch element S3 outputs a generated current inputted from the port T1, to the port T4. When the switch element S2 is turned on, the switch element S2 outputs a modulated current inputted from the port T3, to the port T2. When the switch element S4 is turned on, the switch element S4 outputs a modulated current inputted from the port T4, to the port T2.

The code generation circuit 32 generates and outputs the demodulation codes d1 and d2 to the code demodulation circuit 33 under control of the control circuit 30, in order to operate the code demodulator 4 according to the demodulation code d0 as described above. The switch elements S11 and S14 of the code demodulation circuit 33 are controlled according to the demodulation code d2, and the switch elements S12 and S13 of the code demodulation circuit 33 are controlled according to the demodulation code d1. Each of the demodulation codes d1 and d2 has code values "1" and "0". In this case, the switch elements S11 to S14 have directionality as described below. When the switch element S11 is turned on, the switch element S11 outputs a modulated current inputted from the port T12, to the port T13. When the switch element S13 is turned on, the switch element S13 outputs a modulated current inputted from the port T11, to the port T13. When the switch element S12 is turned on, the switch element S12 outputs a demodulated current inputted from the port T14, to the port T12. When the switch element S14 is turned on, the switch element S14 outputs a demodulated current inputted from the port T14, to the port T11.

In the notation of FIG. 7, directions of current flows in the switch elements S11 to S14 of the code demodulator 4 are opposite to directions of current flows in the switch elements S1 to S4 of the code modulator 2.

Figure 8A:
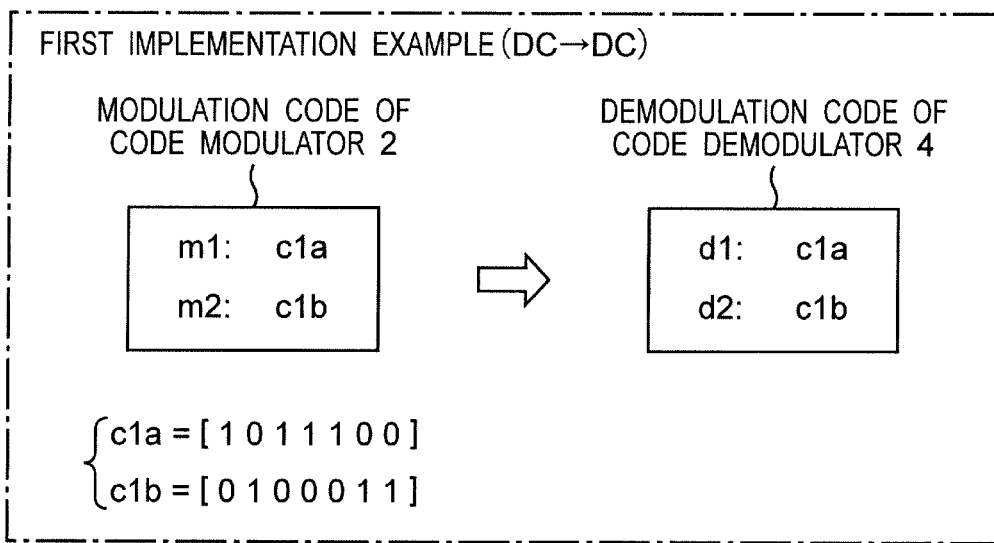
FIG. 8A is a diagram showing an example of a modulation code of the code modulator 2 and a demodulation code of the code demodulator 4 in the power transmission system of FIG. 1, as a first implementation example in which direct-current power is transmitted and received.

FIG. 8A is a diagram showing an example of a modulation code of the code modulator 2 and a demodulation code of the code demodulator 4 in the power transmission system of FIG. 1, as a first implementation example in which direct-current power is transmitted and received. More specifically, FIG. 8A shows an example of the modulation codes m1 and m2 inputted to the switch elements S1 to S4 of the code modulator 2, and the demodulation codes d1 and d2 inputted to the switch elements S11 to S14 of the code demodulator 4.

As shown in FIG. 8A, the modulation code m1 and the demodulation code d1 are identical to each other, and each is made of a code sequence c1$a$. In addition, the modulation code m2 and the demodulation code d2 are identical to each other, and each is made of a code sequence c1$b$. In addition, the code sequences c1$a$ and c1$b$ are configured such that when the code value of a certain bit of the code sequence c1$a$ is "1", the code value of a corresponding bit of the code sequence c1$b$ is "0"; and when the code value of a certain bit of the code sequence c1$a$ is "0", the code value of a corresponding bit of the code sequence c1$b$ is "1".

Accordingly, among the switch elements S1 to S4 and S11 to S14 of FIG. 7, when a switch element receiving the code value of a certain bit of the code sequence c1$a$ is turned on, the switch element receiving the code value of a corresponding bit of the code sequence c1$b$ is turned off. In addition, when the switch element receiving the code value of a certain bit of the code sequence c1$a$ is turned off, the switch element receiving the code value of a corresponding bit of the code sequence c1$b$ is turned on.

According to the code modulation circuit 23 of FIG. 7, when the switch elements S1 and S4 are turned on, the switch elements S2 and S3 are turned off; and when the switch elements S1 and S4 are turned off, the switch elements S2 and S3 are turned on. Thus, when the switch elements S1 and S4 are turned on, and the switch elements S2 and S3 are turned off, the modulated current I2 flows in the transmission path 3 in a positive direction, i.e., in a direction of solid arrows. On the other hand, when the switch elements S1 and S4 are turned off, and the switch elements S2 and S3 are turned on, the modulated current I2 flows in the transmission path 3 in a negative direction, i.e., in a direction of dotted arrows. Accordingly, as shown in FIG. 4, when the direct-current generated current I1 is inputted to the code modulator 2, the alternating-current modulated current I2 can be transmitted to the transmission path 3.

In the code demodulation circuit 33 of FIG. 7, the switch elements S11 to S14 are turned on or off in response to the demodulation codes d1 and d2 in synchronization with the code modulation circuit 23. In this case, the switch elements S12 and S13 are turned on or off in accordance with the demodulation code d1 identical to the modulation code m1, and the switch elements S11 and S14 are turned on or off in accordance with the demodulation code d2 identical to the modulation code m2. Thus, when the code value of the modulation code m1 is "1", and the code value of the modulation code m2 is "0", i.e., when the modulated current I2 flows in the transmission path 3 in the positive direction, the code value of the demodulation code d1 is "1", and the code value of the demodulation code d2 is "0". Accordingly, by turning on the switch elements S13 and S12 and turning off the switch elements S11 and S14, the demodulated current I3 flows at the output ports T13 and T14 of the code demodulation circuit 33 in the positive direction, i.e., in the direction of the solid arrows. On the other hand, when the code value of the modulation code m1 is "0", and the code value of the modulation code m2 is "1", i.e., when the modulated current I2 flows in the transmission path 3 in the negative direction, the code value of the demodulation code d1 is "0", and the code value of the demodulation code d2 is "1". Accordingly, by turning on the switch elements S11 and S14 and turning off the switch elements S12 and S13, the demodulated current I3 again flows at the output ports T13 and T14 of the code demodulation circuit 33 in the positive direction, i.e., in the direction of the solid arrows.

As described above, when using the modulation codes m1 and m2 and the demodulation codes d1 and d2 of FIG. 8A, equivalently, the code modulator 2 operates according to the modulation code m0 of Mathematical Expression (1), and the code demodulator 4 operates according to the demodulation code d0 of Mathematical Expression (2).

As described above, according to FIGS. 7 and 8A, when the direct-current generated current I1 is inputted to the code modulator 2, it is possible to extract the demodulated current I3 from the code demodulator 4, the demodulated current I3 being also a direct current similarly to the generated current I1 inputted to the code modulator 2. Therefore, according to the first embodiment, it is possible to modulate the direct-current generated current I1 by code modulation into the alternating-current modulated current I2, and then, transmit the modulated current I2 via the transmission path 3, and then, demodulate the modulated current I2 into the direct-current demodulated current I3.

Figure 8B:
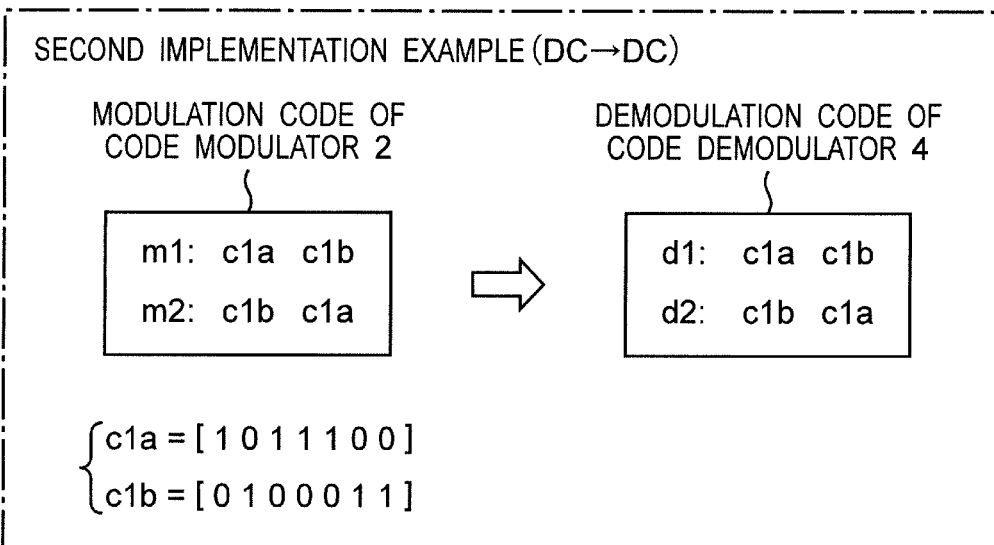
FIG. 8B is a diagram showing an example of a modulation code of the code modulator 2 and a demodulation code of the code demodulator 4 in the power transmission system of FIG. 1, as a second implementation example in which direct-current power is transmitted and received.

FIG. 8B is a diagram showing an example of a modulation code of the code modulator 2 and a demodulation code of the code demodulator 4 in the power transmission system of FIG. 1, as a second implementation example in which direct-current power is transmitted and received. When in each of the code sequences c1a and c1b, the number of bits of the code value "1" is equal to the number of bits of the code value "0", the modulated current I2 being modulated by code modulation and flowing in the transmission path 3 includes, in average, no direct-current component, but includes only an alternating-current component. However, in some code sequence, the number of bits of the code value "1" is different from the number of bits of the code value "0", and thus, a direct-current component occurs. When using such a code sequence, by concatenating the code sequence with a code sequence of bits having code values inverted from those of corresponding bits, respectively, it is possible to generate a modulation code and a demodulation code, in each of which the number of bits of the code value "1" is equal to the number of bits of the code value "0".

According to the example of FIG. 8B, each of the modulation code m1 and the demodulation code d1 is a code sequence [c1a c1b] which is a concatenation of the code sequence c1a and the code sequence c1b, and each of the modulation code m2 and the demodulation code d2 is a code sequence [c1b c1a] which is a concatenation of the code sequence c1b and the code sequence c1a. As a result, the average value of the code-modulated current I2 flowing in the transmission path 3 becomes zero, and the modulated current I2 includes only an alternating-current component.

Note that the power generator 1 or the load 5 may be a power storage apparatus, such as a battery and a capacitor. When a power storage apparatus is incorporated in the power transmission system according to the present embodiment, it is possible to effectively utilize power generated during hours of low or no power consumption, and thus, improve overall power efficiency.

Second Embodiment

In the first embodiment, we have described the power transmission system which modulates and transmits a direct-current generated current by code modulation. Meanwhile, in a second embodiment, we describe a power transmission system which modulates and transmits an alternating-current generated current by code modulation.

The power transmission system according to the second embodiment includes a code modulator 2A and a code demodulator 4A, which will be described below with reference to FIGS. 10 and 11, in place of the code modulator 2 and the code demodulator 4 of FIG. 1. The other portions of the power transmission system according to the second embodiment are configured in a manner similar to that of the power transmission system according to the first embodiment.

Figure 9:
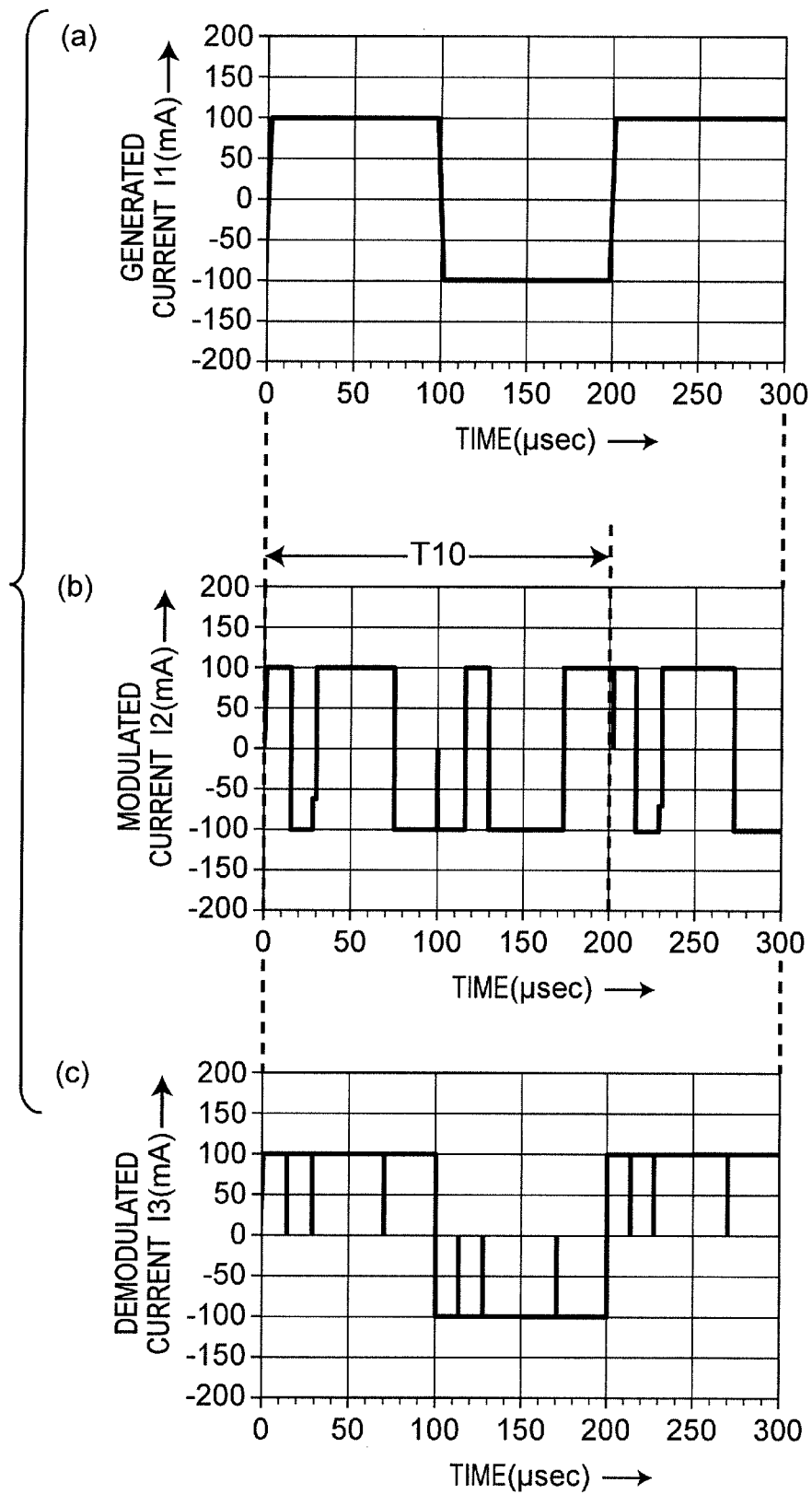
FIG. 9 is a waveform diagram showing exemplary signal waveforms in the power transmission system according to a second embodiment, in which: (a) shows a signal waveform of a generated current I1; (b) shows a signal waveform of a modulated current I2; and (c) shows a signal waveform of a demodulated current I3.

FIG. 9 is a waveform diagram, where (a) to (c) show exemplary signal waveforms in the power transmission system according to the second embodiment. In FIG. 9, (a) shows a signal waveform of a generated current I1; (b) shows a signal waveform of a modulated current I2; and (c) shows a signal waveform of a demodulated current I3. More specifically, FIG. 9 shows exemplary signal waveforms generated as follows: the code modulator 2A modulates the (single-phase) alternating-current generated current I1 by code modulation, and then, the modulated current I2 is transmitted via a transmission path 3, and then, the code demodulator 4A demodulates the modulated current I2 by code demodulation.

The power generator 1 generates the alternating-current generated current I1. For example, the alternating-current generated current I1 has a rectangular waveform at a frequency of 5 kHz, which cyclically repeats positive and negative periods every 200 microseconds. Also in this case, the code modulator 2A multiplies the generated current I1 by a modulation code m0 to generate the alternating modulated current I2, in a manner similar to the code modulation of the direct-current generated current I1 as shown in FIG. 4. The code demodulator 4A multiplies the modulated current I2 by a demodulation code d0 identical to the modulation code m0 to reproduce the alternating-current power generated by the power generator 1, and supply the reproduced alternating-current power to a load 5.

The frequency of the modulation code m0 and the demodulation code d0 is set to frequencies higher than the frequency of the generated current I1 and the frequency of the demodulated current I3. According to the exemplary signal waveform of FIG. 9, the alternating-current generated current I1 (FIG. 9(a)) is multiplied by the modulation code m0 having a frequency of 35 kHz to generate the modulated current I2 (FIG. 9(b)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". In case of transmission of the alternating-current generated current I1, the meaning of the code value "1" or "−1" in a period when the generated current I1 is positive (period from 0 to 100 microsecond in FIG. 9(a)) is different from that of a period when the generated current I1 is negative (period from 100 to 200 microsecond in FIG. 9(a)). In the period when the generated current I1 is positive, the code value "1" of the modulation code m0 indicates that the code modulator 2A outputs a current in the same direction as the direction of an inputted current, and the code value "−1" of the modulation code m0 indicates that the code modulator 2A outputs a current in the direction opposite to the direction of an inputted current. Similarly, in the period when the generated current I1 is positive, the code value "1" of the demodulation code d0 indicates that the code demodulator 4A outputs a current in the same direction as the direction of an inputted current, and the code value "−1" of the demodulation code d0 indicates that the code demodulator 4A outputs a current in the direction opposite to the direction of an inputted current. In the period when the generated current I1 is negative, the code value "1" of the modulation code m0 indicates that the code modulator 2A outputs a current in the direction opposite to the direction of an inputted current, and the code value "−1" of the modulation code m0 indicates that the code modulator 2A outputs a current in the same direction as the direction of an inputted current. Similarly, in the period when the generated current I1 is negative, the code value "1" of the demodulation code d0 indicates that the code demodulator 4A outputs a current in the direction opposite to the direction of an inputted current, and the code value "−1" of the demodulation code d0 indicates that the code demodulator 4A outputs a current in the same direction as the direction of an inputted current.

For example, the modulation code m0 and the demodulation code d0 are given as follows.

$$m0=[1\ -1\ 1\ 1\ 1\ -1\ -1\ -1\ 1\ -1\ -1\ -1\ 1\ 1\ 1] \quad (6)$$

$$d0=m0=[1\ -1\ 1\ 1\ 1\ -1\ -1\ -1\ 1\ -1\ -1\ -1\ 1\ 1\ 1] \quad (7)$$

Similarly to the code demodulation according to the first embodiment, the modulated current I2 of the code-modulated wave generated by the modulation code m0 is multiplied by the demodulation code d0. This multiplication is denoted as follows.

$$m0 \times d0=[1\ 1\ 1\ 1\ 1\ 1\ 1\ 1\ 1\ 1\ 1\ 1\ 1\ 1] \quad (8)$$

As apparent from Mathematical Expression (8), the demodulated current I3 (FIG. 8(c)) is obtained, which is an alternating current similarly to the original generated current I1.

As described above, it is possible to achieve power transmission in an accurately synchronized manner, without power loss, by using the method of code modulation and code demodulation according to the present embodiment. In addition, it is possible to achieve efficient power transmission for a longer period, for example, by repeatedly using the modulation code m0 and demodulation code d0 as described above.

Figure 10:
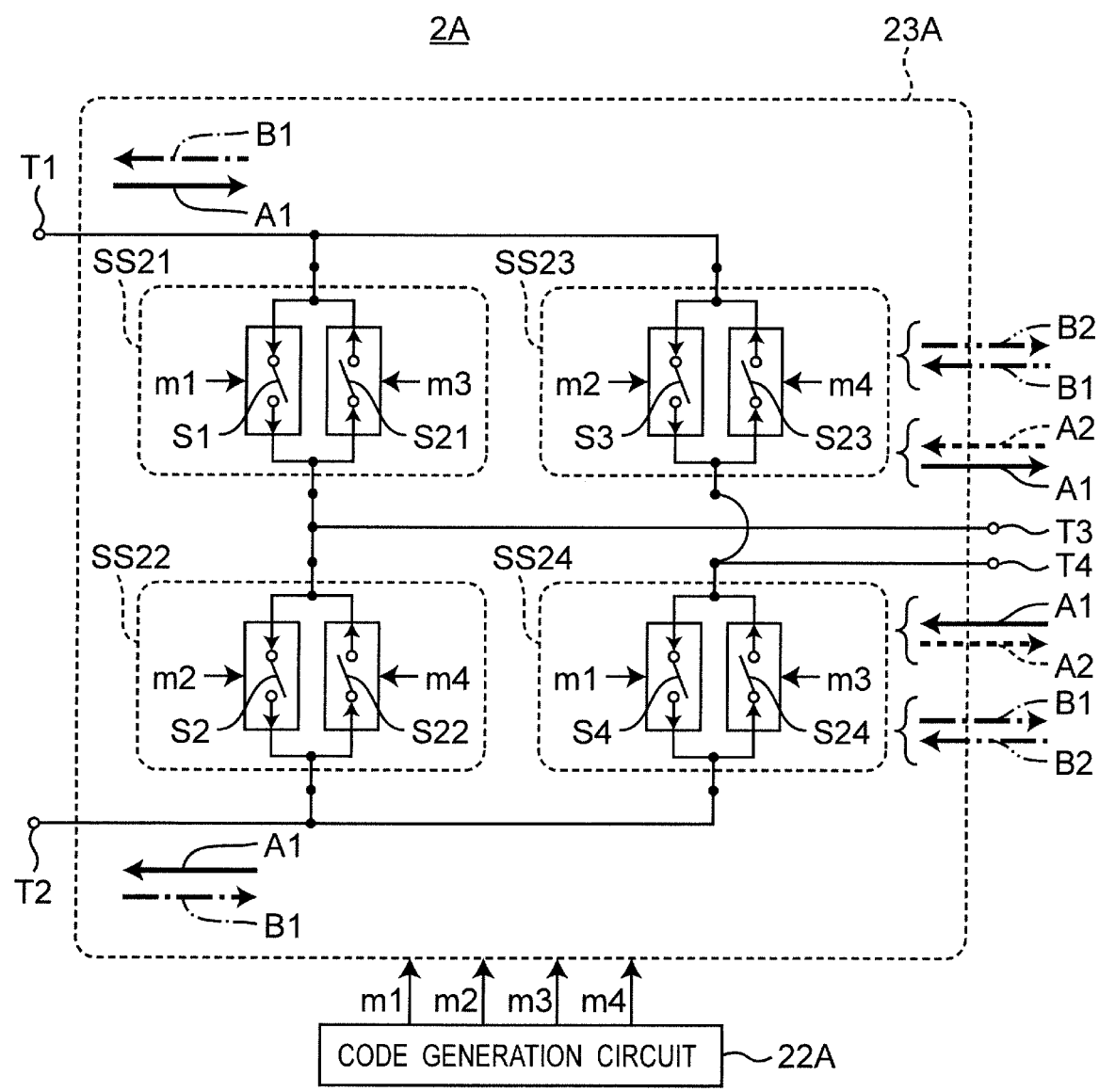
FIG. 10 is a block diagram showing a partial configuration of a code modulator 2A of the power transmission system according to the second embodiment.

FIG. 10 is a block diagram showing a partial configuration of the code modulator 2A of the power transmission system according to the second embodiment. The code modulator 2A of FIG. 10 is provided with a code generation circuit 22A and a code modulation circuit 23A, in place of the code generation circuit 22 and the code modulation circuit 23 of FIG. 5. The code modulator 2A of FIG. 10 is further provided with a control circuit 20 and a communication circuit 21 similarly to the code modulator 2 of FIG. 5, which are omitted in FIG. 10 for ease of illustration.

The code generation circuit 22A and the code modulation circuit 23A of FIG. 10 are different from the code generation circuit 22 and the code modulation circuit 23 of FIG. 7 in following points.

(1) The code generation circuit 22A generates four modulation codes m1 to m4 in place of the two modulation codes m1 and m2, and outputs the generated modulation codes m1 to m4 to the code modulation circuit 23A.

(2) The code modulation circuit 23A is provided with first to fourth bidirectional switch circuits SS21 to SS24 connected in a bridge configuration, in place of the unidirectional switch circuits SS1 to SS4.

The code generation circuit 22A generates and outputs the modulation codes m1 to m4 to the code modulation circuit 23A under control of the control circuit 20, in order to operate the code modulator 2A according to the modulation code m0 as described above. Each of the modulation codes m1 to m4 has code values "1" and "0".

In the code modulation circuit 23A, the switch circuit SS21 is provided with the switch element S1 of FIG. 7 to be turned on and off in response to the modulation code m1, and further provided with a switch element S21 having directionality opposite to that of the switch element S1, connected in parallel to the switch element S1, and to be turned on and off in response to the modulation code m3. The switch circuit SS22 is provided with the switch element S2 of FIG. 7 to be turned on and off in response to the modulation code m2, and further provided with a switch element S22 having directionality opposite to that of the switch element S2, connected in parallel to the switch element S2, and to be turned on and off in response to the modulation code m4. The switch circuit SS23 is provided with the switch element S3 of FIG. 7 to be turned on and off in response to the modulation code m2, and further provided with a switch element S23 having directionality opposite to that of the switch element S3, connected in parallel to the switch element S3, and to be turned on and off in response to the modulation code m4. The switch circuit SS24 is provided with the switch element S4 of FIG. 7 to be turned on and off in response to the modulation code m1, and further provided with a switch element S24 having directionality opposite to that of the switch element S4, connected in parallel to the switch element S4, and to be turned on and off in response to the modulation code m3. Each of the switch elements S21 to S24 is made of, for example, an MOS transistor. The code modulation circuit 23A has ports T1 and T2 (first and second ports) connected to a power generator 1, and ports T3 and T4 (third and fourth ports) connected to the transmission path 3. Alternating-current power is inputted from the power generator 1 to the code modulation circuit 23A. The code modulation circuit 23A modulates the alternating-current power by code modulation, and then, outputs a code-modulated wave to the transmission path 3.

Figure 11:
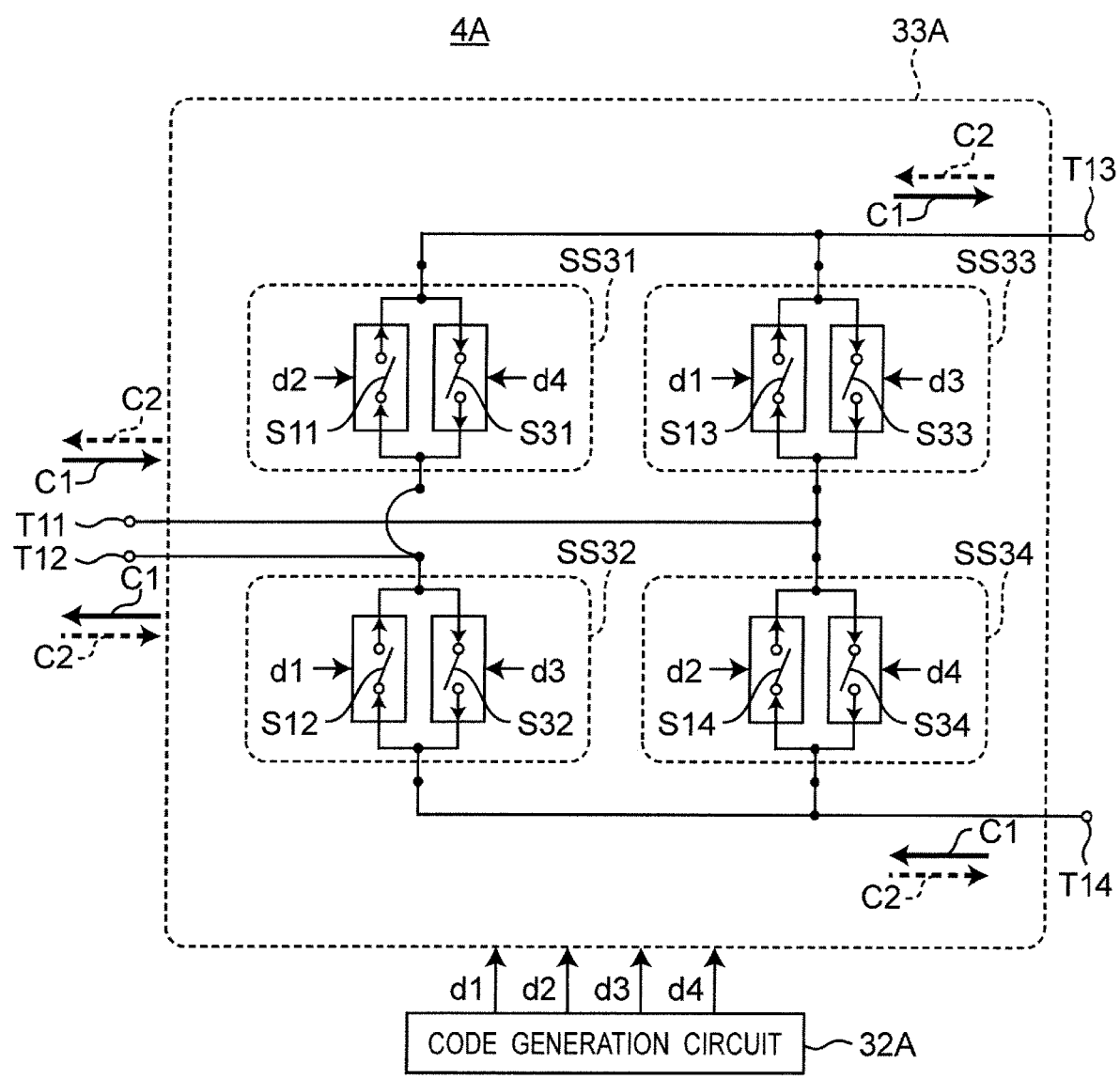
FIG. 11 is a block diagram showing a partial configuration of a code demodulator 4A of the power transmission system according to the second embodiment.

FIG. 11 is a block diagram showing a partial configuration of the code demodulator 4A of the power transmission system according to the second embodiment. The code demodulator 4A of FIG. 11 is provided with a code generation circuit 32A and a code demodulation circuit 33A, in place of the code generation circuit 32 and the code demodulation circuit 33 of FIG. 6. The code demodulator 4A of FIG. 11 is further provided with a control circuit 30 and a communication circuit 31 similarly to the code demodulator 4 of FIG. 5, which are omitted in FIG. 11 for ease of illustration.

The code generation circuit 32A and the code demodulation circuit 33A of FIG. 11 are different from the code generation circuit 32 and the code demodulation circuit 33 of FIG. 7 in following points.

(1) The code generation circuit 32A generates four demodulation codes d1 to d4 in place of the two modulation codes d1 and d2, and outputs the generated demodulation codes d1 to d4 to the code demodulation circuit 33A.

(2) The code demodulation circuit 33A is provided with fifth to eighth bidirectional switch circuits SS31 to SS34 connected in a bridge configuration, in place of the unidirectional switch circuits SS11 to SS14.

The code generation circuit 32A generates and outputs the demodulation codes d1 to d4 to the code demodulation circuit 33A under control of the control circuit 30, in order to operate the code demodulator 4A according to the demodulation code d0 as described above. Each of the demodulation codes d1 and d4 has code values "1" and "0".

In the code demodulation circuit 33A, the switch circuit SS31 is provided with the switch element S11 of FIG. 7 to be turned on and off in response to the demodulation code d2, and further provided with a switch element S31 having directionality opposite to that of the switch element S11, connected in parallel to the switch element S11, and to be turned on and off in response to the demodulation code d4. The switch circuit SS32 is provided with the switch element S12 of FIG. 7 to be turned on and off in response to the demodulation code d1, and further provided with a switch element S32 having directionality opposite to that of the switch element S12, connected in parallel to the switch element S12, and to be turned on and off in response to the demodulation code d3. The switch circuit SS33 is provided with the switch element S13 of FIG. 7 to be turned on and off in response to the demodulation code d1, and further provided with a switch element S33 having directionality opposite to that of the switch element S13, connected in parallel to the switch element S13, and to be turned on and off in response to the demodulation code d3. The switch circuit SS34 is provided with the switch element S14 of FIG. 7 to be turned on and off in response to the demodulation code d2, and further provided with a switch element S34 having directionality opposite to that of the switch element S14, connected in parallel to the switch element S14, and to be turned on and off in response to the demodulation code d4. Each of the switch elements S31 to S34 is made of, for example, an MOS transistor. The code demodulation circuit 33A has ports T11 and T12 (fifth and sixth ports) connected to the transmission path 3, and ports T13 and T14 (seventh and eighth ports) connected to the load 5. An alternating-current code-modulated wave is inputted from the transmission path 3 to the code demodulation circuit 33A. The code demodulation circuit 33A demodulates the code-modulated wave by code demodulation into alternating-current demodulated power, and then outputs the demodulated power to the load 5.

FIG. 12A is a diagram showing an example of a modulation code of the code modulator 2A and a demodulation code of the code demodulator 4A in the power transmission system according to the second embodiment, as a third implementation example in which alternating-current power is transmitted and received. More specifically, FIG. 12A shows an example of the modulation codes m1 to m4 inputted to the bidirectional switch circuits SS21 to SS24 of the code modulation circuit 23A, and the demodulation codes d1 to d4 inputted to the bidirectional switch circuits SS31 to SS34 of the code demodulation circuit 33A.

As shown in FIG. 12A, the modulation code m1 and the demodulation code d1 are identical to each other, and the modulation code m2 and the demodulation code d2 are identical to each other. Similarly, the modulation code m3 and the demodulation code d3 are identical to each other, and the modulation code m4 and the demodulation code d4 are identical to each other. In addition, similarly to the case of direct-current power transmission, code sequences c1$a$ and c1$b$ are configured such that when the code value of a certain bit of the code sequence c1$a$ is "1", the code value of a corresponding bit of the code sequence c1$b$ is "0"; and when the code value of a certain bit of the code sequence c1$a$ is "0", the code value of a corresponding bit of the code sequence c1$b$ is "1".

FIG. 12A shows a case in which the duration of the code sequence c1$a$ and the code sequence c1$b$ is set to be equal to a half of the cycle of the alternating-current generated current I1. In a period when the alternating-current generated current I1 flows in the positive direction (in example of FIG. 12A, first half period of each cycle), the modulation codes m1 and m2 are the code sequences c1$a$ and c1$b$, respectively, and on the other hand, all code values of the modulation codes m3 and m4 are "0". In a period when the alternating-current generated current I1 flows in the negative direction (in example of FIG. 12A, second half period of each cycle), all the code values of the modulation codes m1 and m2 are "0", and on the other hand, the modulation codes m3 and m4 are the code sequences c1$a$ and c1$b$, respectively. Each of the modulation codes m1 to m4 for one cycle is generated by concatenating bits for a first half of each cycle with bits for a second half of each cycle. Accordingly, in the first half of each cycle, the switch elements S1 to S4 are turned on and off according to the modulation codes m1 and m2, and on the other hand, the switch elements S21 to S24 are disconnected and no current flows. In addition, in the second half of each cycle, the switch elements S1 to S4 are disconnected and no current flows, and on the other hand, the switch elements S21 to S24 are turned on and off according to the modulation codes m3 and m4. Similarly to the modulation codes m1 to m4, each of the demodulation codes d1 to d4 for one cycle is generated by concatenating bits for the first half of each cycle with bits for the second half of each cycle.

Now, operation of the code modulation circuit 23A is described.

At first, operation is described for a case in which the generated current I1 flows at the input ports T1 and T2 in the positive direction, i.e., in a direction of solid arrows A1. In this case, when the switch elements S1 and S4 receiving the code value "1" of the modulation code m1 are turned on, the switch elements S2 and S3 receiving the code value "0" of the modulation code m2 are turned off. In addition, when the switch elements S1 and S4 receiving the code value "0" of the modulation code m1 are turned off, the switch elements S2 and S3 receiving the code value "1" of the modulation code m2 are turned on. Thus, when the switch elements S1 and S4 are turned on, and the switch elements S2 and S3 are turned off, the modulated current I2 flows in the transmission path 3 in a positive direction, i.e., in a direction of the solid arrows A1. On the other hand, when the switch elements S1 and S4 are turned off, and the switch elements S2 and S3 are turned on, the modulated current I2 flows in the transmission path 3 in a negative direction, i.e., in a direction of dotted arrows A2. Accordingly, when the current of positive period of the alternating-current generated current I1 is inputted to the code modulation circuit 23A, it is possible to transmit the alternating-current modulated current I2 to the transmission path 3, as shown in FIG. 9(b).

Next, operation is described for a case in which the generated current I1 flows at the input ports T1 and T2 in a negative direction, i.e., in a direction of chain arrows B1. In this case, when the switch elements S21 and S24 receiving the code value "1" of the modulation code m3 are turned on, the switch elements S22 and S23 receiving the code value "0" of the modulation code m4 are turned off. In addition, when the switch elements S21 and S24 receiving the code value "0" of the modulation code m3 are turned off, the switch elements S22 and S23 receiving the code value "1" of the modulation code m4 are turned on. Thus, when the switch elements S21 and S24 are turned on, and the switch elements S22 and S23 are turned off, the modulated current I2 flows in the transmission path 3 in a negative direction, i.e., in a direction of the chain arrows B1. On the other hand, when the switch elements S21 and S24 are turned off, and the switch elements S22 and S23 are turned on, the modulated current I2 flows in the transmission path 3 in a positive direction, i.e., in a direction of two-dot chain arrows B2. Accordingly, when the current of negative period of the alternating-current generated current I1 is inputted to the code modulation circuit 23A, it is possible to transmit the alternating-current modulated current I2 to the transmission path 3, as shown in FIG. 9(b).

As described with reference to FIG. 10, the code modulation circuit 23A can generate the alternating-current modulated current I2, as shown in FIG. 9(b), in both the positive and negative periods of the alternating-current generated current I1.

Next, operation of the code demodulation circuit 33A of FIG. 11 is described.

At first, we consider a case in which the generated current I1 flows at the input ports T1 and T2 of the code modulation circuit 23A in the positive direction, i.e., in the direction of the solid arrows A1. In this case, the alternating-current modulated current I2 flowing in the positive and negative directions is inputted to the input ports T11 and T12 of the code demodulation circuit 33A via the transmission path 3. When the code demodulation circuit 33A correctly performs demodulation operation, the demodulated current I3 flows at the output ports T13 and T14 of the code demodulation circuit 33A in a positive direction, i.e., in a direction of solid arrows C1. These operations are described below. In this case, all code values of the demodulation code d3 and the demodulation code d4 are "0", and all the switch elements S31 to S34 are turned off.

At first, operation of the code demodulation circuit 33A is described for a case in which the generated current I1 flows at the input ports T1 and T2 of the code modulation circuit 23A in the positive direction, and the modulated current I2 flows at the input ports T11 and T12 of the code demodulation circuit 33A in the positive direction, i.e., in the direction of the solid arrows C1. In this case, the code value of the code sequence c1a is "1", and the code value of the code sequence c1b is "0". Accordingly, the switch elements S12 and S13 receiving the code value "1" of the demodulation code d1 are turned on, and the switch elements S11 and S14 receiving the code value "0" of the demodulation code d2 are turned off. Therefore, the demodulated current I3 flows at the output ports T13 and T14 in the positive direction, i.e., in the direction of the solid arrows C1.

Next, operation of the code demodulation circuit 33A is described for a case in which the generated current I1 flows at the input ports T1 and T2 of the code modulation circuit 23A in the positive direction, and the modulated current I2 flows at the input ports T11 and T12 of the code demodulation circuit 33A in the negative direction, i.e., in the direction of dotted arrows C2. In this case, the code value of the code sequence c1a is "0", and the code value of the code sequence c1b is "1". Accordingly, the switch elements S12 and S13 receiving the code value "0" of the demodulation code d1 are turned off, and the switch elements S11 and S14 receiving the code value "1" of the demodulation code d2 are turned on. Therefore, the demodulated current I3 flows at the output ports T13 and T14 in the positive direction, i.e., in the direction of the solid arrows C1. Accordingly, when the current of positive period of the alternating-current generated current I1 is inputted to the code modulation circuit 23A, the code demodulation circuit 33A can output the demodulated current I3 which is correctly demodulated with positive polarity, to the load 5, as shown in FIG. 9(c).

Next, we consider a case in which the generated current I1 flows at the input ports T1 and T2 of the code modulation circuit 23A in the negative direction, i.e., in the direction of the chain arrows B1. Similarly to the above case, the alternating-current modulated current I2 flowing in the positive and negative directions is inputted to the input ports T11 and T12 of the code demodulation circuit 33A via the transmission path 3. When the code demodulation circuit 33A correctly performs demodulation operation, the demodulated current I3 flows at the output ports T13 and T14 of the code demodulation circuit 33A in the negative direction, i.e., in a direction of the dotted arrows C2. These operations are described below. In this case, all code values of the demodulation codes d1 and d2 are "0", and all the switch elements S11 to S14 are turned off.

At first, described is operation of the code demodulation circuit 33A for a case in which the generated current I1 flows at the input ports T1 and T2 of the code modulation circuit 23A in the negative direction, and the modulated current I2 flows at the input ports T11 and T12 of the code demodulation circuit 33A in the negative direction, i.e., in the direction of dotted arrows C2. In this case, the code value of the code sequence c1a is "1", and the code value of the code sequence c1b is "0". Accordingly, the switch elements S32 and S33 receiving the code value "1" of the demodulation code d3 are turned on, and the switch elements S31 and S34 receiving the code value "0" of the demodulation code d4 are turned off. Therefore, the demodulated current I3 flows at the output ports T13 and T14 in the negative direction, i.e., in the direction of the dotted arrows C2.

Next, operation of the code demodulation circuit 33A is described for a case in which the generated current I1 flows at the input ports T1 and T2 of the code modulation circuit 23A in the negative direction, and the modulated current I2 flows at the input ports T11 and T12 of the code demodulation circuit 33A in the positive direction, i.e., in the direction of the solid arrows C1. In this case, the code value of the code sequence c1a is "0", and the code value of the code sequence c1b is "1". Accordingly, the switch elements S32 and S33 receiving the code value "0" of the demodulation code d3 are turned off, and the switch elements S31 and S34 receiving the code value "1" of the demodulation code d4 are turned on. Therefore, the demodulated current I3 flows at the output ports T13 and T14 in the negative direction, i.e., in the direction of the dotted arrows C2. Accordingly, when the current of negative period of the alternating-current generated current I1 is inputted to the code modulation circuit 23A, the code demodulation circuit 33A can output the demodulated current I3 which is correctly demodulated with negative polarity, to the load 5, as shown in FIG. 9(c).

As described above, when using the modulation codes m1 to m4 and the demodulation codes d1 to d4 of FIG. 12A, equivalently, the code modulator 2A operates according to the modulation code m0 of Mathematical Expression (6), and the code demodulator 4A operates according to the demodulation code d0 of Mathematical Expression (7).

As described above, according to FIGS. 10, 11, and 12A, when the alternating-current generated current I1 is inputted to the code modulator 2A, it is possible to extract the demodulated current I3 from the code demodulator 4A, the demodulated current I3 being also an alternating current similarly to the generated current I1 inputted to the code modulator 2A. Therefore, according to the second embodiment, it is possible to modulate the alternating-current generated current I1 by code modulation into the alternating-current modulated current I2, and then, transmit the modulated current I2 via the transmission path 3, and then, demodulate the modulated current I2 into the alternating-current demodulated current I3.

FIG. 12B is a diagram showing an example of a modulation code of the code modulator 2A and a demodulation code of the code demodulator 4A in the power transmission system according to the second embodiment, as a fourth implementation example in which direct-current power is transmitted and received. In this case, in the code modulation circuit 23A of FIG. 10 and the code demodulation circuit 33A of FIG. 11, all code values of the modulation codes m3 and m4 and the demodulation codes d3 and d4 are set to "0" as shown in FIG. 12B, and thus, the switch elements S21 to S24 and S31 to S34 are turned off. Thus, the code modulation circuit 23A of FIG. 10 and the code demodulation circuit 33A of FIG. 11 operate as the code modulation circuit 23 and the code demodulation circuit 33 of FIG. 7, respectively. Accordingly, it is possible to achieve direct-current power transmission of FIG. 4 by generating the modulation codes m1 and m2 and the demodulation codes d1 and d2 from the code sequences c1a and c1b as shown in FIG. 12B. Thus, by changing the modulation codes m1 to m4 and the demodulation codes d1 to d4, it is possible to achieve a favorable power transmission system capable of supporting both direct-current power transmission and alternating-current power transmission using the code modulation circuit 23A of FIG. 10 and the code demodulation circuit 33A of FIG. 11.

The direct-current power generator 1 may be, for example, a photovoltaic power generator. The alternating-current power generator 1 may be, for example, a power generator provided with a turbine rotated by thermal power, hydraulic power, wind power, nuclear power, tidal power, or the like.

As described above, by using the modulation code and the demodulation code identical to each other, the power transmission system according to the second embodiment is capable of modulating and transmitting the direct-current generated current I1 and demodulating the modulated current into the direct-current demodulated current I3, and is also capable of modulating and transmitting the alternating-current generated current I1 and demodulating the modulated current into the alternating-current demodulated current I3. In addition, by using the demodulation code different from the modulation code, the power transmission system according to the second embodiment is capable of modulating and transmitting the direct-current generated current I1 and demodulating the modulated current into the alternating-current demodulated current I3, and is also capable of modulating and transmitting the alternating-current generated current I1 and demodulating the modulated current into the direct-current demodulated current I3.

Since the code modulation circuit 23A of FIG. 10 and the code demodulation circuit 33A of FIG. 11 are provided with the bidirectional switch circuits SS21 to SS24 and SS31 to SS34, these circuits are reversible. More specifically, the code modulation circuit 23A is also operable as a code demodulation circuit to demodulate a modulated current inputted from the ports T3 and T4 and output the demodulated current from the ports T1 and T2. The code demodulation circuit 33A is also operable as a code modulation circuit to modulate a generated current inputted from the ports T13 and T14 and output the modulated current from the ports T11 and T12. Thus, it is possible to transmit power from the code demodulator 4A provided with the code demodulation circuit 33A, to the code modulator 2A provided with the code modulation circuit 23A.

FIGS. 10 to 11 show the example in which each of the bidirectional switch circuits SS21 to SS34 is made of a pair of switch elements connected in parallel such that currents flow in opposite directions (S1, S21; S2, S22; S3, S23; S4, S24; S11, S31; S12, S32; S13, S33; S14, S34). Alternatively, each of the bidirectional switch circuits SS21 to SS34 may be made of a pair of switch elements connected in series, as shown in FIGS. 13A to 14D (S41, S51; S42, S52; S43, S53; S44, S54). In each of FIGS. 13A to 14D, the direction from top to bottom is referred to as a "positive direction", and the direction from bottom to top is referred to as a "negative direction".

Figure 13A:
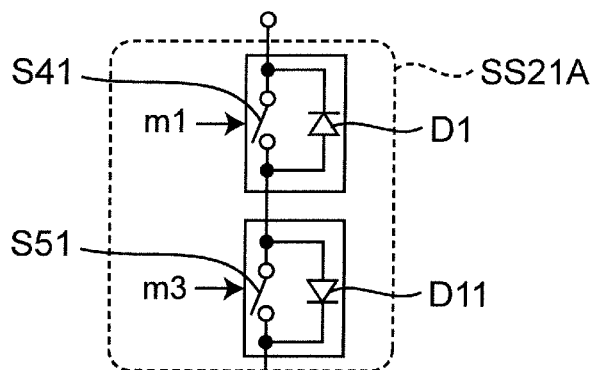
FIG. 13A is a circuit diagram showing a configuration of a bidirectional switch circuit SS21A for a code modulation circuit 23A used in a power transmission system according to a modified embodiment of the second embodiment.

FIG. 13A is a circuit diagram showing a configuration of a bidirectional switch circuit SS21A for a code modulation circuit 23A used in a power transmission system according to a modified embodiment of the second embodiment. The switch circuit SS21A of FIG. 13A corresponds to the switch circuit SS21 of FIG. 10, and is made of series connection of: (1) a switch element S41 connected in parallel with a diode D1 allowing a current to flow in the negative direction, and turned on and off in accordance with the modulation code m1; and (2) a switch element S51 connected in parallel with a diode D11 allowing a current to flow in the positive direction, and turned on and off in accordance with the modulation code m3.

Figure 13B:
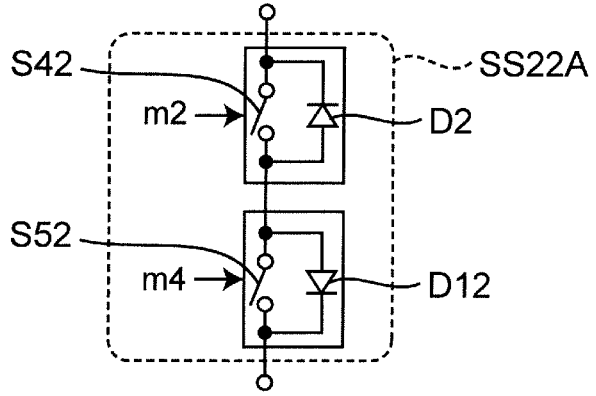
FIG. 13B is a circuit diagram showing a configuration of a bidirectional switch circuit SS22A for the code modulation circuit 23A used in the power transmission system according to the modified embodiment of the second embodiment.

FIG. 13B is a circuit diagram showing a configuration of a bidirectional switch circuit SS22A for the code modulation circuit 23A used in the power transmission system according to the modified embodiment of the second embodiment. The switch circuit SS22A of FIG. 13B corresponds to the switch circuit SS22 of FIG. 10, and is made of series connection of: (1) a switch element S42 connected in parallel with a diode D2 allowing a current to flow in the negative direction, and turned on and off in accordance with the modulation code m2; and (2) a switch element S52 connected in parallel with a diode D12 allowing a current to flow in the positive direction, and turned on and off in accordance with the modulation code m4.

Figure 13C:
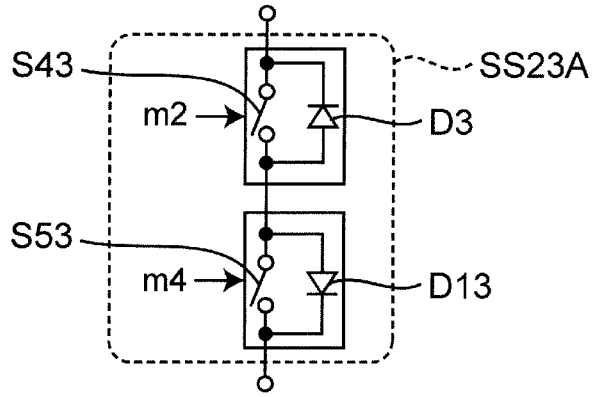
FIG. 13C is a circuit diagram showing a configuration of a bidirectional switch circuit SS23A for the code modulation circuit 23A used in the power transmission system according to the modified embodiment of the second embodiment.

FIG. 13C is a circuit diagram showing a configuration of a bidirectional switch circuit SS23A for the code modulation circuit 23A used in the power transmission system according to the modified embodiment of the second embodiment. The switch circuit SS23A of FIG. 13C corresponds to the switch circuit SS23 of FIG. 10, and is made of series connection of: (1) a switch element S43 connected in parallel with a diode D3 allowing a current to flow in the negative direction, and turned on and off in accordance with the modulation code m2; and (2) a switch element S53 connected in parallel with a diode D13 allowing a current to flow in the positive direction, and turned on and off in accordance with the modulation code m4.

Figure 13D:
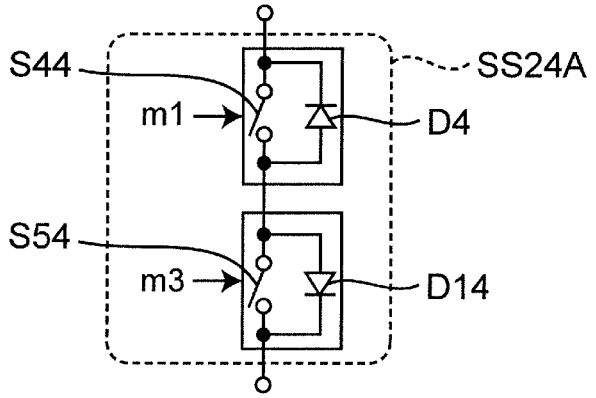
FIG. 13D is a circuit diagram showing a configuration of a bidirectional switch circuit SS24A for the code modulation circuit 23A used in the power transmission system according to the modified embodiment of the second embodiment.

FIG. 13D is a circuit diagram showing a configuration of a bidirectional switch circuit SS24A for the code modulation circuit 23A used in the power transmission system according to the modified embodiment of the second embodiment. The switch circuit SS24A of FIG. 13D corresponds to the switch circuit SS24 of FIG. 10, and is made of series connection of: (1) a switch element S44 connected in parallel with a diode D4 allowing a current to flow in the negative direction, and turned on and off in accordance with the modulation code m1; and (2) a switch element S54 connected in parallel with a diode D14 allowing a current to flow in the positive direction, and turned on and off in accordance with the modulation code m3.

Figure 14A:
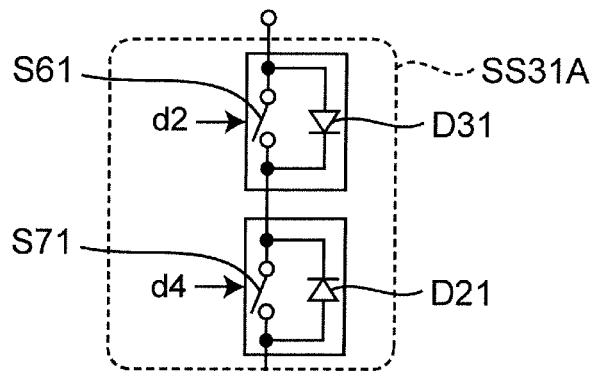
FIG. 14A is a circuit diagram showing a configuration of a bidirectional switch circuit SS31A for a code demodulation circuit 33A used in the power transmission system according to the modified embodiment of the second embodiment.

FIG. 14A is a circuit diagram showing a configuration of a bidirectional switch circuit SS31A for a code demodulation circuit 33A used in the power transmission system according to the modified embodiment of the second embodiment. The switch circuit SS31A of FIG. 14A corresponds to the switch circuit SS31 of FIG. 11, and is made of series connection of: (1) a switch element S61 connected in parallel with a diode D31 allowing a current to flow in the positive direction, and turned on and off in accordance with the demodulation code d2; and (2) a switch element S71 connected in parallel with a diode D21 allowing a current to flow in the negative direction, and turned on and off in accordance with the demodulation code d4.

Figure 14B:
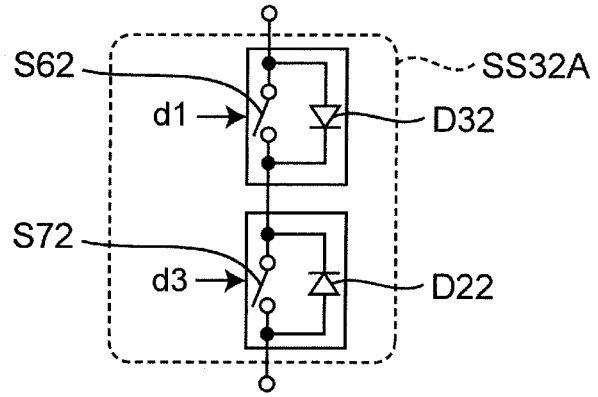
FIG. 14B is a circuit diagram showing a configuration of a bidirectional switch circuit SS32A for the code demodulation circuit 33A used in the power transmission system according to the modified embodiment of the second embodiment.

FIG. 14B is a circuit diagram showing a configuration of a bidirectional switch circuit SS32A for the code demodulation circuit 33A used in the power transmission system according to the modified embodiment of the second embodiment. The switch circuit SS32A of FIG. 14B corresponds to the switch circuit SS32 of FIG. 11, and is made of series connection of: (1) a switch element S62 connected in parallel with a diode D32 allowing a current to flow in the positive direction, and turned on and off in accordance with the demodulation code d1; and (2) a switch element S72 connected in parallel with a diode D22 allowing a current to flow in the negative direction, and turned on and off in accordance with the demodulation code d3.

Figure 14C:
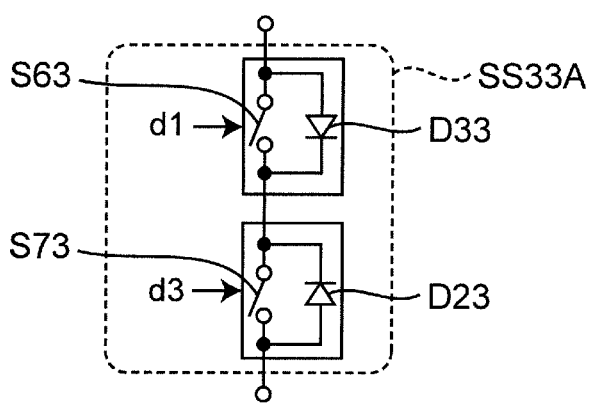
FIG. 14C is a circuit diagram showing a configuration of a bidirectional switch circuit SS33A for the code demodulation circuit 33A used in the power transmission system according to the modified embodiment of the second embodiment.

FIG. 14C is a circuit diagram showing a configuration of a bidirectional switch circuit SS33A for the code demodulation circuit 33A used in the power transmission system according to the modified embodiment of the second embodiment. The switch circuit SS33A of FIG. 14C corresponds to the switch circuit SS33 of FIG. 11, and is made of series connection of: (1) a switch element S63 connected in parallel with a diode D33 allowing a current to flow in the positive direction, and turned on and off in accordance with the demodulation code d1; and (2) a switch element S73 connected in parallel with a diode D23 allowing a current to flow in the negative direction, and turned on and off in accordance with the demodulation code d3.

Figure 14D:
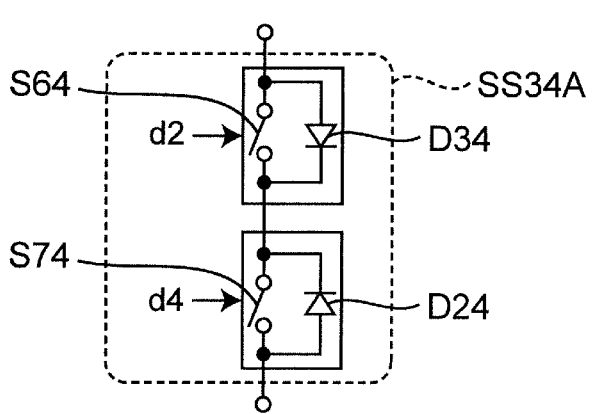
FIG. 14D is a circuit diagram showing a configuration of a bidirectional switch circuit SS34A for the code demodulation circuit 33A used in the power transmission system according to the modified embodiment of the second embodiment.

FIG. 14D is a circuit diagram showing a configuration of a bidirectional switch circuit SS34A for the code demodulation circuit 33A used in the power transmission system according to the modified embodiment of the second embodiment. The switch circuit SS34A of FIG. 14D corresponds to the switch circuit SS34 of FIG. 11, and is made of series connection of: (1) a switch element S64 connected in parallel with a diode D34 allowing a current to flow in the positive direction, and turned on and off in accordance with the demodulation code d2; and (2) a switch element S74 connected in parallel with a diode D24 allowing a current to flow in the negative direction, and turned on and off in accordance with the demodulation code d4.

Referring to FIG. 13A to FIG. 14D, each of the switch elements S41 to S74 may be made of, for example, an MOS transistor. Parallel parasitic (body) diodes D1 to D34 of MOS transistors may be used. For example, when each of the switch circuits SS21A to SS34A of FIGS. 13A to 14D is implemented by a switch element of an MOS transistor and one diode, two MOS transistors and two diodes are required for each one of the bidirectional switch circuit SS21A to SS34A. Meanwhile, packaged MOS transistors are widely available, including a built-in diode having good reverse characteristics. When using such packaged MOS transistors, each of the bidirectional switch circuits SS21A to SS34A can be made of two switch elements, and thus, size can be reduced.

Third Embodiment

In the first and second embodiments, we have described the power transmission systems which transmit power from the one power generator 1 to the one load 5. Meanwhile, in a third embodiment, we describe a power transmission system which transmits powers from a plurality of power generators to a plurality of loads.

Figure 15:
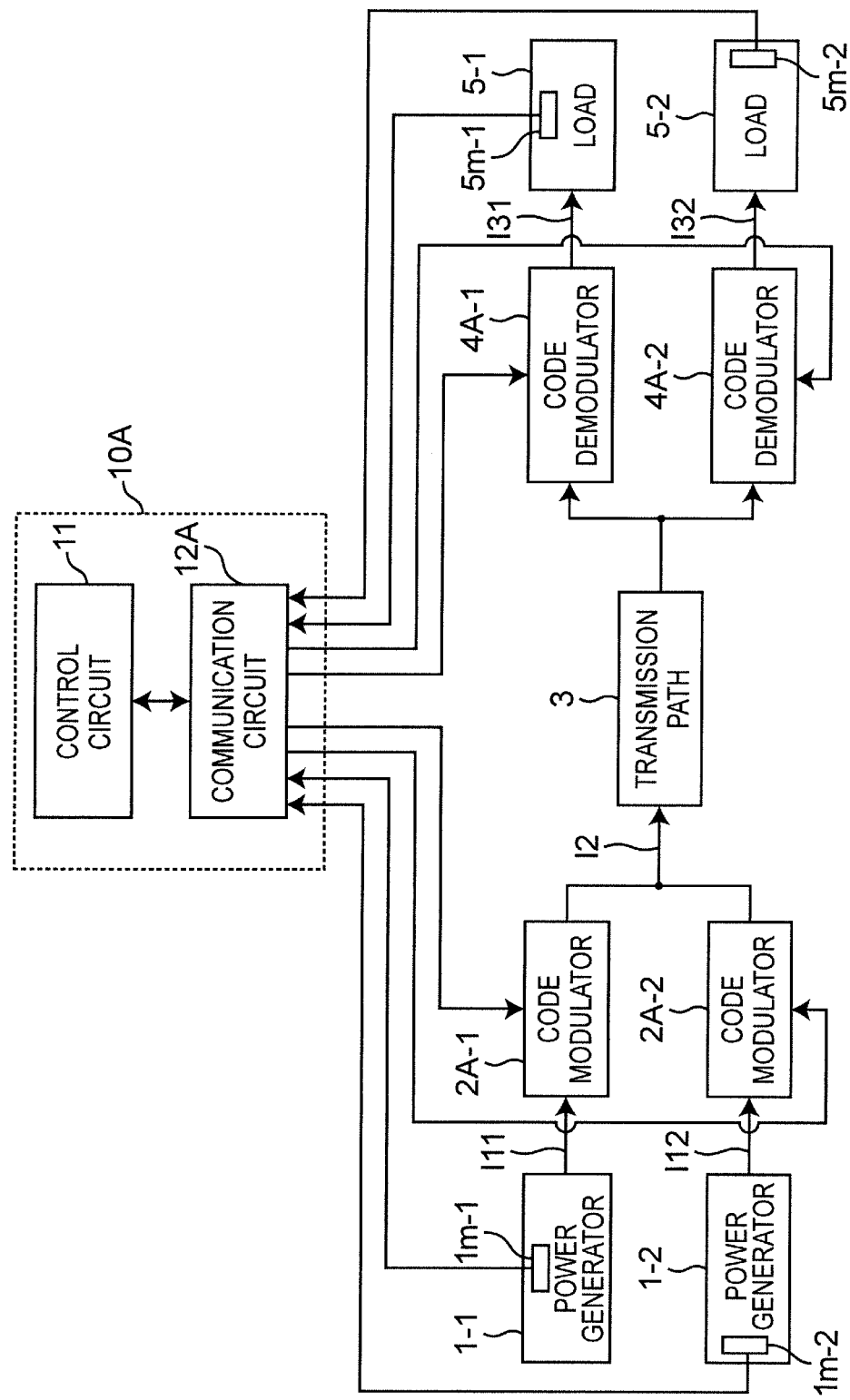
FIG. 15 is a block diagram showing a configuration of a power transmission system according to a third embodiment.

FIG. 15 is a block diagram showing a configuration of a power transmission system according to the third embodiment. Referring to FIG. 15, the power transmission system according to the third embodiment includes a plurality of power generators 1-1 and 1-2, a plurality of code modulators 2A-1 and 2A-2, a transmission path 3, a plurality of code demodulators 4A-1 and 4A-2, a plurality of loads 5-1 and 5-2, and a controller 10A.

The controller 10A is provided with a control circuit 11 and a communication circuit 12A. The control circuit 11 communicates with the code modulators 2A-1 and 2A-2 and the code demodulators 4A-1 and 4A-2 via the communication circuit 12A, and controls operations of the code modulators 2A-1 and 2A-2 and the code demodulators 4A-1 and 4A-2.

In the power transmission system of FIG. 15, each of the code modulators 2A-1 and 2A-2 operates as a power transmitter apparatus, and each of the code demodulators 4A-1 and 4A-2 operates as a power receiver apparatus. Each code modulator of the code modulators 2A-1 and 2A-2 modulates first power to generate a code-modulated wave by code modulation using a modulation code based on a code sequence, and transmits the code-modulated wave to one of the code demodulators 4A-1 and 4A-2 via the transmission path 3. Each one of the code demodulators 4A-1 and 4A-2 receives the code-modulated wave from one of the code modulators 2A-1 and 2A-2 via the transmission path 3, and demodulates the received code-modulated wave to generate second power by code demodulation using a demodulation code based on a code sequence identical to the code sequence of the modulation code used for the code modulation. The first powers are, for example, powers generated by the power generators 1-1 and 1-2, and are shown as generated currents I11 and I12 in FIG. 15. The code-modulated wave is alternating-current power modulated by code modulation, and is shown as a modulated current I2 in FIG. 15. The second power are, for example, powers to be supplied to the loads 5-1 and 5-2, and are shown as demodulated currents I31 and I32 in FIG. 15.

In this case, the code modulators 2A-1 and 2A-2 and the code demodulators 4A-1 and 4A-2 of FIG. 15 are configured and operated similarly to the code modulator 2A and the code demodulator 4A according to the second embodiment.

The power transmission system of FIG. 15 is further provided with power meters 1m-1, 1m-2, 5m-1, and 5m-2. Each of the power meters 1m-1 and 1m-2 is first power measuring means which measures an amount of the first power. More specifically, each of the power meters 1m-1 and 1m-2 measures an amount of power generated by the power generators 1-1 and 1-2 and transmitted from the power generators 1-1 and 1-2 to the code modulators 2A-1 and 2A-2. Each of the power meters 5m-1 and 5m-2 is second power measuring means which measures an amount of the second power. More specifically, each of the power meters 5m-1 and 5m-2 measures an amount of power transmitted from the code demodulators 4A-1 and 4A-2 to the loads 5-1 and 5-2, and used by the loads 5-1 and 5-2. The amounts of powers measured by the power meters 1m-1, 1m-2, 5m-1, and 5m-2 are transmitted to the controller 10A.

The controller 10A controls operations of the code modulators 2A-1 and 2A-2 and the code demodulators 4A-1 and 4A-2 based on the amounts of powers received from the power meters 1m-1, 1m-2, 5m-1, and 5m-2. For example, the controller 10A transmits control signals to the code modulators 2A-1 and 2A-2 and the code demodulators 4A-1 and 4A-2, the control signals including synchronization signals for synchronizing the code modulators 2A-1 and 2A-2 and the code demodulators 4A-1 and 4A-2 to each other, thus achieving code modulation and code demodulation of power in an accurately synchronized manner.

The controller 10A transmits the code sequences of the modulation codes, or information specifying the code sequences, to at least one of the code modulators 2A-1 and 2A-2, which is to transmit power, and transmits the code sequences of the demodulation codes, or information specifying the code sequences, to at least one of the code demodulators 4A-1 and 4A-2, which is to receive power. For example, when transmitting power from the code modulator 2A-1 to the code demodulator 4A-1, the controller 10A sets a modulation code to the code modulator 2A-1, and a demodulation code to the code demodulator 4A-1, based on one code sequence. When simultaneously transmitting power from the code modulator 2A-2 to the code demodulator 4A-2, the controller 10A sets a modulation code to the code modulator 2A-2, and a demodulation code to the code demodulator 4A-2, based on another different code sequence. When simultaneously transmitting powers from the plurality of code modulators 2A-1 and 2A-2 to the plurality of code demodulators 4A-1 and 4A-2, a plurality of low-correlated (e.g., orthogonal) code sequences may be used.

Thus, it is possible to transmit powers from the plurality of power generators 1-1 and 1-2 to the plurality of loads 5-1 and 5-2.

Now, we describe exemplary operations of the code modulators 2A-1 and 2A-2 and the code demodulators 4A-1 and 4A-2 for transmitting powers generated by the power generators 1-1 and 1-2 to the loads 5-1 and 5-2.

In the third embodiment, we describe a case in which the power generators 1-1 and 1-2 output direct-current powers, direct-current power is inputted to the load 5-1, and alternating-current power is inputted to the load 5-2. That is, when transmitting power from the power generator 1-2 to the load 5-2, direct-current power is converted into alternating-current power.

Figure 16A:
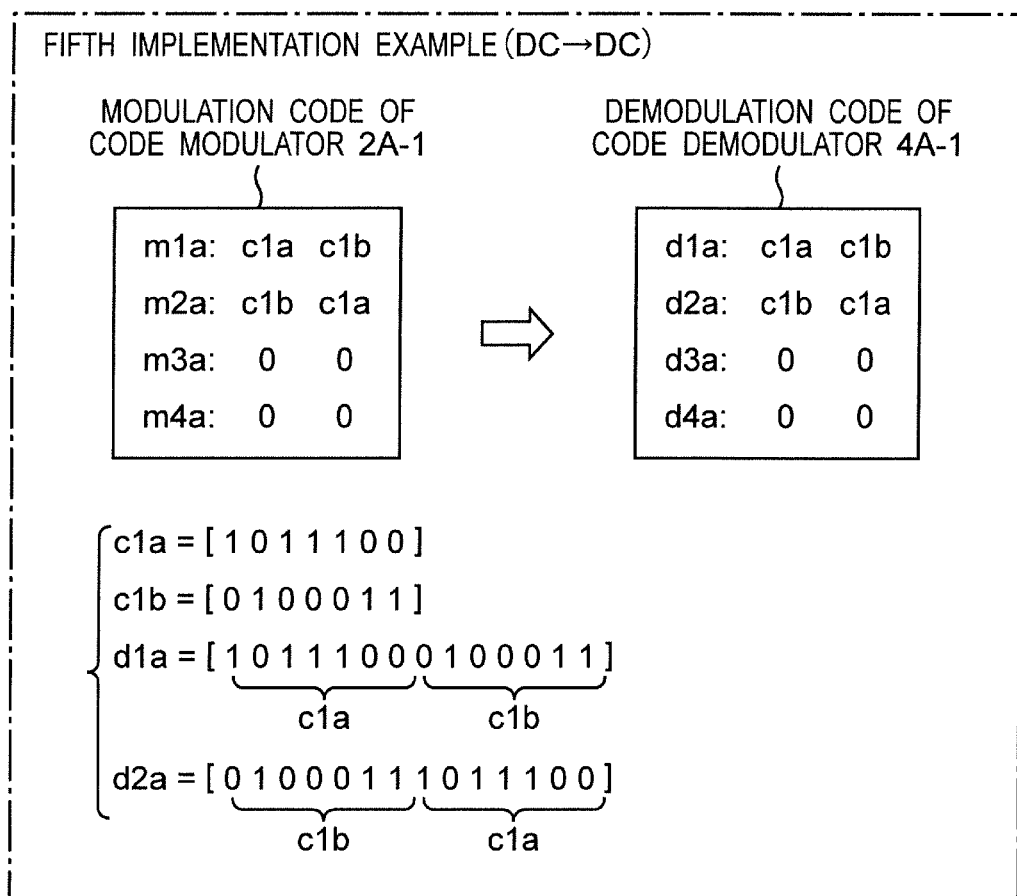
FIG. 16A is a diagram showing an example of a modulation code of a code modulator 2A-1 and a demodulation code of a code demodulator 4A-1 in the power transmission system of FIG. 15, as a fifth implementation example in which direct-current power is transmitted and received.

FIG. 16A is a diagram showing an example of a modulation code of the code modulator 2A-1 and a demodulation code of the code demodulator 4A-1 in the power transmission system of FIG. 15 according to the third embodiment, in which direct-current power is transmitted and received. In addition, FIG. 16B is a diagram showing an example of a modulation code of the code modulator 2A-2 and a demodulation code of the code demodulator 4A-2 in the power transmission system of FIG. 15 according to the third embodiment, in which direct-current power is transmitted and alternating-current power is received.

FIG. 16A shows modulation codes and demodulation codes inputted to the switch elements S1 to S44 of the code modulator 2A-1 and the code demodulator 4A-1. In this case, modulation codes m1a to m4a correspond to the modulation codes m1 to m4 of the code modulation circuit 23A of FIG. 10, respectively, and demodulation codes d1a to d4a correspond to the demodulation codes d1 to d4 of the code demodulation circuit 33A of FIG. 11, respectively. In this case, as described with reference to FIG. 12B, by setting all the code values of the modulation codes m3a and m4a and the demodulation codes d3a and d4a to "0", the switch elements S21 to S24 and S31 to S34 are turned off. In addition, the modulation codes m1a and m2a and the demodulation codes d1a and d2a are generated from the code sequence c1a and the code sequence c1b, as described with reference to FIG. 12B.

Figure 16B:
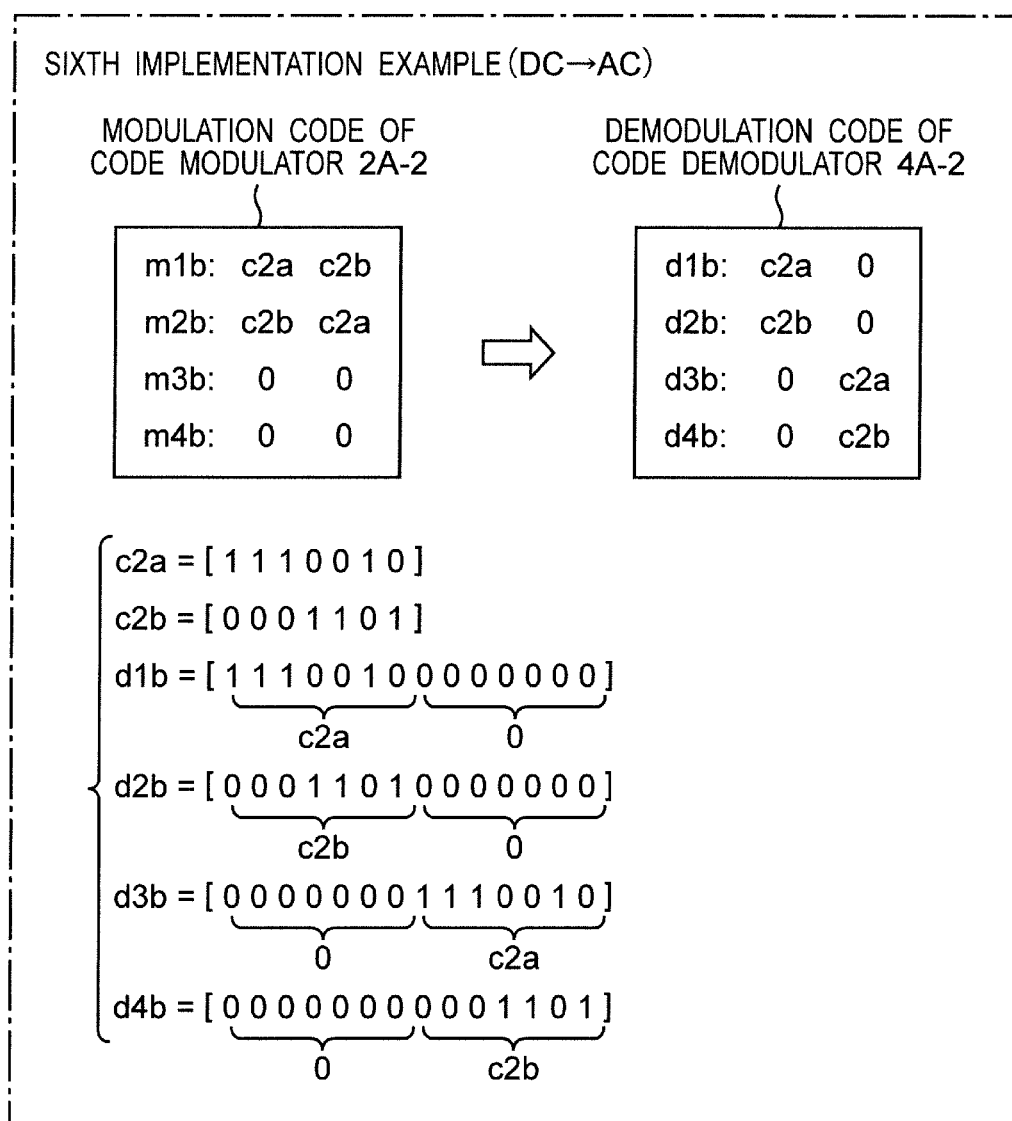
FIG. 16B is a diagram showing an example of a modulation code of the code modulator 2A-2 and a demodulation code of the code demodulator 4A-2 in the power transmission system of FIG. 15, as a sixth implementation example in which direct-current power is transmitted and alternating-current power is received.

Further, FIG. 16B shows modulation codes and demodulation codes inputted to the switch elements S1 to S44 of the code modulator 2A-2 and the code demodulator 4A-2. In this case, modulation codes m1a to m4a correspond to the modulation codes m1 to m4 of the code modulation circuit 23A of FIG. 10, respectively, and demodulation codes d1a to d4a correspond to the demodulation codes d1 to d4 of the code demodulation circuit 33A of FIG. 11, respectively. In this case, by setting all the code values of the modulation codes m3b and m4b to "0", the switch elements S21 to S24 are turned off. In addition, the modulation codes m1b and m2b and the demodulation codes d1b to d4b are generated from the code sequence c2a and the code sequence c2b. The principle of code modulation and code demodulation of currents is similar to that of the first and second embodiments, and therefore, its explanation is omitted here.

Figure 17:
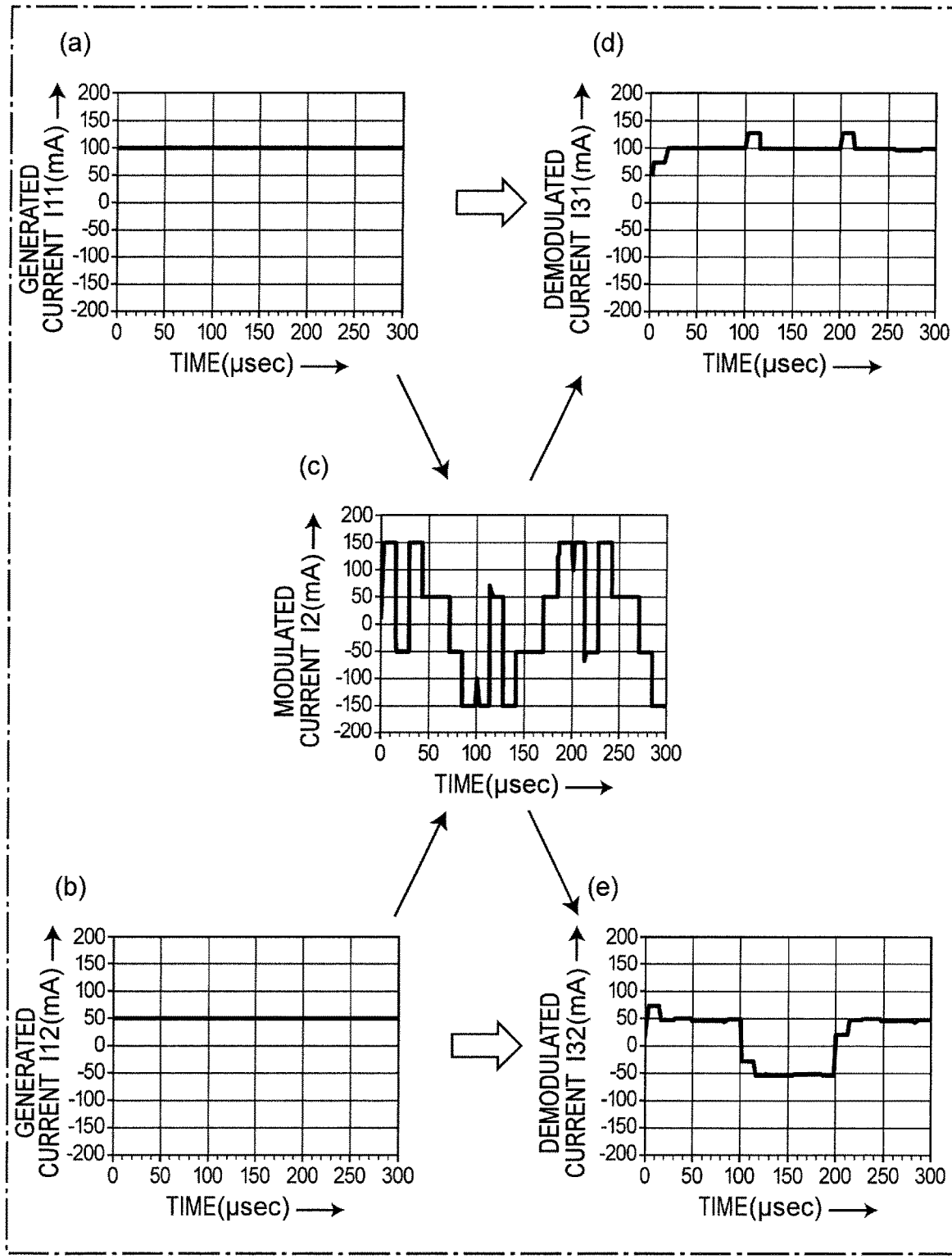
FIG. 17 is a waveform diagram showing exemplary signal waveforms in the power transmission system according to the third embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

Now, with reference to FIG. 17, we describe an operation of transmitting powers from the plurality of power generators 1-1 and 1-2 to the plurality of loads 5-1 and 5-2.

FIG. 17 are waveform diagrams, where (a) to (e) show exemplary signal waveforms of the power transmission system according to the third embodiment. In FIG. 17, (a) shows a signal waveform of a generated current I11, (b) shows a signal waveform of a generated current I12, (c) shows a signal waveform of a modulated current I2, (d) shows a signal waveform of a demodulated current I31, and (e) shows a signal waveform of a demodulated current I32.

The code modulator 2A-1 modulates the direct-current generated current I11 by code modulation into an alternating-current code-modulated wave. Similarly, the code modulator 2A-2 modulates the direct-current generated current I12 by code modulation into an alternating-current code-modulated wave. As shown in FIG. 17(c), the code-modulated wave generated by the code modulator 2A-1 and the code-modulated wave generated by the code modulator 2A-2 are transmitted as the combined modulated current I2 via the transmission path 3.

As described above, the code modulators 2A-1 and 2A-2 have an identical configuration, and are configured in a manner similar to that of the code modulator 2A of FIG. 10. In addition, the code demodulators 4A-1 and 4A-2 also have an identical configuration, and are configured in a manner similar to that of the code demodulator 4A of FIG. 11. The difference between the code modulators 2A-1 and 2A-2, and the difference between the code demodulators 4A-1 and 4A-2 reside in the use of different sets of the code sequences c1a and c1b, and the code sequences c2a and c2b. The code modulator 2A-1 and the code demodulator 4A-1 use the code sequences c1a and c1b, and the code modulator 2A-2 and the code demodulator 4A-2 use the code sequences c2a and c2b. In this case, the code sequences c1a and c2a are orthogonal to each other, and therefore, the code sequences c1b and c2b are also orthogonal to each other. In this case, Gold sequences of seven stages are adopted, and different Gold sequences are set to the code sequences c1a and c2a.

The code demodulators 4A-1 and 4A-2 can demodulate the modulated current I2 to extract powers generated by the corresponding code modulators 2A-1 and 2A-2, respectively, by using the orthogonal code sequences c1a and c2a. Accordingly, as shown in FIGS. 17(d) and (e), the generated currents I11 and I12 are inputted to the code modulators 2A-1 and 2A-2, and then, the currents are transmitted as code-modulated waves, and then, the corresponding code demodulators 4A-1 and 4A-2 correctly demodulate and output the demodulated currents I31 and I32. As a result, the demodulated currents I31 and I32 having desired waveforms (direct current or alternating current) and desired magnitudes are supplied to the loads 5-1 and 5-2, respectively.

As described above, according to the present embodiment, it is possible to simultaneously perform two power transmissions via the one transmission path 3 in a multiplexed manner, and separate the transmitted powers from each other, by using the code modulators 2A-1 and 2A-2 and the code demodulators 4A-1 and 4A-2. Accordingly, it is possible to achieve a favorable power transmission system capable of simultaneously transmitting currents of desired magnitudes from the two power generators 1-1 and 1-2 to the two loads 5-1 and 5-2.

By measuring instantaneous powers at the code modulators 2A-1 and 2A-2 or the code demodulators 4A-1 and 4A-2 and comparing the instantaneous powers with the code sequences, it is possible to know which of the power generators 1-1 and 1-2 transmits power, which of the loads receives power, and what amount of power is transmitted. Accordingly, when a plurality of the different power generators 1-1 and 1-2 requiring different generation costs are connected, it is possible to conduct power business with electricity charges dependent on which of the power generators 1-1 and 1-2 transmits power. Alternatively, in case of a system having variable power transmission efficiency depending on which of the power generators 1-1 and 1-2 transmits power and which of the loads 5-1 and 5-2 receives the power, it is possible to achieve optimum power supply by managing and analyzing information on power transmission.

As described above, according to the present embodiment, it is possible to provide the power transmission system capable of efficiently supplying power from the one or more power generators 1-1 and 1-2 to the one or more loads 5-1 and 5-2, by using the code modulators 2A-1 and 2A-2 and the code demodulators 4A-1 and 4A-2.

In the above described embodiment, we indicated the example of the power transmission system including the two power generators 1-1 and 1-2 and the two loads 5-1 and 5-2, but the present disclosure is not limited thereto. It is possible to provide power transmission systems including the one power generator 1-2 and the two or more loads 5-1 and 5-2, or including two or more power generators 1-1 and 1-2 and the two or more loads 5-1 and 5-2. In this case, it is possible to simultaneously perform a number of power transmissions using one transmission path 3. Accordingly, it is possible to reduce costs for installation of the transmission path 3, and reduce costs by reducing the number of transmission paths 3, etc.

In the above described embodiment, we indicated the example in which each of the code modulators 2A-1 and 2A-2 of FIG. 15 is configured as the code modulation circuit 23A of FIG. 10, but the present disclosure is not limited thereto. For example, when the output powers from the power generators 1-1 and 1-2 are direct-current powers, each of the code modulators 2A-1 and 2A-2 may be configured as the code modulation circuit 23 of FIG. 7. In addition, when the input powers to the loads 5-1 and 5-2 are direct-current powers, each of the code demodulators 4A-1 and 4A-2 may be configured as the code demodulation circuit 33 of FIG. 7. In these cases, it is possible to simplify the circuit configurations of the code modulators 2A-1 and 2A-2 and the code demodulators 4A-1 and 4A-2, and accordingly, there are advantageous effects of reducing the number of parts, reducing costs, and reducing size of the apparatuses.

In the third embodiment, we indicated the example of the power transmission system which transmits powers from two power generators each having direct-current output power, to one load having direct-current input power, and to one load having alternating-current input power, but the present disclosure is not limited thereto. The power transmission system may receive powers from any number of power generators each having direct-current output power, and from any number of power generators each having alternating-current output power. In addition, the power transmission system may supply powers to any number of loads each having direct-current input power, and to any number of loads each having alternating-current input power.

Photovoltaic power generation, which generates most of natural energy, generates direct-current power. On the other hand, wind power generation and geothermal power generation generate alternating-current power. In this case, since it is not desirable that both direct-current power supplies and alternating-current power supplies are connected to the same power network, according to conventional power transmission systems, all power generators (power supplies) and loads should be of only direct current or only alternating current.

On the other hand, according to the power transmission system according to the present embodiment, by using code modulation and code demodulation, it is possible simultaneously transmit powers from a direct-current power supply to a direct-current load, from a direct-current power supply to an alternating-current load, from an alternating-current power supply to a direct-current load, and from an alternating-current power supply to an alternating-current load, via one transmission path.

Thus, according to the first to third embodiments, it is possible to provide a favorable power transmission system capable of correctly perform code modulation and code demodulation of power, and further, capable of simultaneously performing a plurality of power transmissions in a multiplexed manner via one transmission path.

Fourth Embodiment

Figure 18:
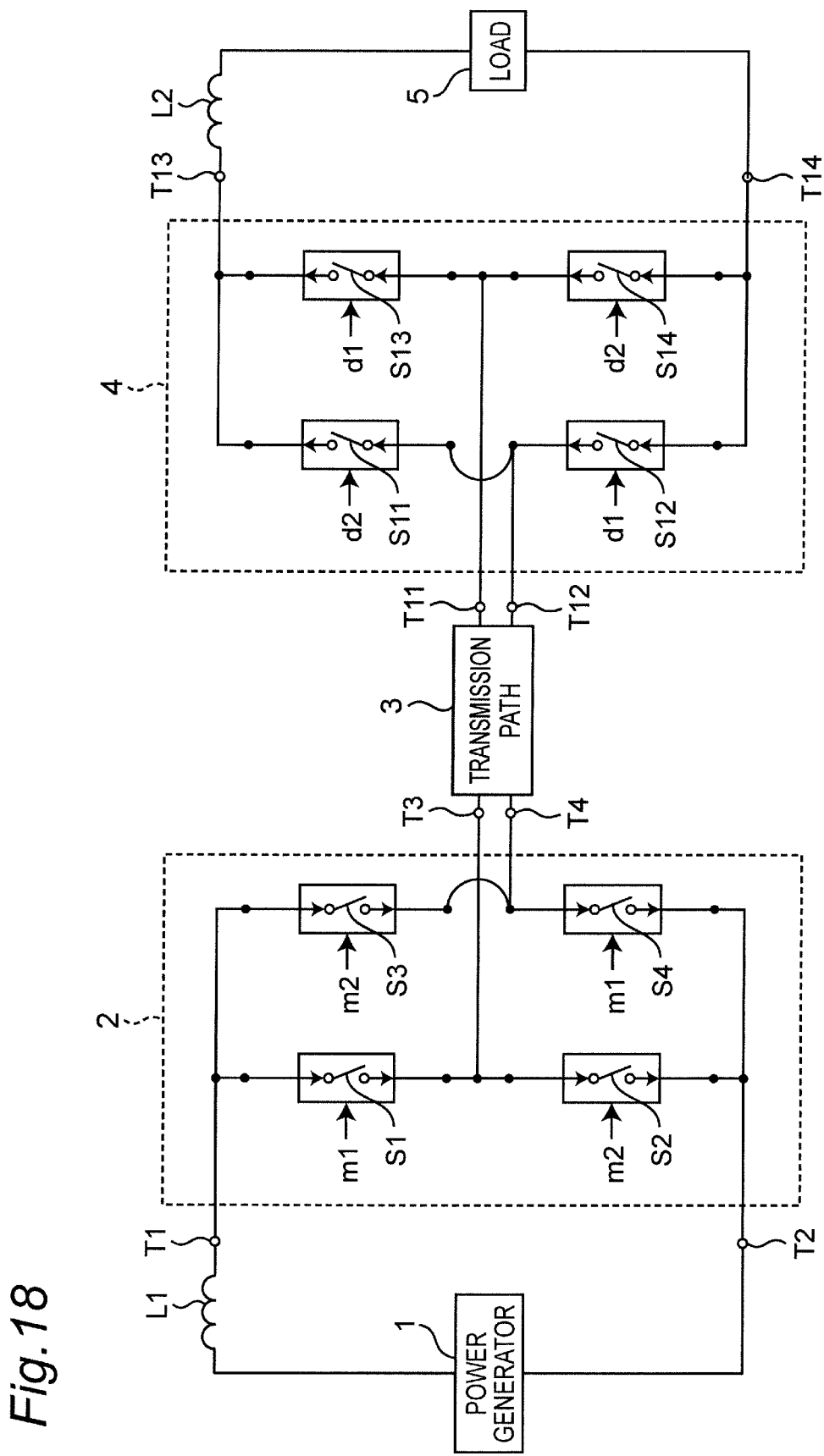
FIG. 18 is a circuit diagram showing a configuration of a power transmission system according to a fourth embodiment.

FIG. 18 is a circuit diagram showing a configuration of a power transmission system according to a fourth embodiment. The power generator 1, the code modulator 2, the transmission path 3, the code demodulator 4, and the load 5 of FIG. 18 are configured in a manner similar to that of the corresponding constituent elements of FIG. 1. The power generator 1 supplies DC generated current to the code modulator 2. The load 5 is supplied with DC load current from the code demodulator 4. In FIG. 18, the controller 10, the power meters 1m and 5m, and constituent elements of the code modulator 2 other than the switch elements S1 to S4, and constituent elements of the code demodulator 4 other than the switch elements S11 to S14 of FIG. 1 are omitted for ease of illustration.

The power transmission system of FIG. 18 is further provided with: a first reactor L1 connected between the code modulator 2 and the power generator 1, and a second reactor L2 connected between the code demodulator 4 and the load 5. Due to the reactor L1, switching noise generated in the code modulation circuit 23 of the code modulator 2 is less likely to reach the power generator 1. In addition, due to the reactor L2, switching noise generated in the code demodulation circuit 33 of the code demodulator 4 is less likely to reach the load 5. In addition, due to the reactors L1 and L2, it is possible to maintain continuity of current even when the switch elements S1 to S4 and S11 to S14 are turned on or off. Accordingly, it is possible to improve quality and safety of power transmission.

Usually, the switch elements S1 to S4 of the code modulator 2 are synchronized in time with the switch elements S11 to S14 of the code demodulator, such that the switch elements S1 to S4 and S11 to S14 are simultaneously turned on or off. However, it is difficult to maintain perfect time synchronization, and therefore, time delay and time advance may occur. In the case that the power transmission system is provided with the reactors L1 and L2, if a delay occurs in turning on or off the switch elements S1 to S4 and S11 to S14, then a period of no power transmission occurs, and therefore, the voltage can not arise at the code demodulator 4.

Figure 19:
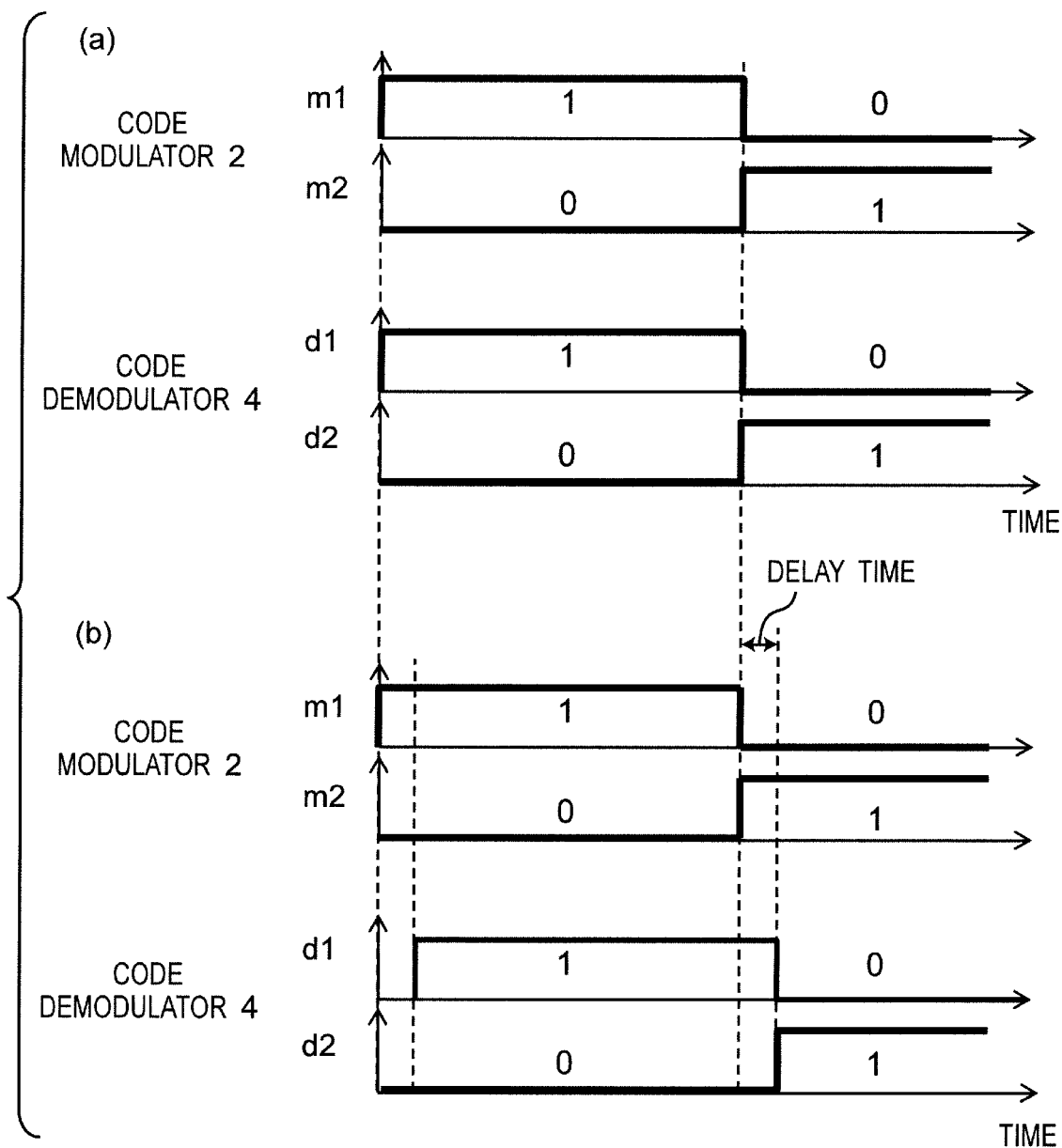
FIG. 19 is a timing chart showing modulation codes m1 and m2 and demodulation codes d1 and d2 used in a power transmission system according to a comparison example of the fourth embodiment, in which: (a) shows a case without delay; and (b) shows a case with delay.

FIG. 19 is a timing chart showing modulation codes m1 and m2 and demodulation codes d1 and d2 used in a power transmission system according to a comparison example of the fourth embodiment. In FIG. 19, (a) shows a case without delay, and (b) shows a case with delay. In FIG. 19(b), the demodulation codes d1 and d2 are delayed from the modulation codes m1 and m2.

For example, a delay occurs for the following reasons:
loss of synchronization between the code modulator 2 and the code demodulator 4;
delay in signal transmission among the code modulator 2, the code demodulator 4, and the controller 10;
delay in power transmission between the code modulator 2 and the code demodulator 4; and
mismatch in clock frequency between the code modulator 2 and the code demodulator 4.

Figure 20:
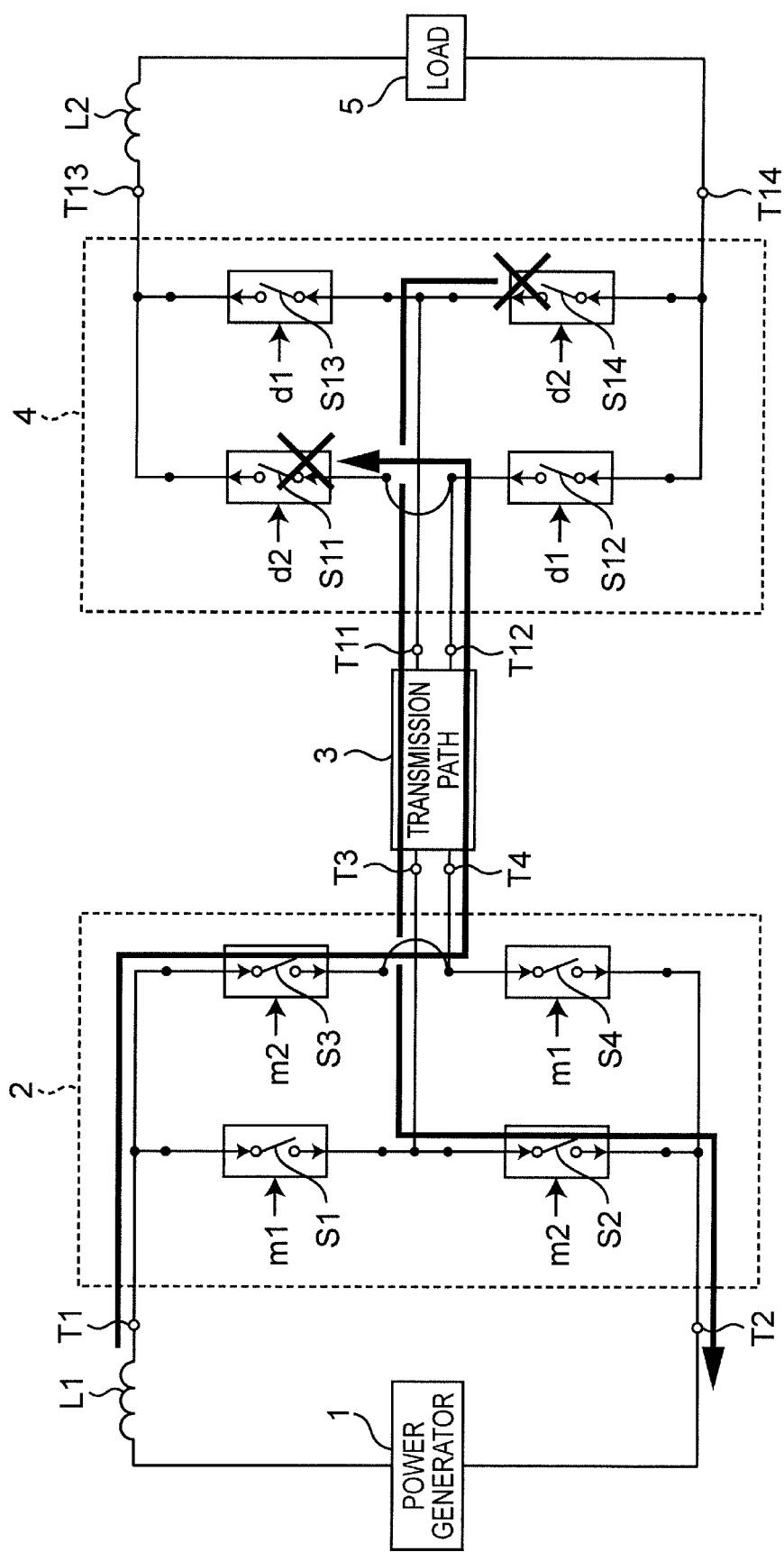
FIG. 20 is a diagram showing current flow with a delay in the power transmission system according to the comparison example of the fourth embodiment.

FIG. 20 is a diagram showing current flow with a delay in the power transmission system according to the comparison example of the fourth embodiment. If a delay occurs as shown in FIG. 19(b), then power can not be supplied to the load 5, since the switch elements S11 and S14 of the code demodulator 4 are turned off even when the switch elements S2 and S3 of the code modulator 2 are turned on.

Figure 21:
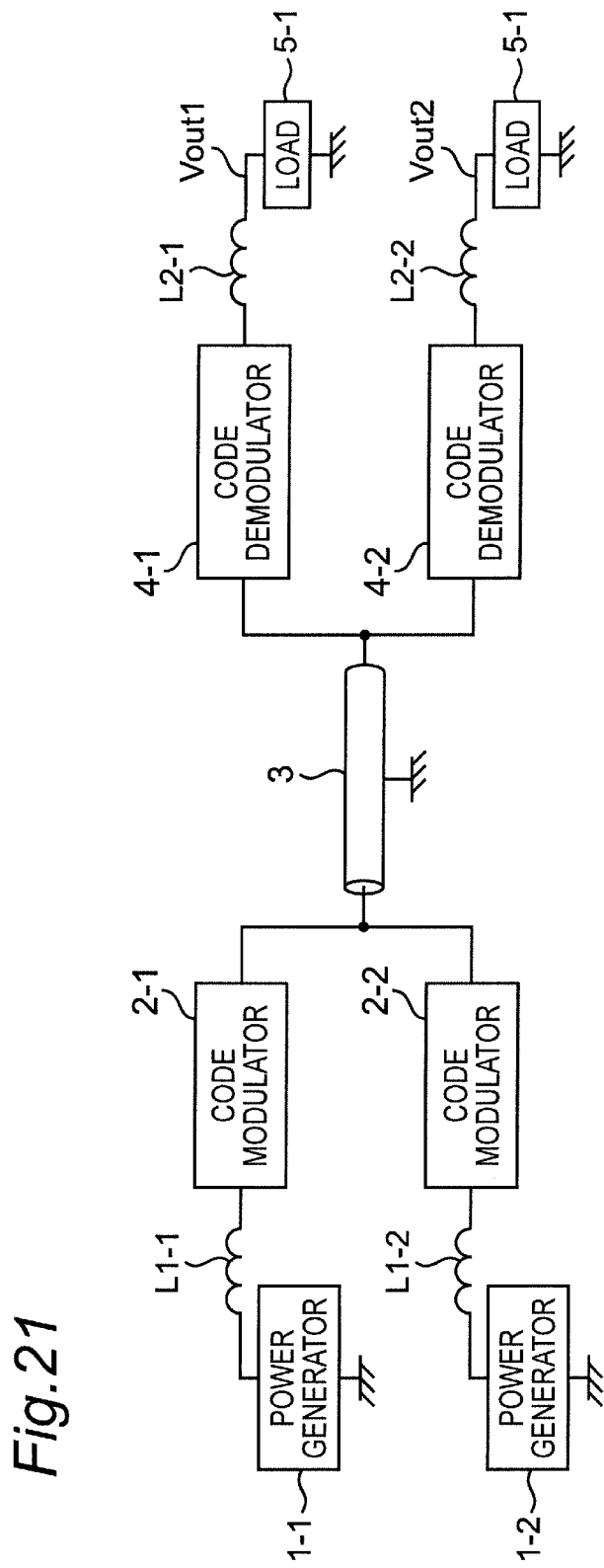
FIG. 21 is a block diagram showing a configuration of a power transmission system according to an implementation example and a comparison example of the fourth embodiment.

FIG. 21 is a block diagram showing a configuration of a power transmission system according to an implementation example and a comparison example of the fourth embodiment. The power transmission system of FIG. 21 is provided with: power generators 1-1 and 1-2, code modulators 2-1 and 2-2, the transmission path 3, code demodulators 4-1 and 4-2, loads 5-1 and 5-2, and reactors L1-1, L1-2, L2-1, and L2-2. A simulation was performed for the power transmission system of FIG. 21 under the following conditions. Each of the power generators 1-1 and 1-2 generated a DC voltage of 115 V. Each of the reactors L1-1 and L2-1 had an inductance of 10 mH, and each of the reactors L1-2 and L2-2 had an inductance of 100 mH. The load 5-1 had an impedance of 4.3Ω, and the load 5-2 had an impedance of 60Ω. The code modulators 2-1 and 2-2 and the code demodulators 4-1 and 4-2 operated at a modulation clock frequency of 20 kHz. The modulation clock frequency is a bit rate of a modulation code or a demodulation code. Each switch element of the code modulators 2-1 and 2-2 and the code demodulators 4-1 and 4-2 had a loss of 0.2Ω. The code modulator 2-1 transmits power to the code demodulator 4-1, and the code modulator 2-2 transmits power to the code demodulator 4-2.

Figure 22:
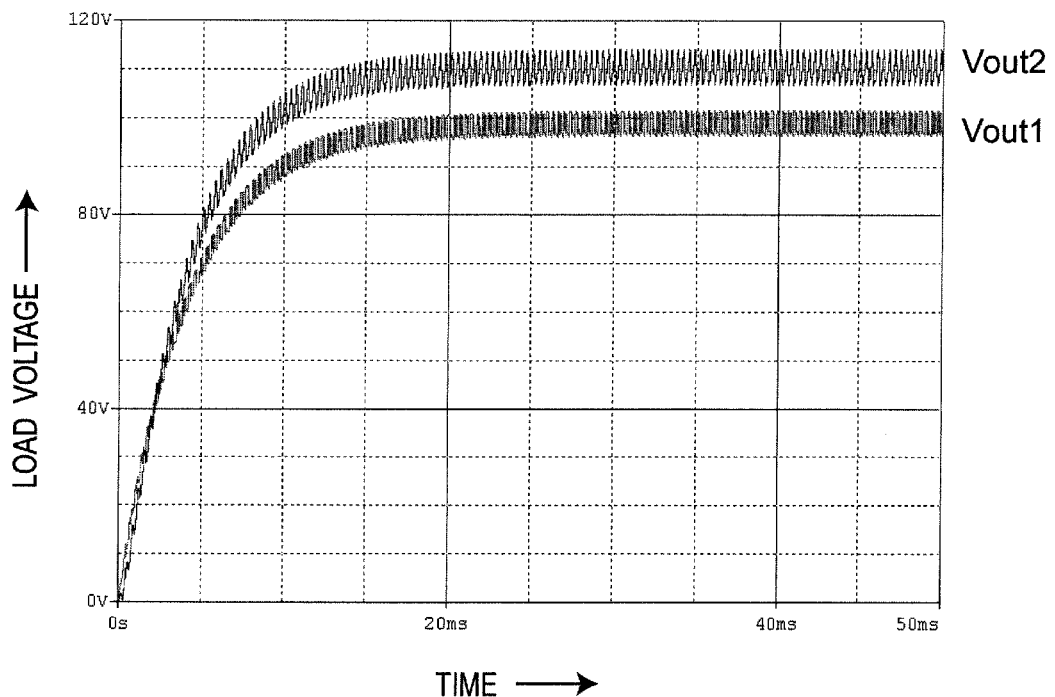
FIG. 22 is a graph showing variations of load voltages Vout1 and Vout2 when power is transmitted without delay in the power transmission system according to the comparison example of the fourth embodiment.
Figure 23:
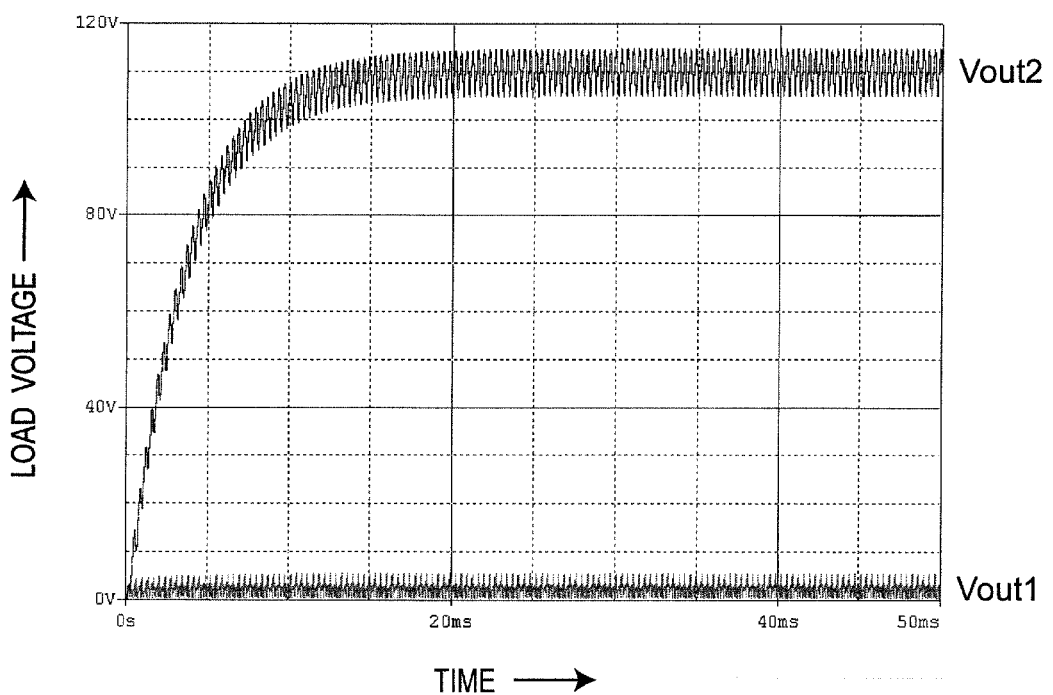
FIG. 23 is a graph showing variations of the load voltages Vout1 and Vout2 when a delay occurs in the power transmission system according to the comparison example of the fourth embodiment.

FIG. 22 is a graph showing variations of load voltages Vout1 and Vout2 when power is transmitted without delay in the power transmission system according to the comparison example of the fourth embodiment. FIG. 23 is a graph showing variations of the load voltages Vout1 and Vout2 when a delay occurs in the power transmission system according to the comparison example of the fourth embodiment. A simulation was performed for the power transmission system of FIG. 21. In the case of FIG. 22, both the pair of code modulator 2-1 and code demodulator 4-1, and the pair of code modulator 2-2 and code demodulator 4-2 use the modulation code and the demodulation code shown in FIG. 19(a). On the other hand, in the case of FIG. 23, the pair of code modulator 2-2 and code demodulator 4-2 use the modulation code and the demodulation code shown in FIG. 19(a), but the pair of code modulator 2-1 and code demodulator 4-1 use the modulation code and the demodulation code shown in FIG. 19(b). In the latter case, the demodulation codes d1 and d2 are delayed from the modulation codes m1 and m2 by 1% of the modulation clock cycle (time length corresponding to one bit of modulation code and demodulation code).

As can be seen from FIGS. 22 and 23, when a delay occurs between code modulator 2 and code demodulator 4 in the power transmission system provided with the reactors L1 and L2, the load voltage can not arise, and power can not be transmitted. Power can not be transmitted when the demodulation codes d1 and d2 are delayed from the modulation codes m1 and m2 only by 1% of the modulation clock cycle. Accordingly, in order to transmit power, an impracticable requirement is imposed that the code modulator 2 and the code demodulator 4 are perfectly synchronized with each other.

Now, we describe an operation of the power transmission system according to the fourth embodiment, capable of preventing power transmission efficiency from degrading due to a delay.

Figure 24:
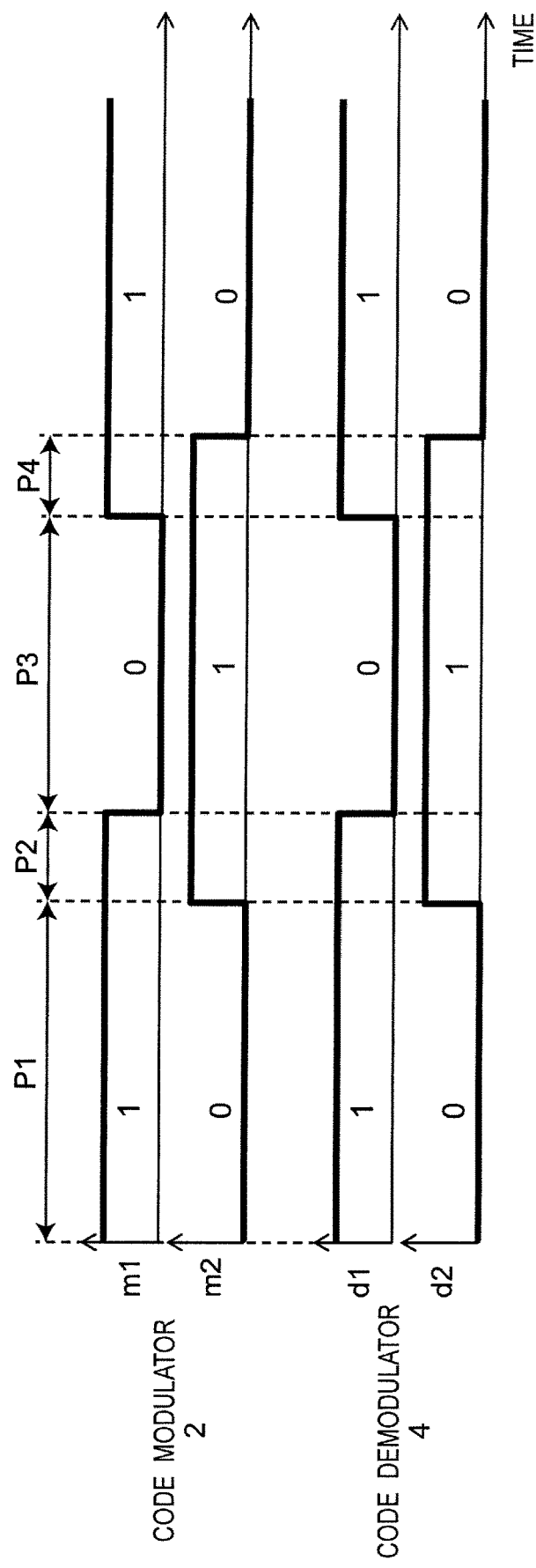
FIG. 24 is a timing chart showing modulation codes m1 and m2 and demodulation codes d1 and d2 used in the power transmission system according to the fourth embodiment.

FIG. 24 is a timing chart showing the modulation codes m1 and m2 and the demodulation codes d1 and d2 used in the power transmission system according to the fourth embodiment.

Referring to FIG. 24, the control circuit 20 of the code modulator 2 sets first to third states to the code modulation circuit 23, the first to third states indicating different states of the switch elements S1 to S4 (switch circuits SS1 to SS4 of FIG. 7). In the first state, the switch elements S1 and S4 are turned on, and the switch elements S2 and S3 are turned off (time period P1). In the second state, the switch elements S1 and S4 are turned off, and the switch elements S2 and S3 are turned on (time period P3). In the third state, all the switch elements S1 to S4 are turned on (time periods P2, P4) during transition from the first state to the second state, and during transition from the second state to the first state. In the present specification, the third state is also referred to as a "simultaneous ON state" of the code modulator 2.

In addition, referring to FIG. 24, the control circuit 30 of the code demodulator 4 sets fourth to sixth states to the code demodulation circuit 33, the fourth to sixth states indicating different states of the switch elements S11 to S14 (switch circuits SS11 to SS14 of FIG. 7). In the fourth state, the switch elements S11 and S14 are turned off, and the switch elements S12 and S13 are turned on (time period P1). In the fifth state, the switch elements S11 and S14 are turned on, and the switch elements S12 and S13 are turned off (time period P3). In the sixth state, all the switch elements S11 to S14 are turned on (time period P2, P4) during transition from the fourth state to the fifth state, and during transition from the fifth state to the fourth state. In the present specification, the sixth state is also referred to as a "simultaneous ON state" of the code demodulator 4.

Each of the third and sixth states (time period P2, P4) has a predetermined time length. In the present specification, this time length is referred to as a "simultaneous ON time".

Figure 25:
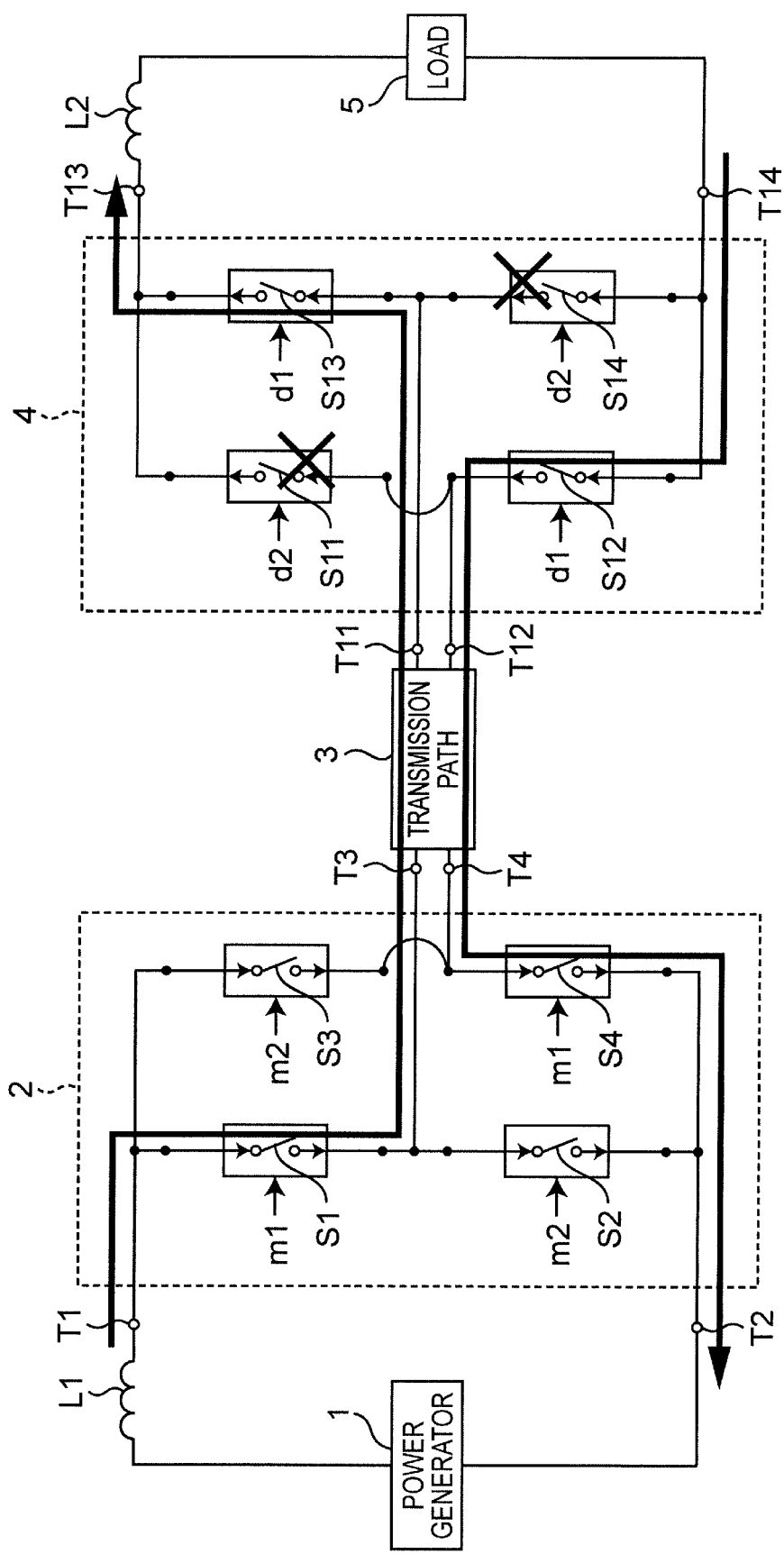
FIG. 25 is a diagram showing current flow in a time period P1 of FIG. 24.

FIG. 25 is a diagram showing current flow in the time period P1 of FIG. 24. In the time period P1, the switch elements S1 and S4 of the code modulator 2 are turned on, and the switch elements S12 and S13 of the code demodulator 4 are turned on. Accordingly, current flows as shown in FIG. 24, and power is supplied to the load 5.

Figure 26:
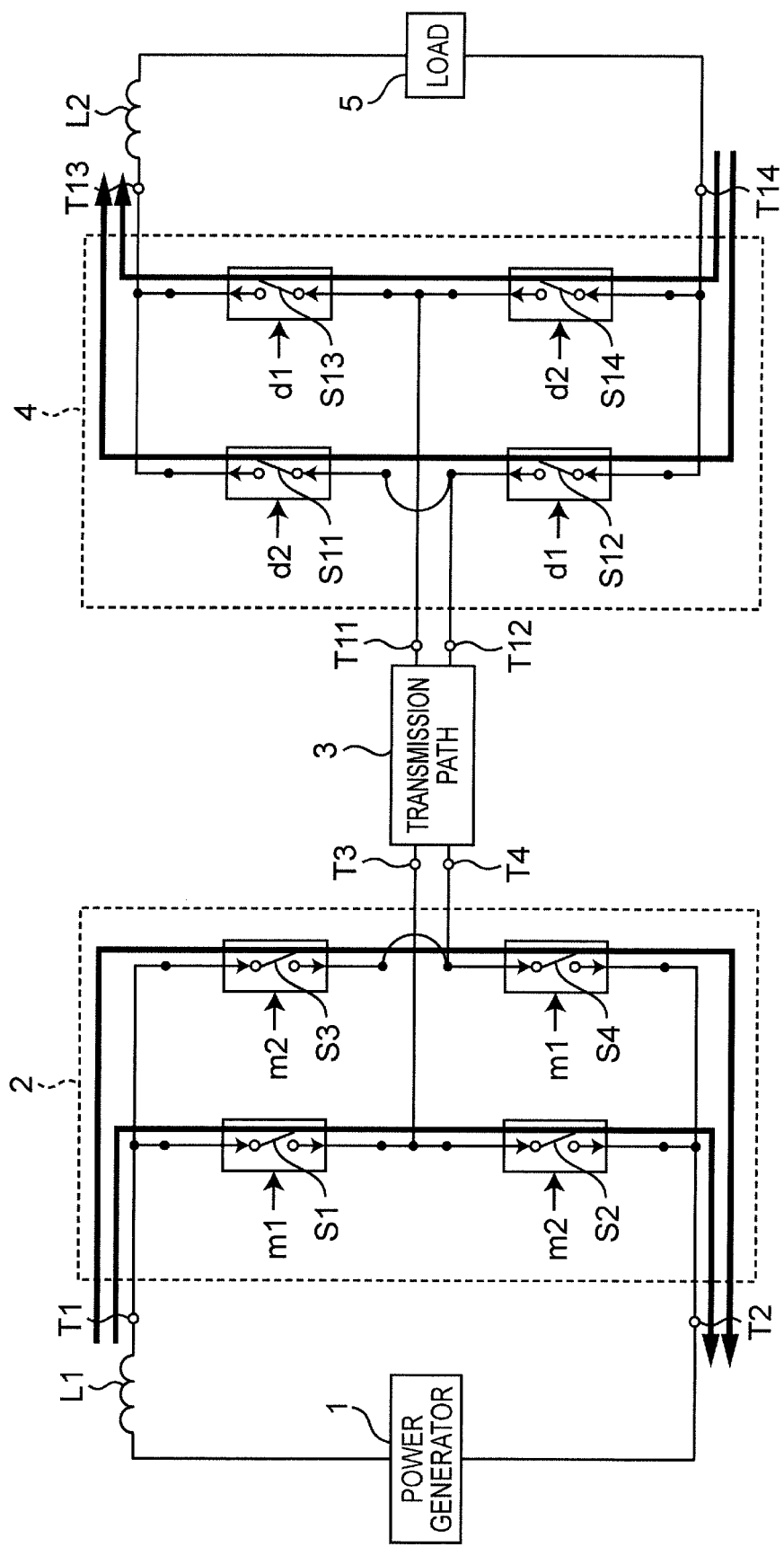
FIG. 26 is a diagram showing current flow in each of time periods P2 and P4 in FIG. 24.

FIG. 26 is a diagram showing current flow in each of the time periods P2 and P4 of FIG. 24. When the code modulation circuit 23 is in the third state, the ports T1 and T2 are short-circuited in the code modulator 2, and a current flowing in the code modulator 2 returns from the port T1 to the port T2. In this case, the switch elements S1 to S4 form a resistive power divider, and therefore, current flows through all paths in the code modulator 2. However, since the current's energy is absorbed by the reactor L1, the switch elements S1 to S4 and the like on the current path are protected. In addition, since the code modulation circuit 23 is set to the third state for a very short time length with reference to the inductance of reactor L1, even when a current flow as shown in FIG. 26, the switch element S1 to S4 and the like on the current path are unlikely to be broken. Note that in practice, when the code modulation circuit 23 is in the third state, a part of the current in the code modulator 2 also flows to the transmission path 3. This current can be ignored, since the amount of this current is smaller than the amount of the current returning from the port T1 to the port T2 through the resistive power divider made of the switch elements S1 to S4, and smaller than the amount of energy absorbed by the reactor L1. Similarly, when the code demodulation circuit 33 is in the sixth state, the ports T13 and T14 are short-circuited in the code demodulator 4, and a current flowing in the code demodulator 4 returns from the port T13 to the port T14.

Figure 27:
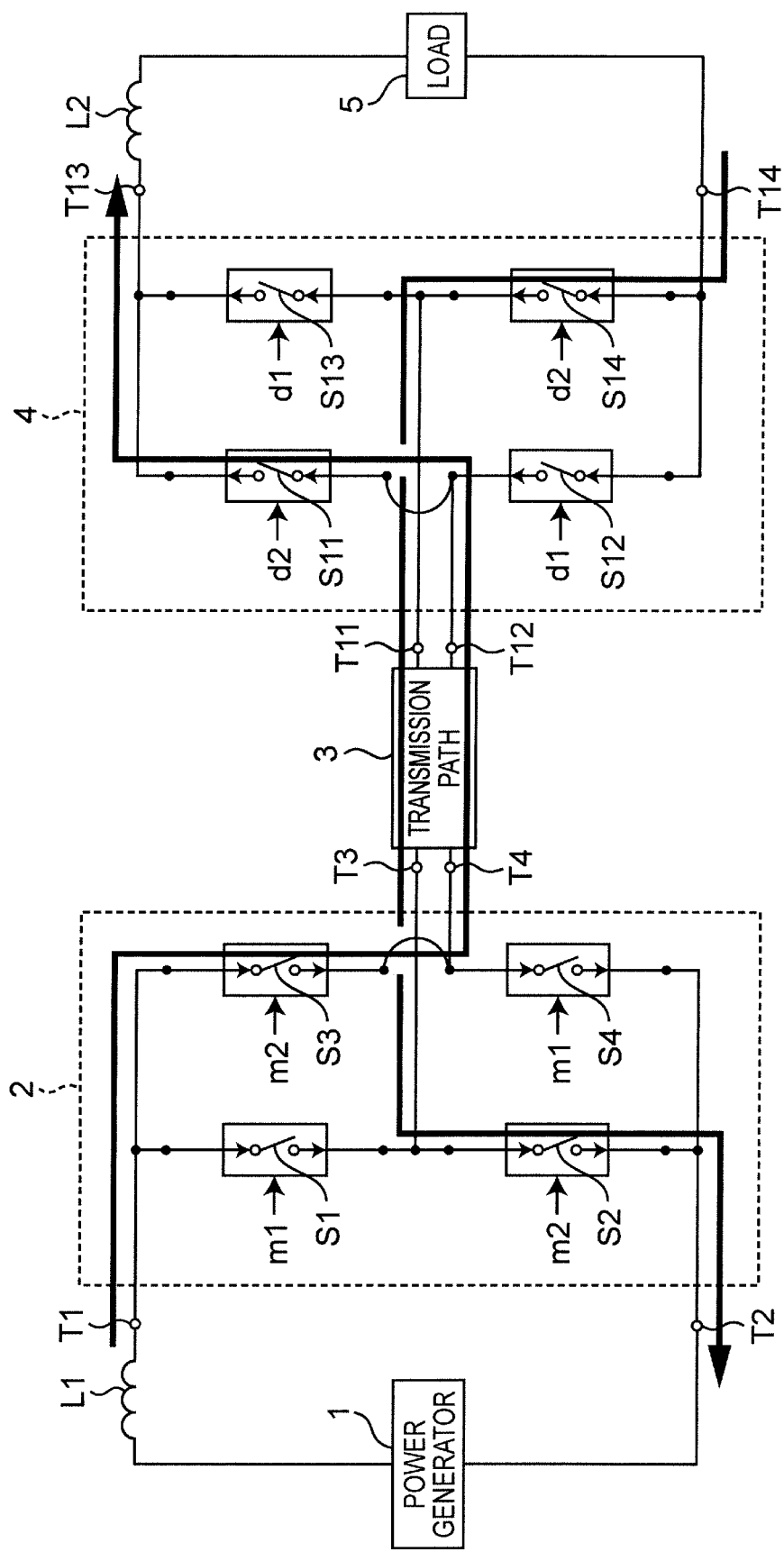
FIG. 27 is a diagram showing current flow in a time period P3 of FIG. 24.

FIG. 27 is a diagram showing current flow in the time period P3 of FIG. 24. In the time period P3, the switch elements S2 and S3 of the code modulator 2 are turned on, and the switch elements S11 and S14 of the code demodulator 4 are turned on. Accordingly, current flows as shown in FIG. 27, and power is supplied to the load 5.

FIGS. 24 to 27 show power transmission without delay in the power transmission system. In the time period P1 of FIG. 24, the code modulation circuit 23 is in the first state, and the code demodulation circuit 33 is in the fourth state (FIG. 25). In the time periods P2 and P4 of FIG. 24, the code modulation circuit 23 is in the third state, and the code demodulation circuit 33 is in the sixth state (FIG. 26). In the time period P3 of FIG. 24, the code modulation circuit 23 is in the second state, and the code demodulation circuit 33 is in the fifth state (FIG. 27).

Figure 28:
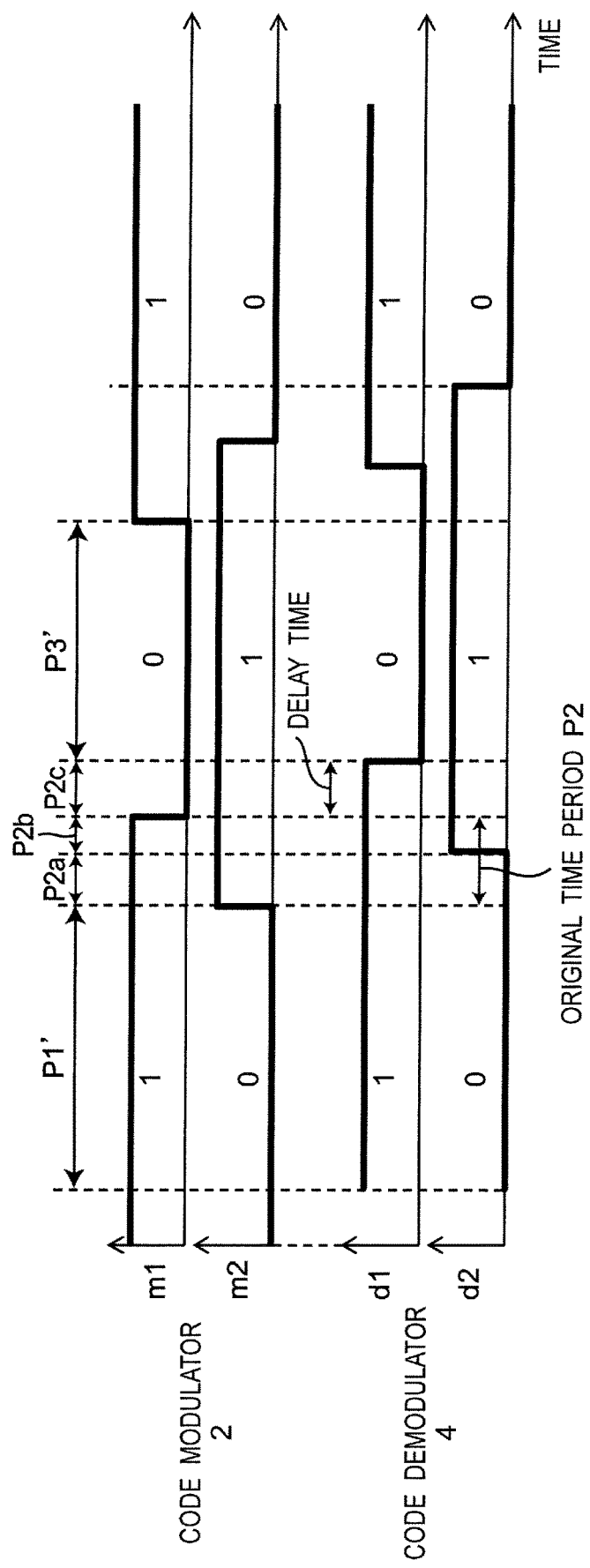
FIG. 28 is a timing chart showing the modulation codes m1 and m2 and the demodulation codes d1 and d2 when a delay shorter than a simultaneous ON time occurs in the power transmission system according to the fourth embodiment.

FIG. 28 is a timing chart showing the modulation codes m1 and m2 and the demodulation codes d1 and d2 when a delay shorter than the simultaneous ON time occurs in the power transmission system according to the fourth embodiment. In the case of FIG. 28, the demodulation codes d1 and d2 are delayed from the modulation codes m1 and m2 by a time length shorter than the simultaneous ON time P2. In a time period P2a of FIG. 28, the code modulation circuit 23 is in the third state (simultaneous ON state), and the code demodulation circuit 33 is in the fourth state. In a time period P2b of FIG. 28, the code modulation circuit 23 is in the third state (simultaneous ON state), and the code demodulation circuit 33 is in the sixth state (simultaneous ON state). In a time period P1c of FIG. 28, the code modulation circuit 23 is in the second state, and the code demodulation circuit 33 is in the sixth state (simultaneous ON state). In addition, in a time period P1' of FIG. 28, the code modulation circuit 23 is in the first state, and the code demodulation circuit 33 is in the fourth state. In a time period P3' of FIG. 28, the code modulation circuit 23 is in the second state, and the code demodulation circuit 33 is in the fifth state.

Accordingly, in the time period P2a, only the code modulator 2 is in the simultaneous ON state. In the time period P2b, both the code modulator 2 and the code demodulator 4 are in the simultaneous ON state. In the time period P2c, only the code demodulator 4 is in the simultaneous ON state.

Figure 29:
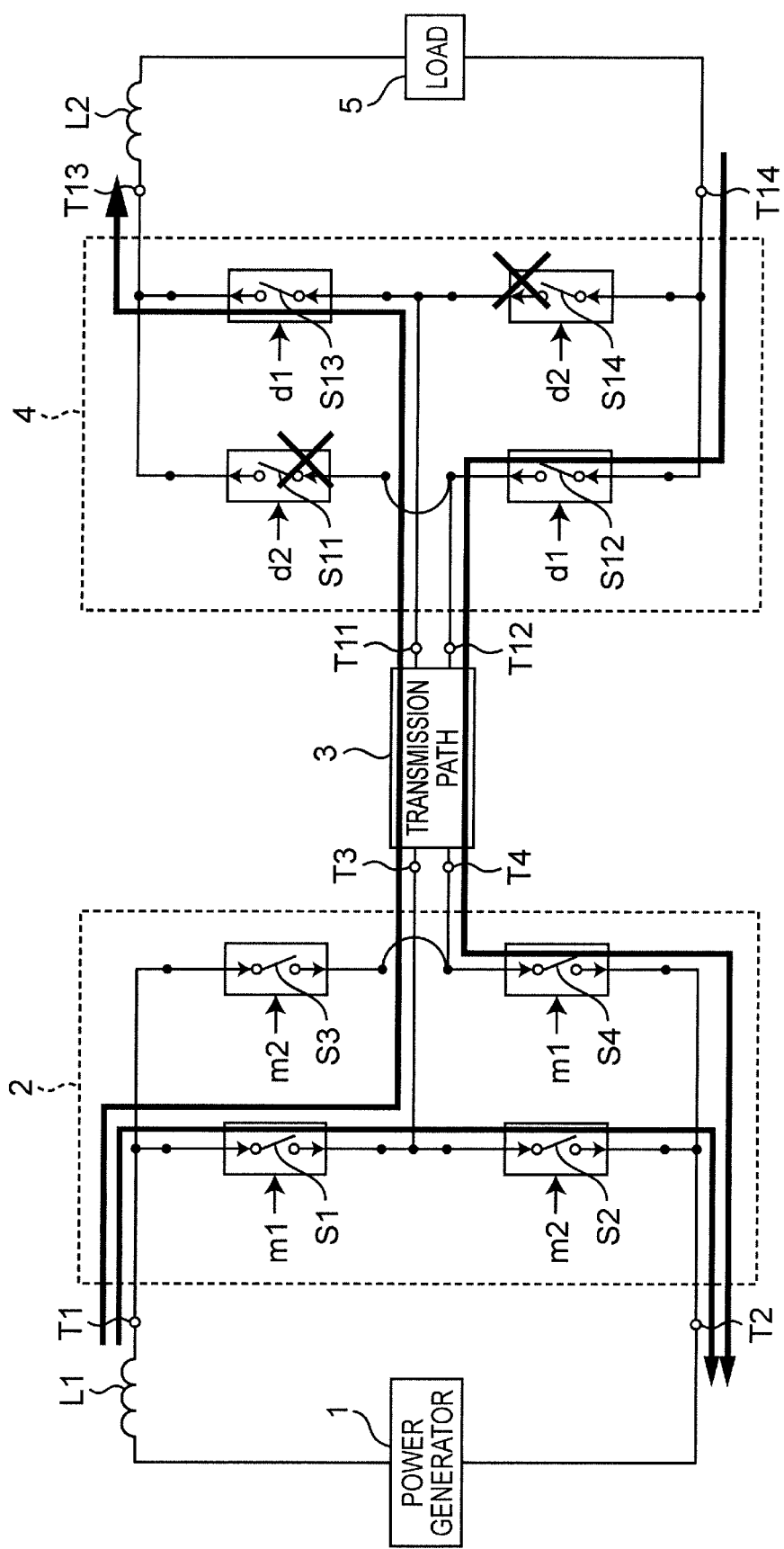
FIG. 29 is a diagram showing current flow in a time period P2a of FIG. 28.

FIG. 29 is a diagram showing current flow in the time period P2a of FIG. 28. A part of generated current is supplied to the load 5 via the transmission path 3, and another part of the generated current returns from the port T1 to the port T2 in the code modulator 2.

In the time period P2c, a current is supplied from the power generator 1 to the load 5 via the transmission path 3, and a current flowing in the code demodulator 4 returns from the port T13 to the port T14.

Accordingly, the currents flowing in the reactors L1 and L2 do not become zero in any of the time periods P1', P2a, P2b (time period in which current flows as shown in FIG. 26), P2c, and P3' of FIG. 28.

Power transmission does not stop, as long as the delay time of the demodulation codes d1 and d2 from the modulation codes m1 and m2 does not exceed the simultaneous ON time (time length of time period P2).

Figure 30:
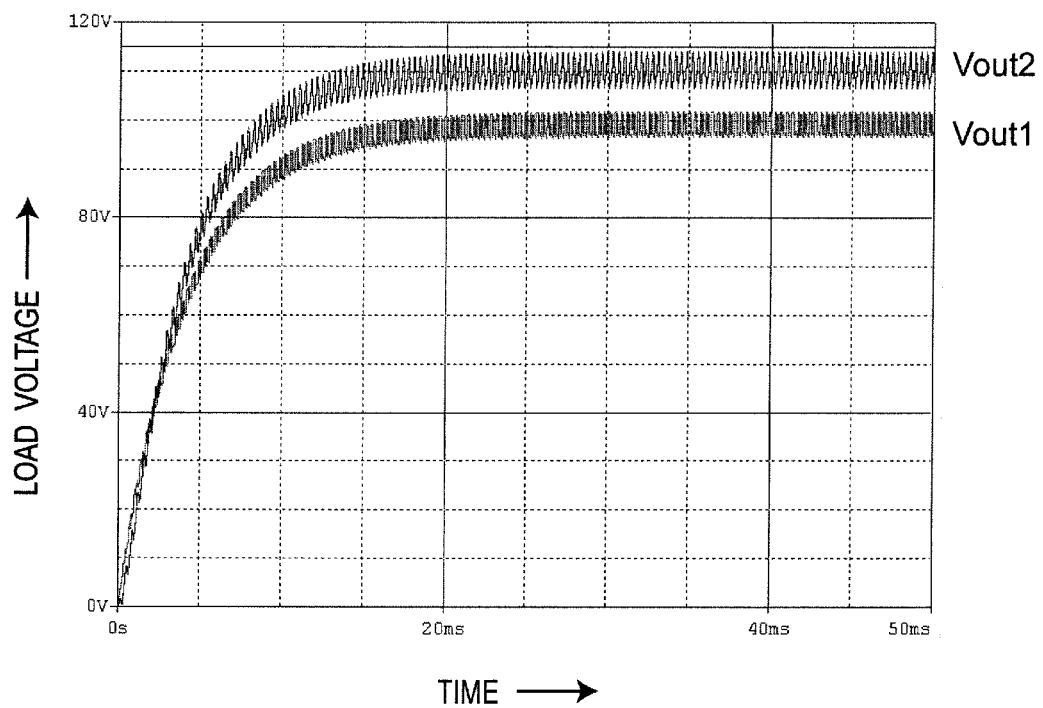
FIG. 30 is a graph showing variations of load voltages Vout1 and Vout2 when power is transmitted without delay in the power transmission system according to the implementation example of the fourth embodiment.
Figure 31:
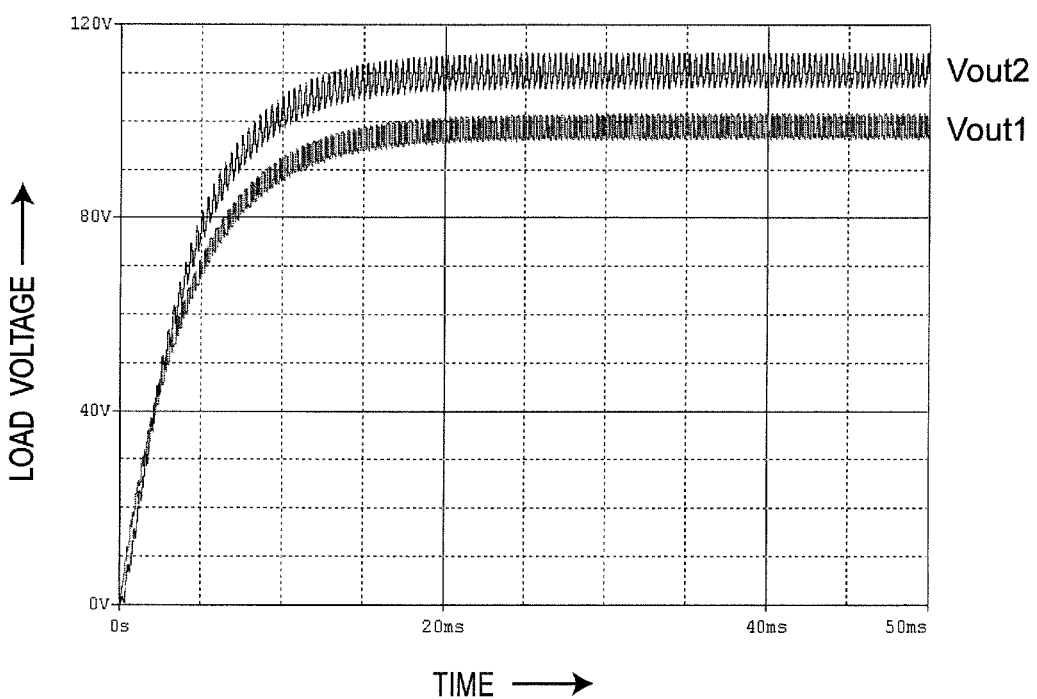
FIG. 31 is a graph showing variations of the load voltages Vout1 and Vout2 when a delay occurs in the power transmission system according to the implementation example of the fourth embodiment.

FIG. 30 is a graph showing variations of the load voltages Vout1 and Vout2 when power is transmitted without delay in the power transmission system according to the implementation example of the fourth embodiment. FIG. 31 is a graph showing variations of the load voltages Vout1 and Vout2 when a delay occurs in the power transmission system according to the implementation example of the fourth embodiment. A simulation was performed for the power transmission system of FIG. 21. In the cases of FIGS. 30 and 31, the simultaneous ON time of the code modulator 2 and the code demodulator 4 was set to 10% of the modulation clock cycle. In the case of FIG. 30, both the pair of code modulator 2-1 and code demodulator 4-1, and the pair of code modulator 2-2 and code demodulator 4-2 use the modulation code and the demodulation code shown in FIG. 24. On the other hand, in the case of FIG. 31, the pair of code modulator 2-2 and code demodulator 4-2 use the modulation code and the demodulation code shown in FIG. 24, but the pair of code modulator 2-1 and code demodulator 4-1 use the modulation code and the demodulation code shown in FIG.

28. In the latter case, the demodulation codes d1 and d2 were delayed from the modulation codes m1 and m2 by a delay time corresponding to 10% of the modulation clock cycle, i.e., a delay time equal to or shorter than the simultaneous ON time. As shown in FIGS. 30 and 31, by introducing the simultaneous ON state to each of the code modulator 2 and the code demodulator 4, no time period occurs in which the generated current and the load current become zero. Accordingly, power transmission is not stopped even when a delay occurs, as long as the delay time does not exceed the simultaneous ON time.

Now, we describe two methods for determining the time length of the simultaneous ON state time.

At first, we describe a first method for determining the time length of the simultaneous ON state. While we have described an exemplary case with the delay between the code modulator 2 and the code demodulator 4, power transmission may be similarly stopped due to an advance in time. In addition to the delay between the code modulator 2 and the code demodulator 4, power transmission may be similarly stopped due to a time difference (delay or advance) among operations of the switch elements S1 to S4 of the code modulator 2, and due to a time difference (delay or advance) among operations of the switch element S11 to S14 of the code demodulator 4. Here, $\Delta t\_Tx$ denotes the time difference (delay or advance) among operations of the switch elements S1 to S4 of the code modulator 2. $\Delta t\_Rx$ denotes the time difference (delay or advance) among operations of the switch elements S11 to S14 of the code demodulator 4. $\Delta t\_Tx-Rx$ denotes the time difference (delay or advance) among the code modulator 2 and the code demodulator 4. These time differences indicate a delay or an advance from a reference time of the power transmission system. In this case, the simultaneous ON time is given as follows.

Simultaneous ON time$\geq \Delta t\_Tx + \Delta t\_Tx-Rx + \Delta t\_Rx$

Accordingly, the time length of the simultaneous ON state is set to be equal to or longer than the sum of: the time difference among operations of the switch elements S1 to S4 of the code modulator 2; the time difference between the code modulator 2 and the code demodulator 4; and the time difference among operations of the switch elements S11 to S14 of the code demodulator 4.

Further, we consider a case where the power transmission system includes a plurality of code modulators 2-$i$ ($1 \leq i \leq M$) and a plurality of code demodulators 4-$j$ ($1 \leq j \leq N$). $\Delta t\_Txi$ denotes a time difference among operations of the switch elements S1 to S4 of the code modulator 2-$i$. $\Delta t\_Rxj$ denotes a time difference among operations of the switch elements S11 to S14 of the code demodulator 4-$j$. $\Delta t\_Txi-Rxj$ denotes a time difference between the code modulator 2-$i$ and the code demodulator 4-$j$. In this case, the simultaneous ON time is given as follows.

Simultaneous ON time$\geq \max(\Delta t\_Txi + \Delta t\_Txi-Rxj + \Delta t\_Rxj)$ In this case, a maximum of the right side is calculated for varying "i" and "j".

Accordingly, the time length of the simultaneous ON state is set to be equal to or longer than the sum of: a maximum of the time differences each among operations of the switch elements S1 to S4 of each one of the code modulators 2; a maximum of the time differences each between one of the code modulators and one of the code demodulators; and a maximum of the time differences each among operations of the switch elements S11 to S14 of each one of the code demodulators 4.

Figure 32:
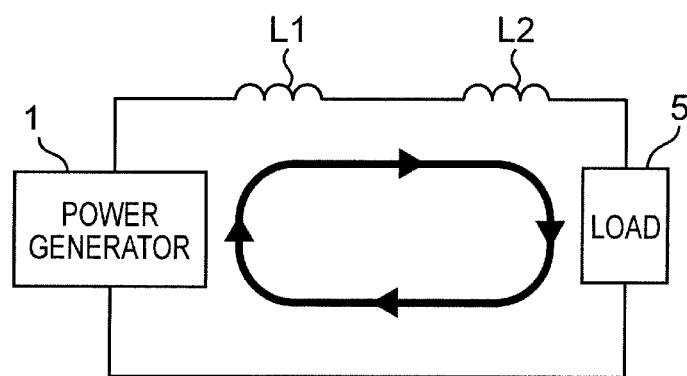
FIG. 32 is an equivalent circuit diagram when the power transmission system according to the fourth embodiment is in a state as shown in FIG. 25 or FIG. 27.
Figure 33:
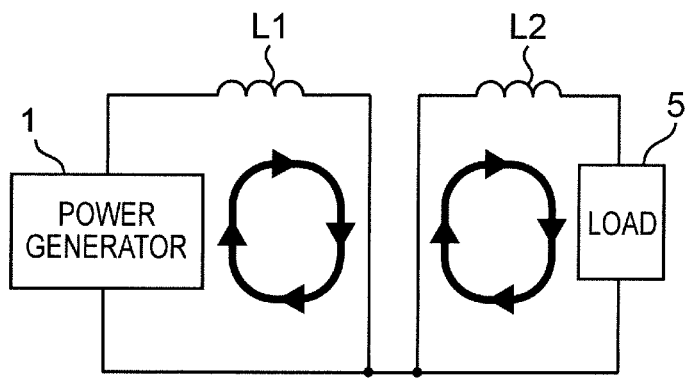
FIG. 33 is an equivalent circuit diagram when the power transmission system according to the fourth embodiment is in a state as shown in FIG. 26.
Figure 34:
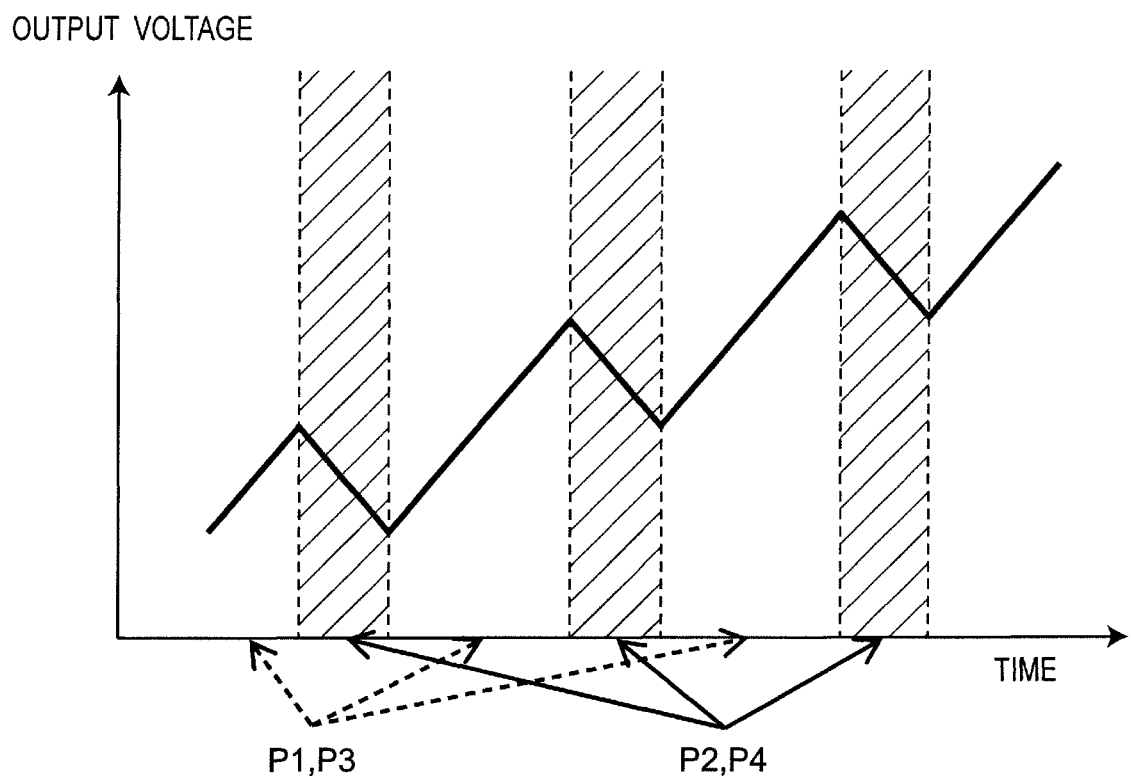
FIG. 34 is a schematic diagram showing variations of output voltage when time periods of FIGS. 32 and 33 are alternated.

Next, with reference to FIGS. 32 to 34, we describe a second method for determining the time length of the simultaneous ON state.

FIG. 32 is an equivalent circuit diagram when the power transmission system according to the fourth embodiment is in the state as shown in FIG. 25 or FIG. 27. FIG. 33 is an equivalent circuit diagram when the power transmission system according to the fourth embodiment is in the state as shown in FIG. 26. FIG. 34 is a schematic diagram showing variations of output voltage when time periods of FIGS. 32 and 33 are alternated.

In general, in a circuit including a reactor having an inductance value L, a change of current $\Delta i$ and a change of output voltage $\Delta Vo$ for a time period $\Delta t$ are given as follows.

Change of Current: $\Delta i = 1/L \times \Delta v \times \Delta t$

Change of output voltage: $\Delta Vo = Z \times \Delta i = Z \times \Delta v \times \Delta t / L$ Where $\Delta v$ denotes a change of voltage of the reactor for an infinitesimal time $\Delta t$, and Z denotes an impedance of the load 5.

In the case of FIG. 32, a change of the load voltage $\Delta Vo\_1$ in a time period $\Delta t\_1$ is proportional to $\Delta t\_1/(L1+L2)$. In the case of FIG. 33, a change of the load voltage $\Delta Vo\_2$ in a time period $\Delta t\_2$ is proportional to $\Delta t\_2/L2$. Here, the time period $\Delta t\_2$ denotes the simultaneous ON time of the code demodulator 4, and the time period $\Delta t\_1$ denotes a time length remaining after subtracting the simultaneous ON time from the modulation clock cycle of the code demodulator 4. Since $\Delta Vo\_1 > \Delta Vo\_2$ always holds, the following inequality is obtained.

$\Delta t\_1/(L1+L2) > \Delta t\_2/L2$

This inequality is transformed as follows, as a condition on a time length of the simultaneous ON state.

$\Delta t\_2/\Delta t\_1 < L2/(L1+L2)$

Accordingly, in the code demodulator 4, a ratio of the time length of the sixth state to the total time length of the fourth and fifth states is set to be smaller than a ratio of the inductance of the second reactor to the sum of the inductances of the first and second reactors.

Figure 35:
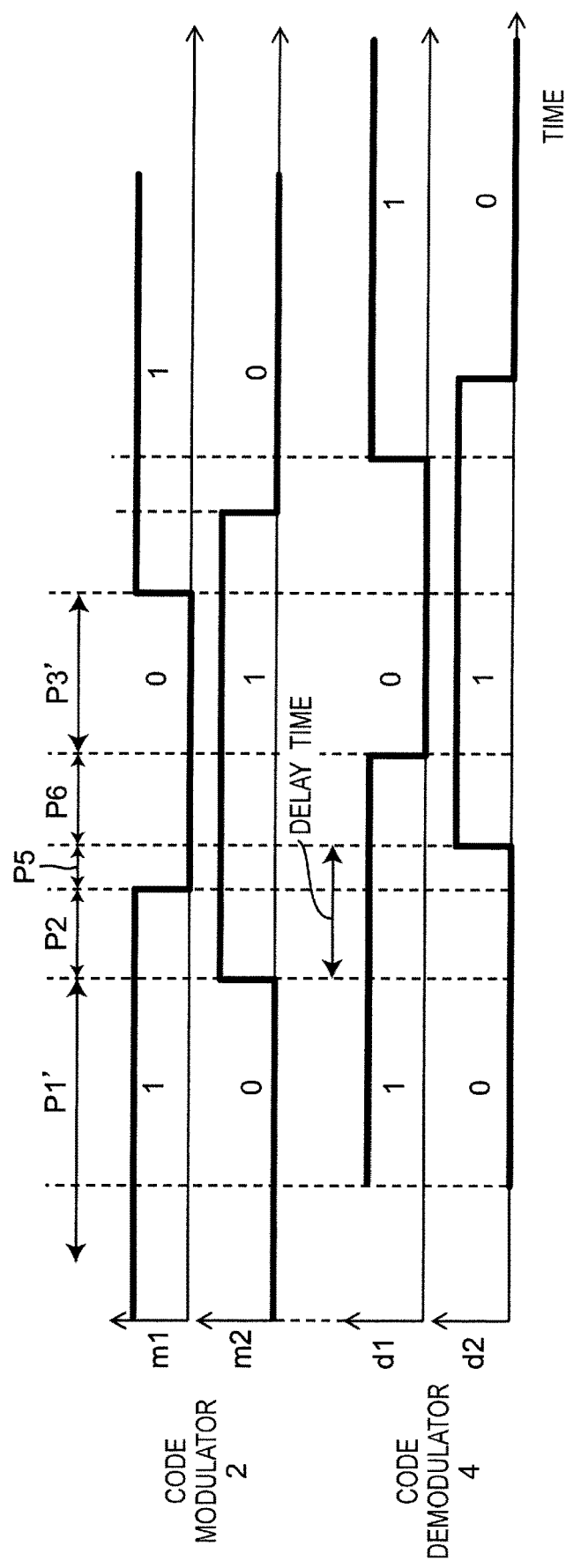
FIG. 35 is a timing chart showing the modulation codes m1 and m2 and the demodulation codes d1 and d2 when a delay longer than the simultaneous ON time occurs in the power transmission system according to the fourth embodiment.

FIG. 35 is a timing chart showing the modulation codes m1 and m2 and the demodulation codes d1 and d2 when a delay longer than the simultaneous ON time occurs in the power transmission system according to the fourth embodiment. In the case of FIG. 35, the demodulation codes d1 and d2 are delayed from the modulation codes m1 and m2 by a time length longer than the simultaneous ON time P2. In this case, such a time period in which power can not be supplied from the power generator 1 to the load 5 occurs in a manner similar to that of FIG. 19(b). In the time period P2 of FIG. 35, the code modulation circuit 23 is in the third state (simultaneous ON state), and the code demodulation circuit 33 is in the fourth state. In a time period P5 of FIG. 35, the code modulation circuit 23 is in the second state, and the code demodulation circuit 33 is in the fourth state. In a time period P6 of FIG. 35, the code modulation circuit 23 is in the second state, and the code demodulation circuit 33 is in the sixth state (simultaneous ON state). In the time period P5, power can not be supplied to the load 5, since the switch elements S11 and S14 of the code demodulator 4 are turned off even when the switch elements S2 and S3 of the code modulator 2 are turned on, as shown in FIG. 20.

According to the power transmission system of the fourth embodiment, by introducing the simultaneous ON state to each of the code modulator 2 and the code demodulator 4, it is possible to prevent power transmission efficiency from degrading due to a delay between the code modulator 2 and the code demodulator 4.

According to the power transmission system of the fourth embodiment, power transmission is not stopped even when a delay occurs, as long as the delay time does not exceed the simultaneous ON time.

If there is a time period in which all the switch elements are turned off in the code modulator 2 or the code demodulator 4, then a surge may occur, and a noise may increase. According to the power transmission system of the fourth embodiment, since there is no time period in which all the switch elements are turned off, it is possible to improve safety of the code modulator 2 and the code demodulator 4.

Fifth Embodiment

In the fourth embodiment, the simultaneous ON state is set to both the code modulator 2 and the code demodulator 4. On the other hand, in the fifth embodiment, we describe a case where the simultaneous ON state is set to only the code modulator 2.

Figure 36:
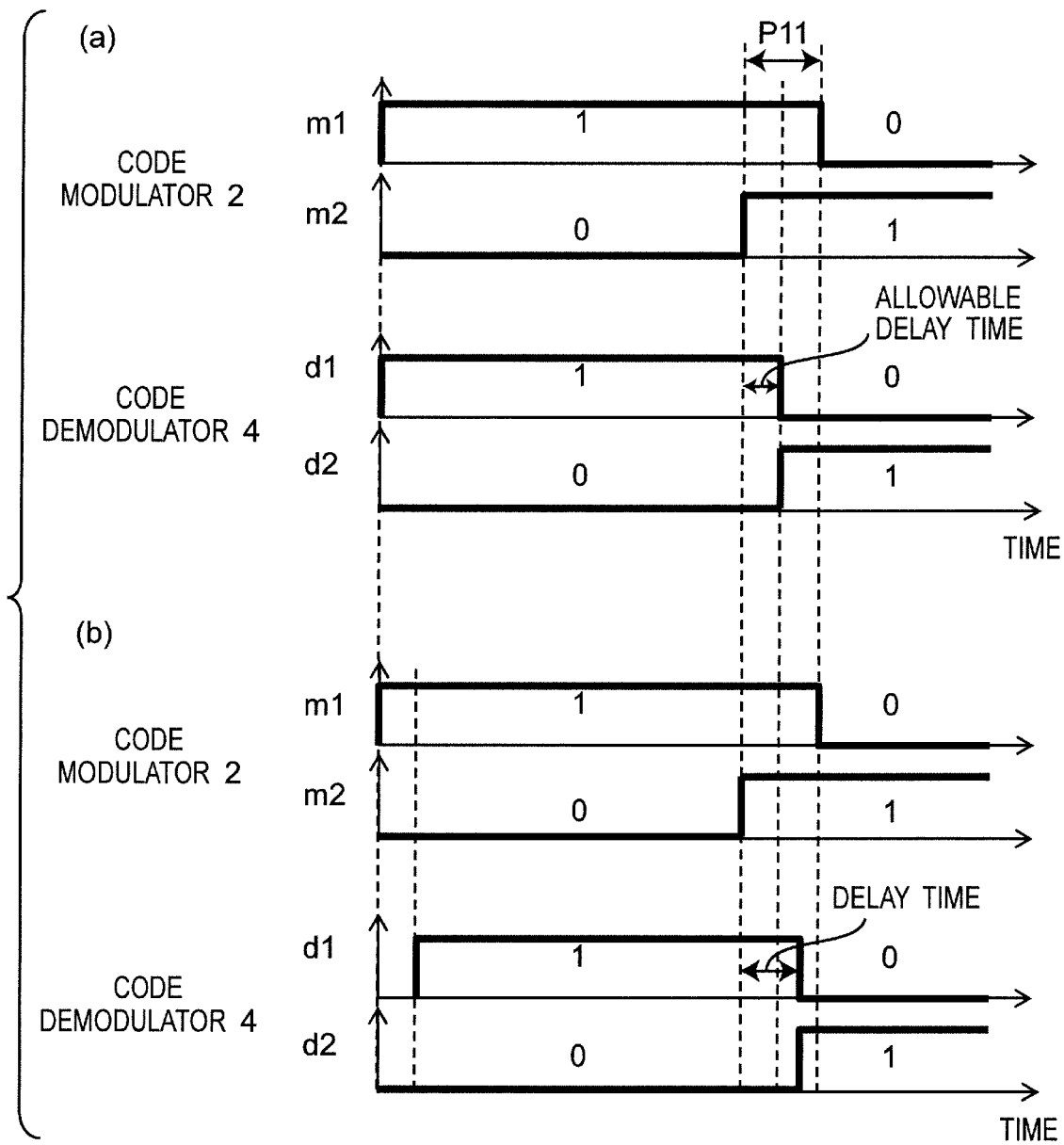
FIG. 36 is a timing chart showing modulation codes m1 and m2 and demodulation codes d1 and d2 used in a power transmission system according to a fifth embodiment, in which: (a) shows a case where a delay equal to or shorter than an allowable delay time occurs; and (b) shows a case where a delay longer than the allowable delay time occurs.

FIG. 36 is a timing chart showing the modulation codes m1 and m2 and the demodulation codes d1 and d2 used in a power transmission system according to the fifth embodiment. In FIG. 36, (a) shows a case where a delay equal to or shorter than an allowable delay time occurs, and (b) shows a case where a delay longer than the allowable delay time occurs. The allowable delay time indicates, for example, a time difference among operations of the switch elements S11 to S14 of the code demodulator 4. When the power transmission system includes a plurality of the code demodulators 4, the allowable delay time indicates a maximum of time differences each among operations of the switch elements S11 to S14 of each one of the code demodulators 4. A simultaneous ON time P11 of the code modulator 2 is set to twice or more the allowable delay time. Power transmission is not stopped even when the demodulation codes d1 and d2 is delayed from the modulation codes m1 and m2, as long as the delay time does not exceed the allowable delay time.

Figure 37:
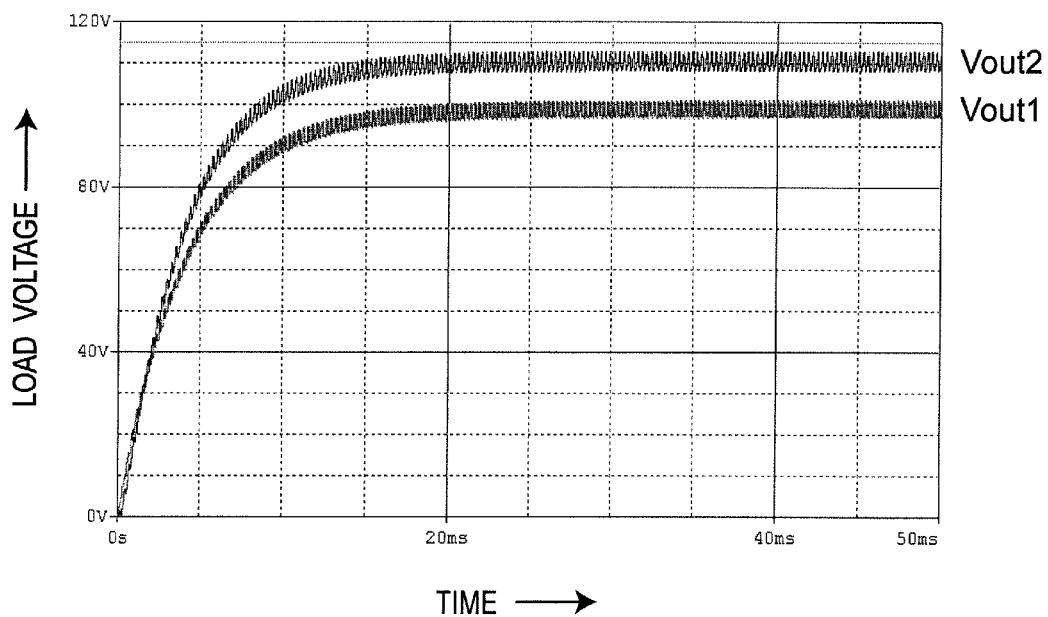
FIG. 37 is a graph showing variations of load voltages Vout1 and Vout2 when a delay longer than the allowable delay time does not occur in a power transmission system according to an implementation example of the fifth embodiment.
Figure 38:
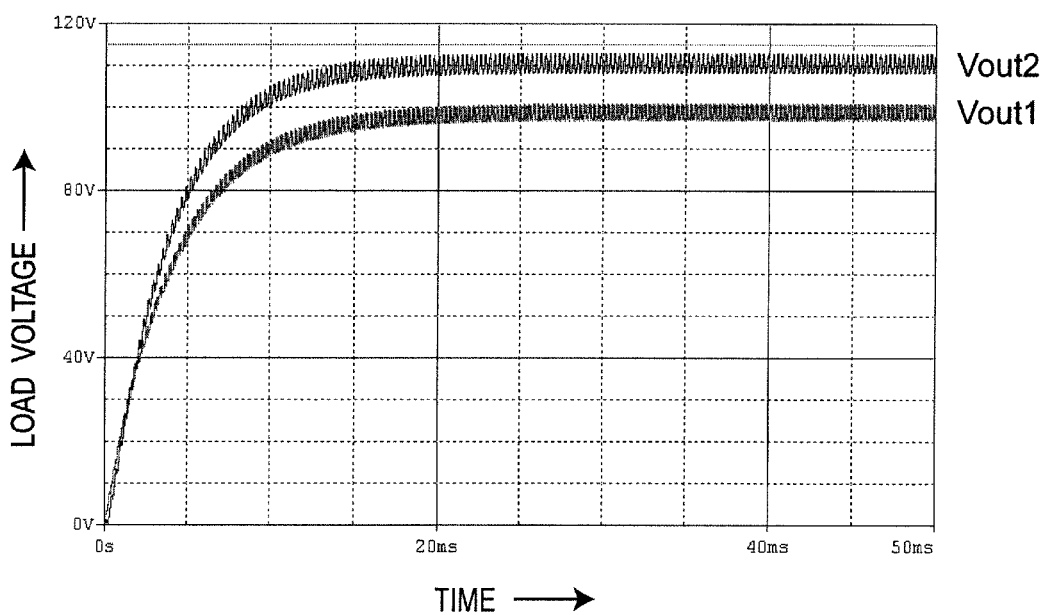
FIG. 38 is a graph showing variations of the load voltages Vout1 and Vout2 when a delay longer than the allowable delay time does not occur in the power transmission system according to the implementation example of the fifth embodiment.
Figure 39:
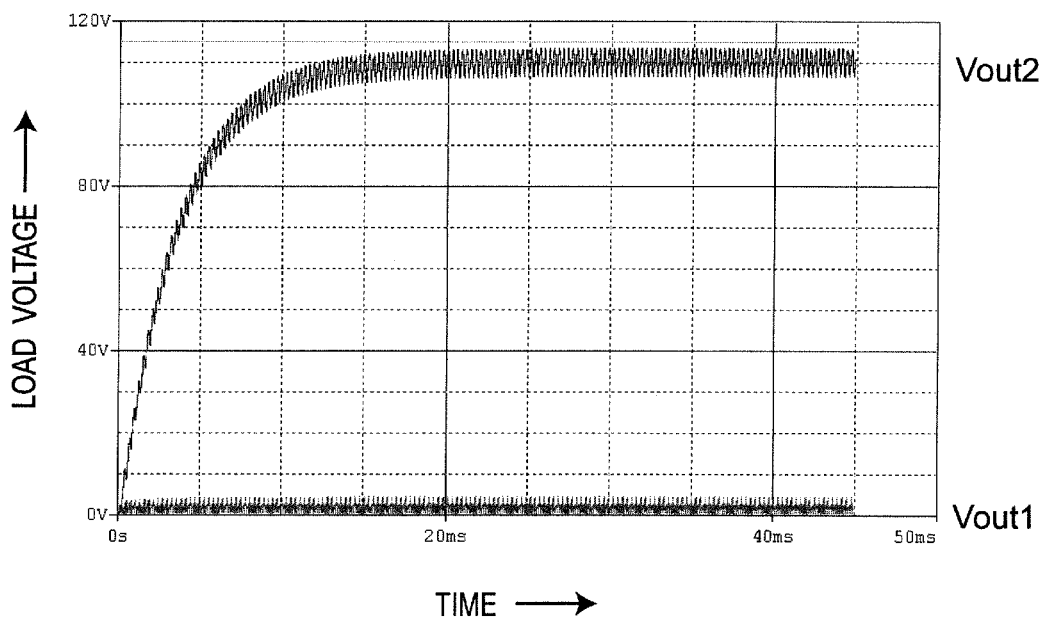
FIG. 39 is a graph showing variations of the load voltages Vout1 and Vout2 when a delay longer than the allowable delay time occurs in the power transmission system according to the implementation example of the fifth embodiment.
Figure 40:
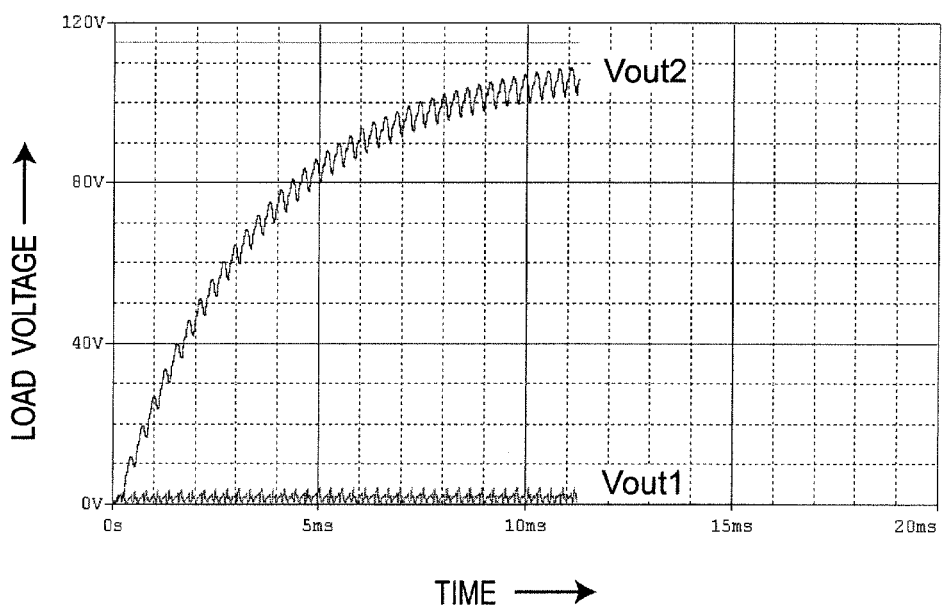
FIG. 40 is a graph showing variations of the load voltages Vout1 and Vout2 when a delay longer than the allowable delay time occurs in the power transmission system according to the implementation example of the fifth embodiment.

FIG. 37 is a graph showing variations of the load voltages Vout1 and Vout2 when a delay longer than the allowable delay time does not occur in a power transmission system according to an implementation example of the fifth embodiment. FIG. 38 is a graph showing variations of the load voltages Vout1 and Vout2 when a delay longer than the allowable delay time does not occur in the power transmission system according to the implementation example of the fifth embodiment. FIG. 39 is a graph showing variations of the load voltages Vout1 and Vout2 when a delay longer than the allowable delay time occurs in the power transmission system according to the implementation example of the fifth embodiment. FIG. 40 is a graph showing variations of the load voltages Vout1 and Vout2 when a delay longer than the allowable delay time occurs in the power transmission system according to the implementation example of the fifth embodiment. A simulation was performed for the power transmission system of FIG. 21. In the cases of FIGS. 37 to 40, the simultaneous ON time of the code modulator 2 was set to 10% of the modulation clock cycle.

In the case of FIG. 37, in both the pair of code modulator 2-1 and code demodulator 4-1, and the pair of code modulator 2-2 and code demodulator 4-2, the demodulation codes d1 and d2 were delayed from the modulation codes m1 and m2 by 1% of the modulation clock cycle.

In the case of FIG. 38, in the pair of code modulator 2-1 and code demodulator 4-1, the demodulation codes d1 and d2 were delayed from the modulation codes m1 and m2 by 5% of the modulation clock cycle; and in the pair of code modulator 2-2 and code demodulator 4-2, the demodulation codes d1 and d2 were synchronized with the modulation codes m1 and m2.

In the case of FIG. 39, in the pair of code modulator 2-1 and code demodulator 4-1, the demodulation codes d1 and d2 were delayed from the modulation codes m1 and m2 by 6% of the modulation clock cycle; and in the pair of code modulator 2-2 and code demodulator 4-2, the demodulation codes d1 and d2 were synchronized with the modulation codes m1 and m2.

In the case of FIG. 40, in the pair of code modulator 2-1 and code demodulator 4-1, the demodulation codes d1 and d2 were delayed from the modulation codes m1 and m2 by 10% of the modulation clock cycle; and in the pair of code modulator 2-2 and code demodulator 4-2, the demodulation codes d1 and d2 were synchronized with the modulation codes m1 and m2.

As shown in FIGS. 37 to 40, by introducing the simultaneous ON state to the code modulator 2, power transmission is not stopped even when a delay occurs, as long as the delay time does not exceed the allowable delay time.

The time length of the simultaneous ON state of the code modulator 2 is set to twice or more the delay time of the code demodulator 4. When the power transmission system includes a plurality of the code demodulators 4, the time length of the simultaneous ON state of the code modulator 2 is set to twice or more a maximum of the delay times of the code demodulators 4.

Figure 41:
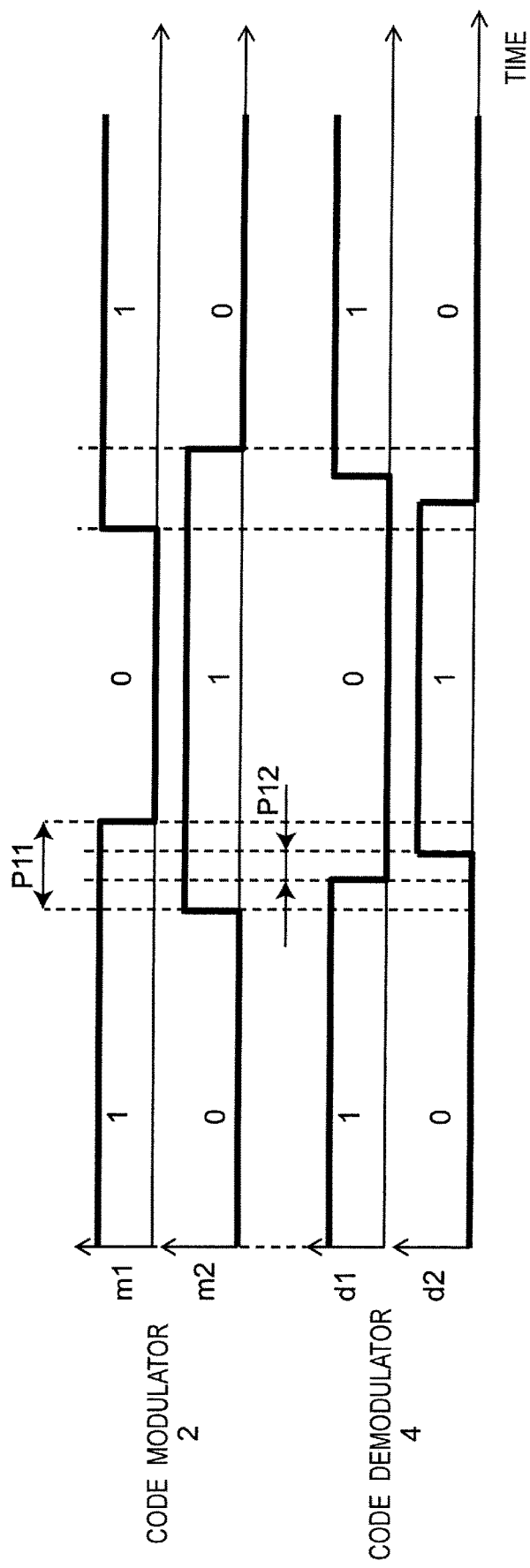
FIG. 41 is a timing chart showing modulation codes m1 and m2 and demodulation codes d1 and d2 used in a power transmission system according to a comparison example of the fifth embodiment.

FIG. 41 is a timing chart showing the modulation codes m1 and m2 and the demodulation codes d1 and d2 used in a power transmission system according to a comparison example of the fifth embodiment. According to the fifth embodiment, power can not be transmitted when all the switch elements S11 to S14 of the code demodulator 4 are turned off for any time period P12 due to desynchronization of the demodulation codes d1 and d2 or other reasons.

According to the power transmission system of the fifth embodiment, by introducing the simultaneous ON state of the code modulator 2, it is possible to prevent power transmission efficiency from degrading due to a delay between the code modulator 2 and the code demodulator 4.

Sixth Embodiment

In the fifth embodiment, the simultaneous ON state is set to only the code modulator 2. On the other hand, in a sixth embodiment, we describe a case where the simultaneous ON state is set to only the code demodulator 4.

Figure 42:
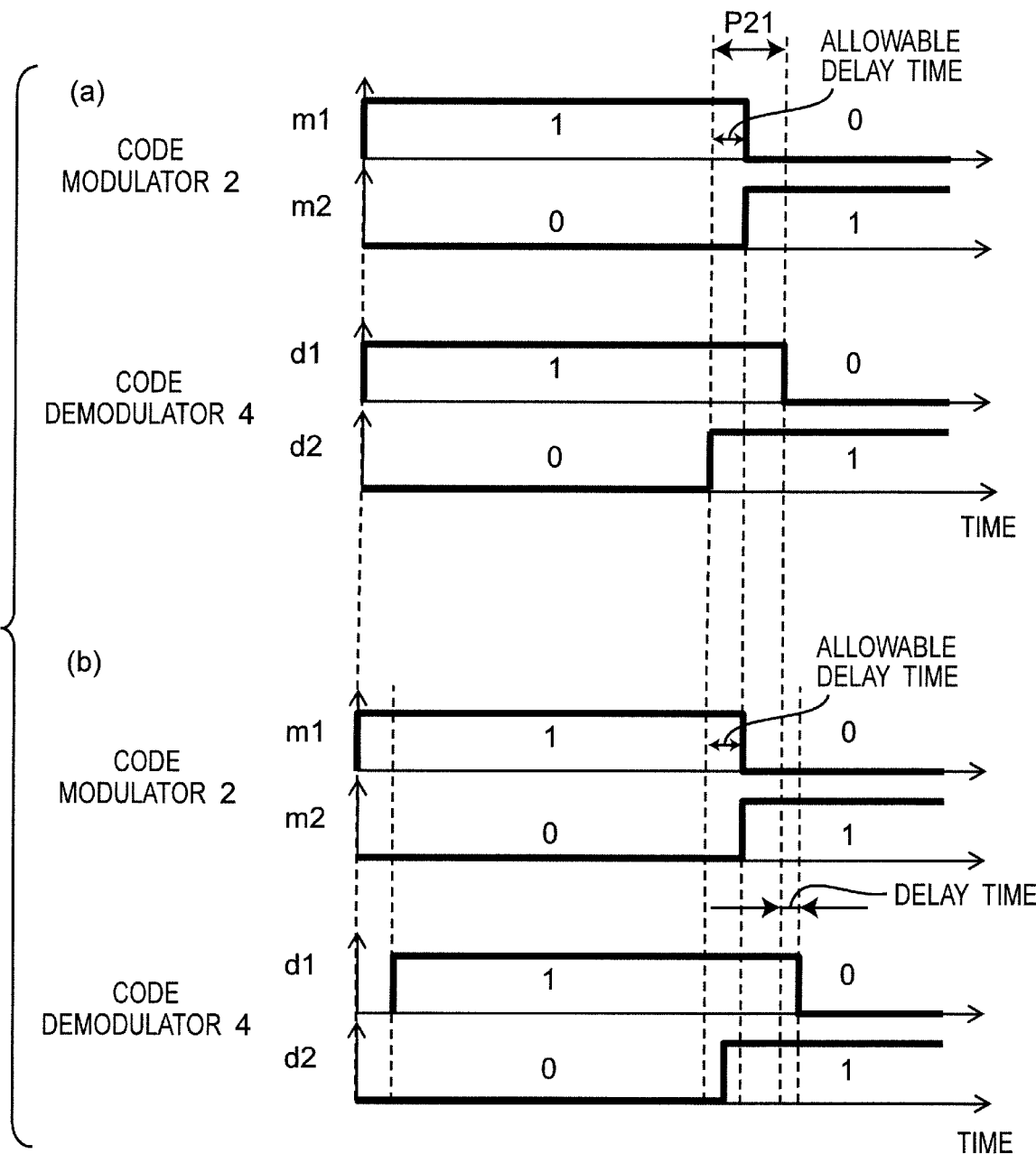
FIG. 42 is a timing chart showing modulation codes m1 and m2 and demodulation codes d1 and d2 used in a power transmission system according to a sixth embodiment, in which: (a) shows a case where a delay equal to an allowable delay time occurs; and (b) shows a case where a delay shorter than the allowable delay time occurs.

FIG. 42 is a timing chart showing the modulation codes m1 and m2 and the demodulation codes d1 and d2 used in a power transmission system according to the sixth embodiment. In FIG. 42, (a) shows a case where a delay equal to an allowable delay time occurs, and (b) shows a case where a delay shorter than the allowable delay time occurs. The allowable delay time indicates, for example, a time difference among operations of the switch elements S1 to S4 of the code modulator 2. When the power transmission system includes a plurality of the code modulators 2, the allowable delay time indicates a maximum of time differences each among operations of the switch elements S1 to S4 of each one of the code modulators 2. A simultaneous ON time P21 of the code modulator 2 is set to twice or more the allowable delay time. Power transmission is not stopped even when the demodulation codes d1 and d2 is delayed from the modulation codes m1 and m2, as long as the delay time does not exceed the allowable delay time.

Figure 43:
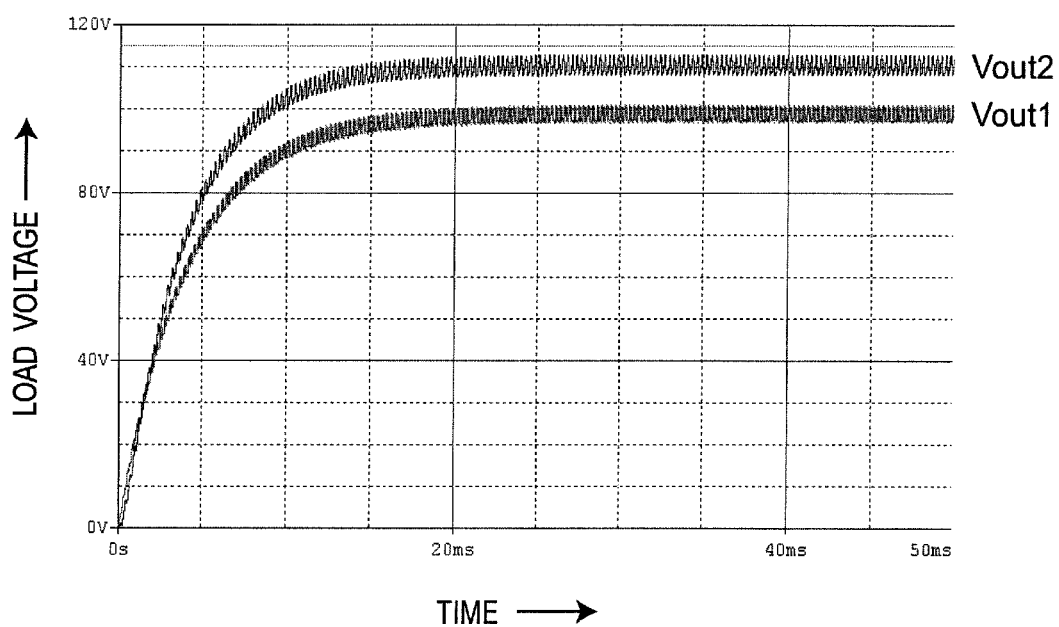
FIG. 43 is a graph showing variations of load voltages Vout1 and Vout2 when a delay longer than the allowable delay time does not occur in a power transmission system according to an implementation example of the sixth embodiment.

FIG. 43 is a graph showing variations of the load voltages Vout1 and Vout2 when a delay longer than the allowable delay time does not occur in a power transmission system according to an implementation example of the sixth embodiment. A simulation was performed for the power transmission system of FIG. 21. In the case of FIG. 43, the simultaneous ON time of the code demodulator 4 was set to 10% of the modulation clock cycle. In the case of FIG. 43, in the pair of code modulator 2-1 and code demodulator 4-1, the demodulation codes d1 and d2 were delayed from the modulation codes m1 and m2 by 1% of the modulation clock cycle; and in the pair of code modulator 2-2 and code demodulator 4-2, the demodulation codes d1 and d2 were synchronized with the modulation codes m1 and m2. As shown in FIG. 43, by introducing the simultaneous ON state to the code demodulator 4, power transmission is not stopped even a delay occurs, as long as the delay time does not exceed the allowable delay time.

The time length of the simultaneous ON state of the code demodulator 4 is set to twice or more the delay time of the code modulator 2. When the power transmission system includes a plurality of the code modulators 2, the time length of the simultaneous ON state of the code demodulator 4 is set to twice or more a maximum of the delay times of the code modulators 2.

According to the power transmission system of the sixth embodiment, by introducing the simultaneous ON state to the code demodulator 4, it is possible to prevent power transmission efficiency from degrading due to a delay between the code modulator 2 and the code demodulator 4.

In the fourth to sixth embodiments, we have described the power transmission system similar to the first embodiment, including the DC power supply and the DC load. The present disclosure is also applicable to a power transmission system similar to the second embodiment, including an AC power supply and an AC load. In the code modulator 2A provided with the code modulation circuit 23A of FIG. 10, the control circuit 20 sets first to third states to the code modulation circuit 23A, the first to third states indicating different states of switch circuits SS21 to SS24. In the first state, the switch circuits SS21 and SS24 are turned on, and the second and third switch circuits SS22 and SS23 are turned off. In the second state, the switch circuits SS21 and SS24 are turned off, and the switch circuits SS22 and SS23 are turned on. In the third state, all the switch circuits SS21 to SS24 are turned on during transition from the first state to the second state, and during transition from the second state to the first state. In the decode modulator 4A provided with the code demodulation circuit 33A of FIG. 11, the control circuit 30 sets fourth to sixth states to the code demodulation circuit 33A, the fourth to sixth states indicating different states of switch circuits SS31 to SS34. In the fourth state, the switch circuits SS31 and SS34 are turned off, and the switch circuits SS32 and SS33 are turned on. In the fifth state, the switch circuits SS31 and SS34 are turned on, and the switch circuits SS32 and SS33 are turned off. In the sixth state, all the switch circuits SS31 to SS34 are turned on during transition from the fourth state to the fifth state, and during transition from the fifth state to the fourth state.

In the fourth to sixth embodiments, the code modulator 2, the code demodulator 4, and the controller 10 are synchronized with each other in some manner before starting power transmission. Next, we describe an operation of the power transmission system according to the fourth to sixth embodiments, including transmitting and receiving control signals for preparation for power transmission, in particular, for synchronization of the code modulator 2 and the code demodulator 4.

Each of Patent Documents 1 to 3 describes time synchronization of an entire power transmission system. However, in order to transmit power modulated by code modulation, it is necessary not only to synchronize in time the entire power transmission system, but also to synchronize demodulation of the code demodulator 4 with the phase of received power, in consideration of the travel time from the code modulator 2 to the code demodulator 4. If the demodulation of the code demodulator 4 is not synchronized with the phase of the received power, the a loss occurs during demodulation of the received power. According to the power transmission system of FIG. 1, the phase is synchronized by means of communication between the power line communication circuit 24 of the code demodulator 4 and the power line communication circuit 34 of the code demodulator 4.

According to the power transmission system of FIG. 1, power is generated by the power generator 1, the generated power is modulated by the code modulator 2, the modulated power is transmitted to the code demodulator 4 via the transmission path 3 and demodulated by the code demodulator 4, and then, the demodulated power is supplied to the load 5. Now, we describe an exemplary case of phase synchronization of the code demodulator 4, in which the transmission path 3 between the code modulator 2 and the code demodulator 4 has a path length L1, and it takes a travel time of Δt1 to transmit power modulated by the code modulator 2 via the transmission path 3. In this case, by delaying a start time of demodulation of the code demodulator 4 from a start time of modulation of the code demodulator 4 by Δt1 seconds, it is possible to start demodulation just at a time when modulated power having transmitted over the transmission path 3 arrives at the code demodulator 4, and thus, it is possible to demodulate power in an efficient manner. As described above, in the power transmission system of FIG. 1, it is important to surely synchronize the demodulation of the code demodulator 4 with the phase of received power.

Figure 44:
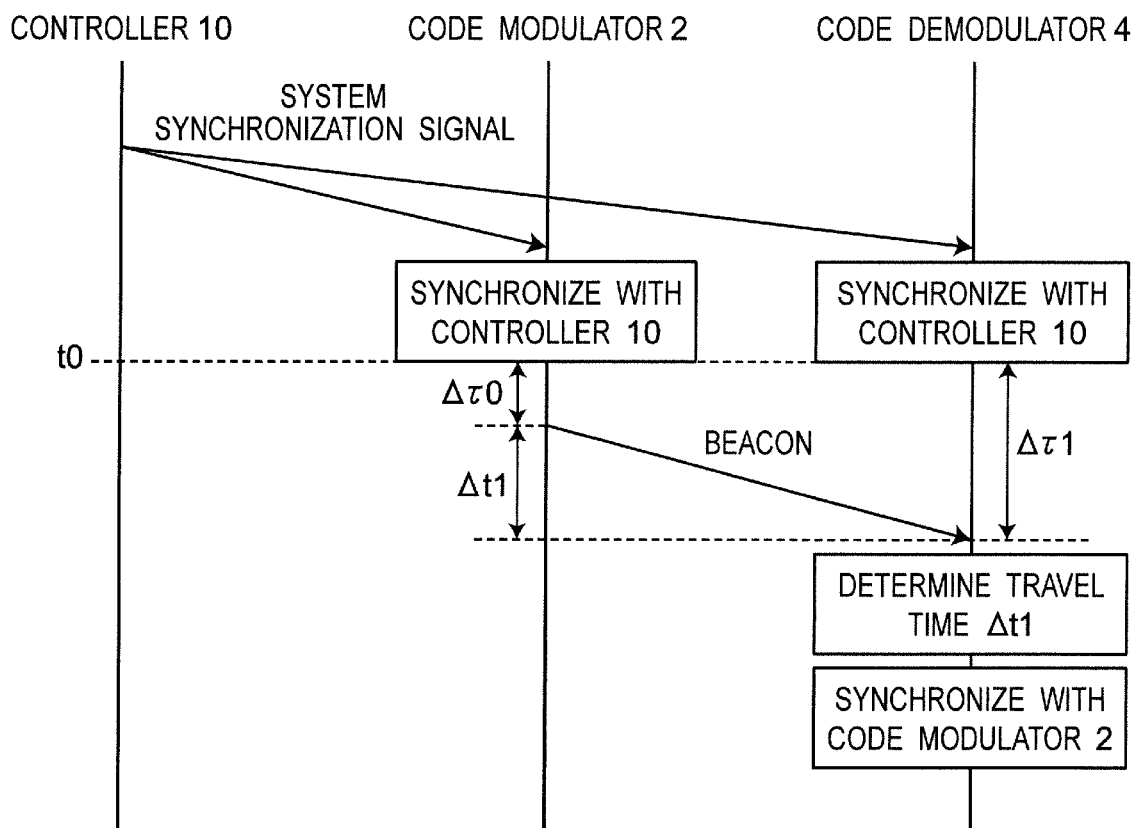
FIG. 44 is a sequence diagram showing a process of synchronizing a controller 10, a code modulator 2, and a code demodulator 4 in the power transmission system according to each of the fourth to sixth embodiments.

FIG. 44 is a sequence diagram showing a process of synchronizing the controller 10, the code modulator 2, and the code demodulator 4 in the power transmission system according to each of the fourth to sixth embodiments. In this case, control signals for establishing synchronization are transmitted from the code modulator 2 to the code demodulator 4 via the transmission path 3. Each of the code modulator 2 and the code demodulator 4 may be provided with a power line communication circuit in order to transmit and receive the control signals. The control signals are transmitted from the power line communication circuit of the code modulator 2, and received by the power line communication circuit of the code demodulator 4 via the transmission path 3. The code demodulator 4 receives the control signals from the code modulator 2 via the transmission path 3 to measure a travel time Δt1 from the code modulator 2 to the code demodulator 4 via the transmission path 3.

Specifically, for example, the controller 10 transmits a system synchronization signal as a reference signal for synchronization of the entire power transmission system, so that operations of the code modulator 2 and the code demodulator 4 are synchronized in advance with operation of the controller 10. Thus, operations of the code modulator 2 and the code demodulator 4 are synchronized in time with each other at a system synchronization time t0. The code modulator 2 transmits a beacon to the code demodulator 4 as a control signal for synchronizing demodulation of the code demodulator 4 with the phase of received power. The beacon includes information indicating a time when transmitting the beacon with reference to the system synchronization time t0 (or information indicating a time length Δτ0 from system synchronization time t0 to the time when transmitting the beacon). The code demodulator 4 receives the beacon, and determines a time when receiving the beacon with reference to the system synchronization time t0 (or a time length ΔΣ1 from system synchronization time t0 to the time when receiving the beacon). The code demodulator 4 obtains the travel time Δt1 in the transmission path 3: Δt1=Δτ1−Δt0. The control circuit 30 of the code demodulator 4 delays a start time of demodulation of the code demodulation circuit 33 from a start time of modulation of the code modulation circuit 23 (i.e., start time of power transmission) by the travel time Δt1. When receiving power from the code modulator 2 via the transmission path 3, the code demodulator 4 demodulates the power in synchronization with the phase of the power based on the travel time Δt1. Thus, it is possible to efficiently demodulate the power in synchronization with the phase of the power received from the code modulator 2.

Note that the system synchronization signal is not limited to the signal transmitted from the controller 10, but may be a signal transmitted from other signal sources, such as a global positioning system (GPS) signal, or a standard time radio signal (radio-controlled clock). Thus, there is an advantageous effect of more accurate synchronization of the entire power transmission system. Furthermore, since it is not necessary for the controller 10 to transmit the system synchronization signal, there is an advantageous effect of reducing cost of the controller 10.

Note that when a delay occurs for mismatch in clock frequency between the code modulator 2 and the code demodulator 4 as described above, the code modulator 2 and the code demodulator 4 may regularly correct their clock frequencies (frequency synchronization) For example, the clock frequencies of the code modulator 2 and the code demodulator 4 may be corrected by regularly transmitting a reference clock signal from the controller 10 to the code modulator 2 and the code demodulator 4.

Seventh Embodiment

According to the power transmission systems of the fourth to sixth embodiments, when the code modulator 2 and the code demodulator 4 are in the simultaneous ON state (third and sixth states), a steep current peak occurs as follows.

$$i(t) = \frac{E}{R\left(1 - e^{-\frac{R}{L}t}\right)}$$ [Mathematical Expression 1]

Where "E" denotes an input voltage of each of the code modulator 2 and the code demodulator 4, "L" denotes an inductance of each of the reactors L1 and L2, and "R" denotes an internal resistance of each of the switch elements S1 to S4 and S11 to S14.

At a moment of transitioning from the simultaneous ON state to the other states (first, second, fourth, and fifth states) by turning off any one of the switch elements, a steep voltage peak occurs in the switch element due to energy accumu-lated in the reactors L1 and L2. When high frequency noise including such voltage peaks occurs, the following problems may occur:

breakage of switch elements or the like of code modulator 2 and code demodulator 4 due to overvoltage;

malfunction of code modulator 2 and code demodulator 4; and propagation of high frequency noise to power supply, load, or other apparatuses connected via transmission path 3.

On the other hand, according to a seventh embodiment, a power transmission system capable of reducing effects of high frequency noise is provided.

Figure 45:
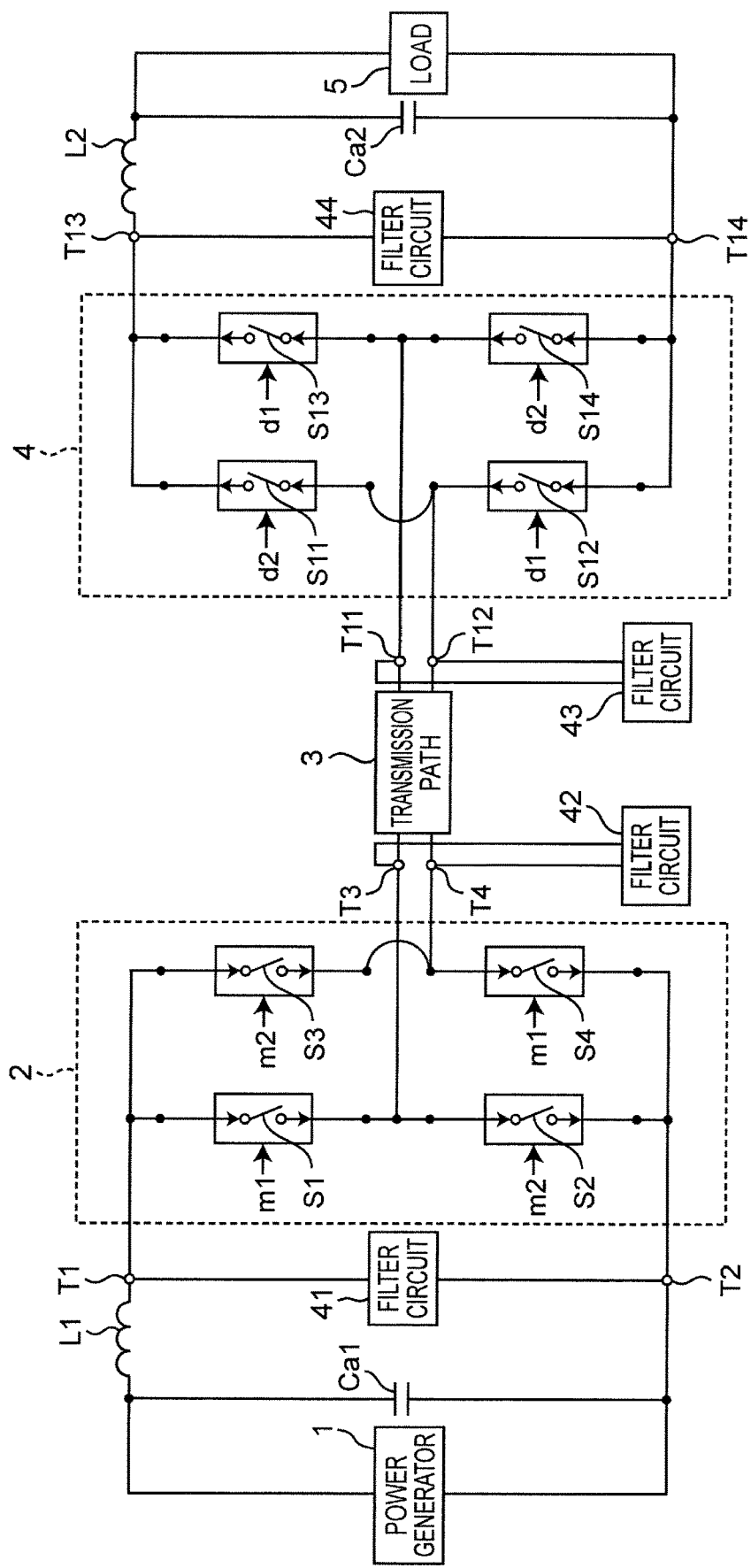
FIG. 45 is a circuit diagram showing a configuration of a power transmission system according to a seventh embodiment.

FIG. 45 is a circuit diagram showing a configuration of a power transmission system according to the seventh embodiment. According to the power transmission system of FIG. 45, the power generator 1, the code modulator 2, the transmission path 3, the code demodulator 4, the load 5, and the reactors L1 and L2 are configured in a manner similar to that of the corresponding constituent elements of FIG. 18. In FIG. 45, the controller 10, the power meters 1m and 5m, constituent elements of the code modulator 2 other than the switch elements S1 to S4, and constituent elements of the code demodulator 4 other than the switch elements S11 to S14 of FIG. 1 are omitted for ease of illustration.

According to the power transmission system of FIG. 45, the code modulator 2 may be further provided with a first filter circuit 41 connected between the ports T1 and T2, and a second filter circuit 42 connected between the ports T3 and T4. In addition, the code modulator 2 may be further provided with third filter circuits 45a to 45d connected in parallel to the switch elements S1 to S4 as shown in FIGS. 46 to 49. The code demodulator 4 may be further provided with a fourth filter circuit 43 connected between the ports T11 and T12, and a fifth filter circuit 44 connected between the ports T13 and T14. In addition, the code demodulator 4 may be further provided with sixth filter circuits 45a to 45d connected in parallel to the switch elements S11 to S14 as shown in FIGS. 46 to 49.

Figure 46:
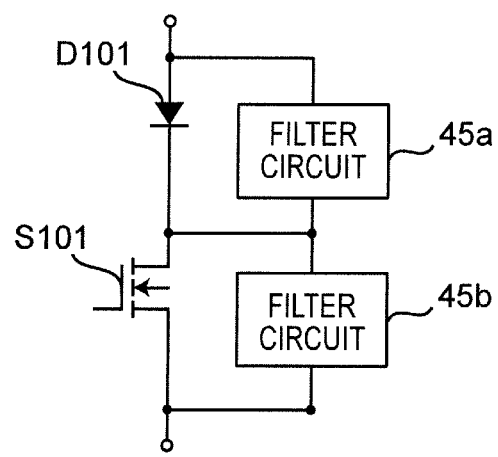
FIG. 46 is a circuit diagram showing filter circuits 45a and 45b used in the power transmission system of FIG. 45.

FIG. 46 is a circuit diagram showing filter circuits 45a and 45b used in the power transmission system of FIG. 45. When each of the switch elements S1 to S4 and S11 to S14 is provided with a diode D101 and a switch element S101 connected in series with each other, the filter circuits 45a and 45b may be connected in parallel to the diode D101 and the switch element S101, respectively, as shown in FIG. 46.

Figure 47:
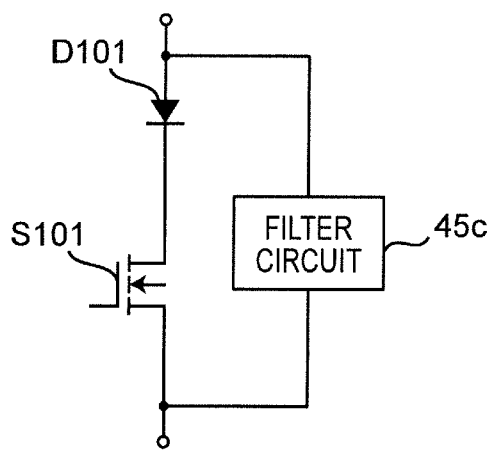
FIG. 47 is a circuit diagram showing a filter circuit 45c used in the power transmission system of FIG. 45.

FIG. 47 is a circuit diagram showing a filter circuit 45c used in the power transmission system of FIG. 45. When each of the switch elements S1 to S4 and S11 to S14 is provided with the diode D101 and the switch element S101 connected in series with each other, the one filter circuit 45c may be connected in parallel to the diode D101 and the switch element S101 as shown in FIG. 47.

Figure 48:
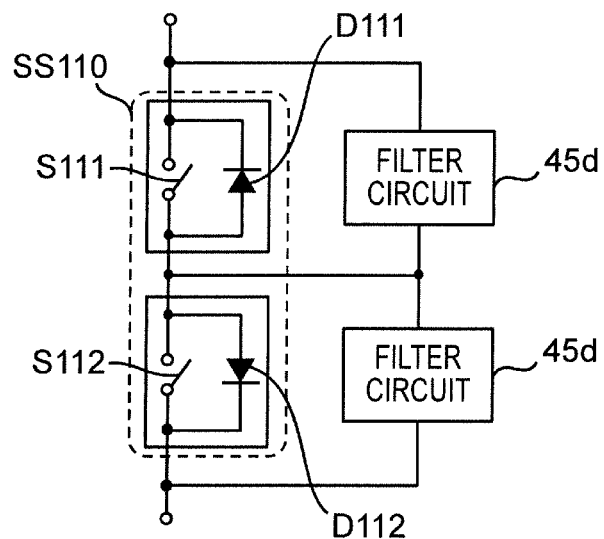
FIG. 48 is a circuit diagram showing a filter circuit 45d used in the power transmission system of FIG. 45.

FIG. 48 is a circuit diagram showing the filter circuit 45d used in the power transmission system of FIG. 45. A switch circuit SS110 of FIG. 48 is provided with diodes D111 and D112 and switch elements S111 and S112, and is configured in a manner similar to that of the switch circuits SS21A to SS24A of FIGS. 13A to 13D. When the seventh embodiment is applied to the power transmission system according to the second embodiment, the one filter circuit 45d may be connected in parallel to the diode D111 and the switch element S111, and the further filter circuit 45d may be connected in parallel to the diode D112 and the switch element S112.

Figure 49:
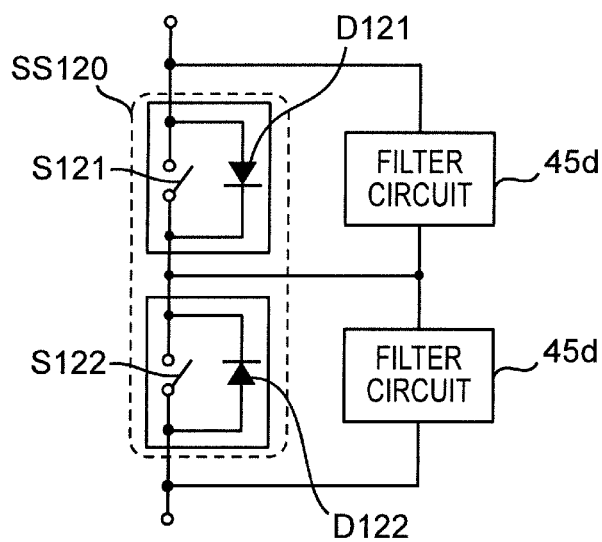
FIG. 49 is a circuit diagram showing the filter circuit 45d used in the power transmission system of FIG. 45.

FIG. 49 is a circuit diagram showing the filter circuit 45d used in the power transmission system of FIG. 45. A switch circuit SS120 of FIG. 49 is provided with diodes D121 and D122 and switch elements S121 and S122, and is configured in a manner similar to that of the switch circuits SS31A to SS34A of FIGS. 14A to 14D. When the seventh embodiment is applied to the power transmission system according to the second embodiment, the one filter circuit 45d may be connected in parallel to the diode D121 and the switch element S121, and the further filter circuit 45d may be connected in parallel to the diode D122 and the switch element S122.

The code modulator 2 may be provided with at least one of the first filter circuit 41, the second filter circuit 42, and the third filter circuits 45a to 45d. The code demodulator 4 may be provided with at least one of the fourth filter circuit 43, the fifth filter circuit 44, and the sixth filter circuits 45a to 45d.

The filter circuit 41 is connected between the code modulator 2 and the reactor L1. Similarly, the filter circuit 44 is connected between the code demodulator 4 and the reactor L2. The filter circuits 41 and 44 disposed at these positions can most effectively reduce a surge due to the reactors L1 and L2, using a small number of parts. The filter circuits 41 and 44 may be designed in consideration of the inductance of the reactors L1 and L2.

The filter circuits 42 and 43 are connected to both ends of the transmission path 3. The filter circuits 42 and 43 disposed at these positions can most effectively reduce a surge mainly due to wiring inductance of the transmission path 3, using a small number of parts. The filter circuits 42 and 43 may be designed in consideration of the wiring inductance of the transmission path 3.

Since the inductance of the reactors L1 and L2 is much larger than the wiring inductance of the transmission path 3, the filter circuits 41 and 44 are more effective than the filter circuits 42 and 43.

The filter circuits 45a to 45d are connected in parallel to the switch elements S1 to S4 and S11 to S14. The filter circuits 41 and 44 disposed at these positions can effectively reduce both the surge due to the reactors L1 and L2, and the surge mainly due to the wiring inductance of the transmission path 3.

The filter circuits 41 to 44 may be provided alone or in combination. The filter circuits 45a and 45b of FIG. 46 are always used in combination. When regenerative current of a motor is used as a power source, for example, a combination of the filters 41 and 42 are effective.

Although FIG. 45 shows a capacitor Ca1 connected in parallel to the power generator 1 and a capacitor Ca2 connected in parallel to the load 5, the capacitors Ca1 and Ca2 may be removed as necessary.

Next, we describe examples of the filter circuits 41 to 45d with reference to FIGS. 50 to 56.

Figure 50:
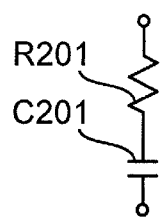
FIG. 50 is a circuit diagram showing a first example of the filter circuits 41 to 45d of FIGS. 45 to 49.

FIG. 50 is a circuit diagram showing a first example of the filter circuits 41 to 45d of FIGS. 45 to 49. The filter circuit of FIG. 50 is provided with a snubber circuit, including a resistor R201 and a capacitor C201 connected in series with each other. In the filter circuit of FIG. 50, the capacitor C201 is charged with a steep current which may result in a surge voltage. The current also flows in the resistor R201 while charging and discharging the capacitor C201, and therefore, energy which may result in a surge voltage is consumed. However, in the filter circuit of FIG. 50, a large loss occurs at the resistor R201.

Figure 51:
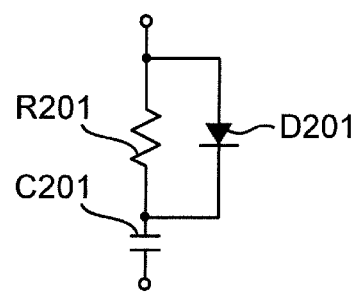
FIG. 51 is a circuit diagram showing a second example of the filter circuits 41 to 45d of FIGS. 45 to 49.

FIG. 51 is a circuit diagram showing a second example of the filter circuits 41 to 45d of FIGS. 45 to 49. The filter circuit of FIG. 51 is provided with the resistor R201 and the capacitor C201 of FIG. 50, and further provided with a diode D201 connected in parallel to the resistor R201. Also in the filter circuit of FIG. 51, the capacitor C201 is charged with a steep current which may resulting in a surge voltage. The current flows in the diode D201 of a low loss type while charging the capacitor C201, and therefore, the filter circuit of FIG. 51 is more effective than a snubber circuit including only the resistor R201 and the capacitor C201.

Figure 52:
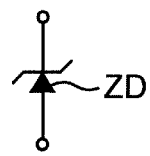
FIG. 52 is a circuit diagram showing a third example of the filter circuits 41 to 45d of FIGS. 45 to 49.

FIG. 52 is a circuit diagram showing a third example of the filter circuits 41 to 45d of FIGS. 45 to 49. The filter circuit of FIG. 52 is provided with a Zener diode ZD. The filter circuit of FIG. 52 utilizes reverse characteristics of a Zener diode. Forward characteristics of a Zener diode are similar to characteristics of a normal PN junction diode. However, when a reverse voltage is applied to a Zener diode, a constant voltage is maintained regardless of the current flowing therein. A surge voltage can be reduced by connecting the Zener diode ZD such that a surge voltage is applied in the reverse direction of the Zener diode ZD.

Figure 53:
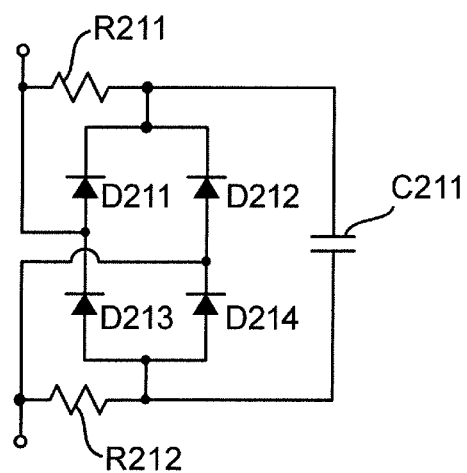
FIG. 53 is a circuit diagram showing a fourth example of the filter circuits 41 to 45d of FIGS. 45 to 49.

FIG. 53 is a circuit diagram showing a fourth example of the filter circuits 41 to 45d of FIGS. 45 to 49. The filter circuit of FIG. 53 is provided with a snubber circuit including resistors R211 and R212 and a capacitor C211, and further provided with a diode bridge circuit including diodes D211 to D214. In the filter circuit of FIG. 53, the capacitor C211 is charged with a steep current which may results in a surge voltage. The diode bridge circuit limits charge and discharge of the capacitor C211, and therefore, a resistive loss decreases.

Figure 54:
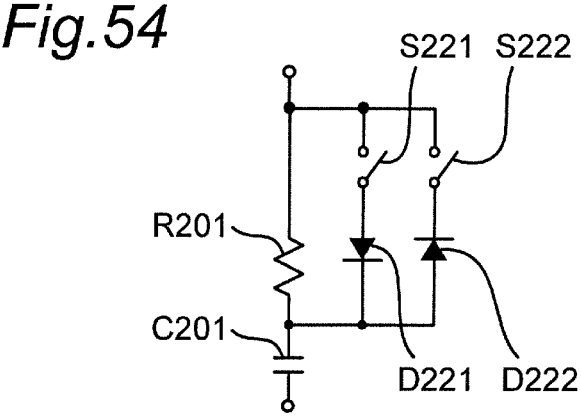
FIG. 54 is a circuit diagram showing a fifth example of the filter circuits 41 to 45d of FIGS. 45 to 49.

FIG. 54 is a circuit diagram showing a fifth example of the filter circuits 41 to 45d of FIGS. 45 to 49. The filter circuit of FIG. 54 is provided with the resistor R201 and the capacitor C201 of FIG. 50, and further provided with diodes D221 and D222 and switch elements S221 and S222 connected in parallel to the resistor R201. The diodes D221 and D222 are connected in directions opposite to each other. In the filter circuit of FIG. 54, the capacitor C201 is charged with a steep current which may result in a surge voltage. When a positive voltage is applied across both ends of the snubber circuit, the switch element S221 is turned on, and when a negative voltage is applied across both ends of the snubber circuit, the switch element S222 is turned on. Thus, the diodes D221 and D222 limit charge and discharge of the capacitor C201 regardless whether positive voltage or negative voltage is applied across both ends of the snubber circuit, and therefore, a resistive loss decreases.

When DC power is applied, any of the filter circuits shown in FIGS. 50 to 54 can be used. On the other hand, when AC power is applied, since both positive and negative voltages are applied to the filter circuit, non-polarized filter circuits shown in FIGS. 50, 53 and 54 are can be used.

Since a frequency of surge voltage is much higher than a frequency of modulated power, the filter circuit may be configured, including a low pass filter or a band pass filter for reducing high-frequency noise signal components.

Figure 55:
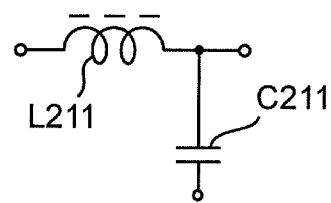
FIG. 55 is a circuit diagram showing a sixth example of the filter circuits 41 to 45d of FIGS. 45 to 49.

FIG. 55 is a circuit diagram showing a sixth example of the filter circuits 41 to 45d of FIGS. 45 to 49. The filter circuit of FIG. 55 is a low pass filter, including an inductor L211 and a capacitor C211. The filter circuit of FIG. 55 passes signals having frequencies lower than a cutoff frequency.

Figure 56:
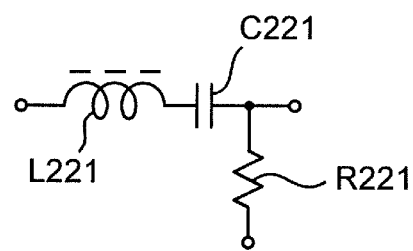
FIG. 56 is a circuit diagram showing a seventh example of the filter circuits 41 to 45d of FIGS. 45 to 49.

FIG. 56 is a circuit diagram showing a seventh example of the filter circuits 41 to 45d of FIGS. 45 to 49. The filter circuit of FIG. 56 is a band pass filter, including an inductor L221, a capacitor C221, and a resistor R221. The filter circuit of FIG. 56 passes signals in a specific frequency band.

Since each of the filter circuits of FIG. 55 and FIG. 56 are an LC resonant circuit, voltage oscillation is likely to occur.

The inductance of each of the filter circuits of FIG. 55 and FIG. 56 may be shared with an inductance of the reactors L1 and L2, and/or wiring inductance of the transmission path 3.

Figure 57:
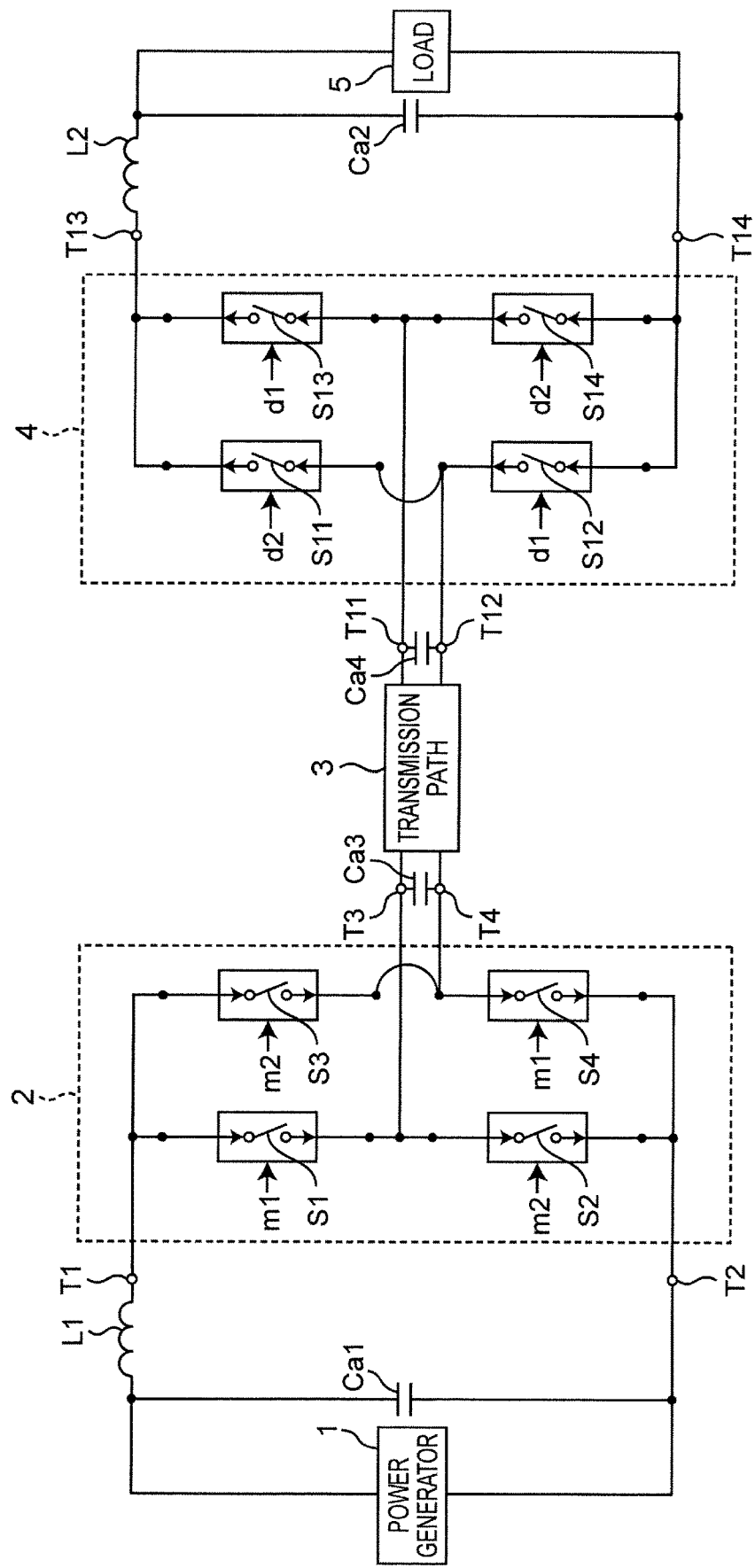
FIG. 57 is a circuit diagram showing a configuration of a power transmission system including filter circuits according to an eighth example of the seventh embodiment.

FIG. 57 is a circuit diagram showing a configuration of a power transmission system including filter circuits according to an eighth example of the seventh embodiment. The power transmission system of FIG. 57 is provided with: a capacitor Ca3 connected between the ports T3 and T4; and a capacitor Ca4 connected between the ports T11 and T12. The capacitor Ca3, the reactor L1, and the transmission path 3 make a filter circuit having a resonance frequency determined by the capacitance of the capacitor Ca3, the inductance of the reactor L1, and the wiring inductance of the transmission path 3. Similarly, the capacitor Ca4, the reactor L2, and the transmission path 3 make a filter circuit having a resonant frequency determined by the capacitance of the capacitor Ca4, the inductance of the reactor L2, and the wiring inductance of the transmission path 3.

In the power transmission system, the reactors L1 and L2 have designed and known inductances, and therefore, the filter circuit can be designed based on the value of their inductances. On the other hand, the transmission path 3 may have an unknown inductance. In particularly, in a power transmission system including a plurality of the code modulators 2 and a plurality of the code demodulators 4, the path length of the transmission path 3 varies in accordance with a combination of the code modulator 2 and the code demodulator 4 between which power is transmitted, as a result, the transmission path 3 may have a variable inductance. Accordingly, it is difficult to design an effective filter using the capacitors Ca3 and Ca4 having fixed capacitances.

Figure 58:
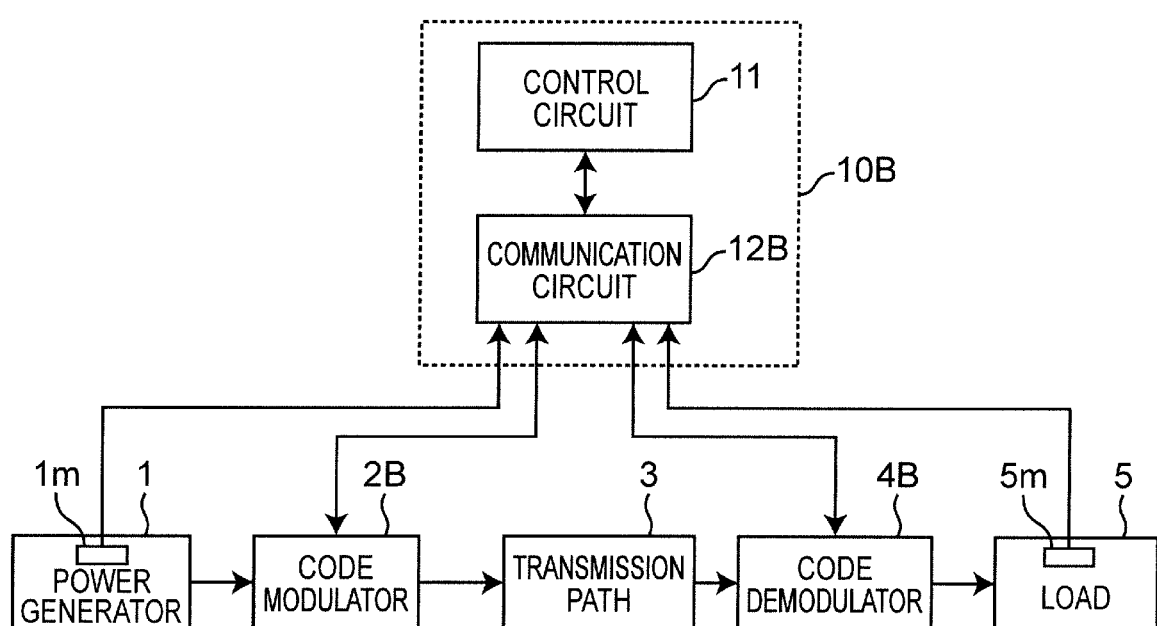
FIG. 58 is a block diagram showing a configuration of a power transmission system including filter circuits according to a ninth example of the seventh embodiment.

FIG. 58 is a block diagram showing a configuration of a power transmission system including filter circuits according to a ninth example of the seventh embodiment. With reference to FIG. 58, we describe a power transmission system provide with variable capacitors, in place of the capacitors Ca3 and Ca4 of FIG. 57. The power transmission system of FIG. 58 is provided with: the power generator 1, a code modulator 2B, the transmission path 3, a code demodulator 4B, the load 5, and a controller 10B. The code modulator 2B and the code demodulator 4B are provided with variable capacitors, respectively, and set their capacitances under control of the controller 10B. The controller 10B is provided with a control circuit 11 and a communication circuit 12B. The control circuit 11 communicates with the code modulator 2B and the code demodulator 4B via the communication circuit 12B, and controls operations of the code modulator 2B and the code demodulator 4B.

Figure 59:
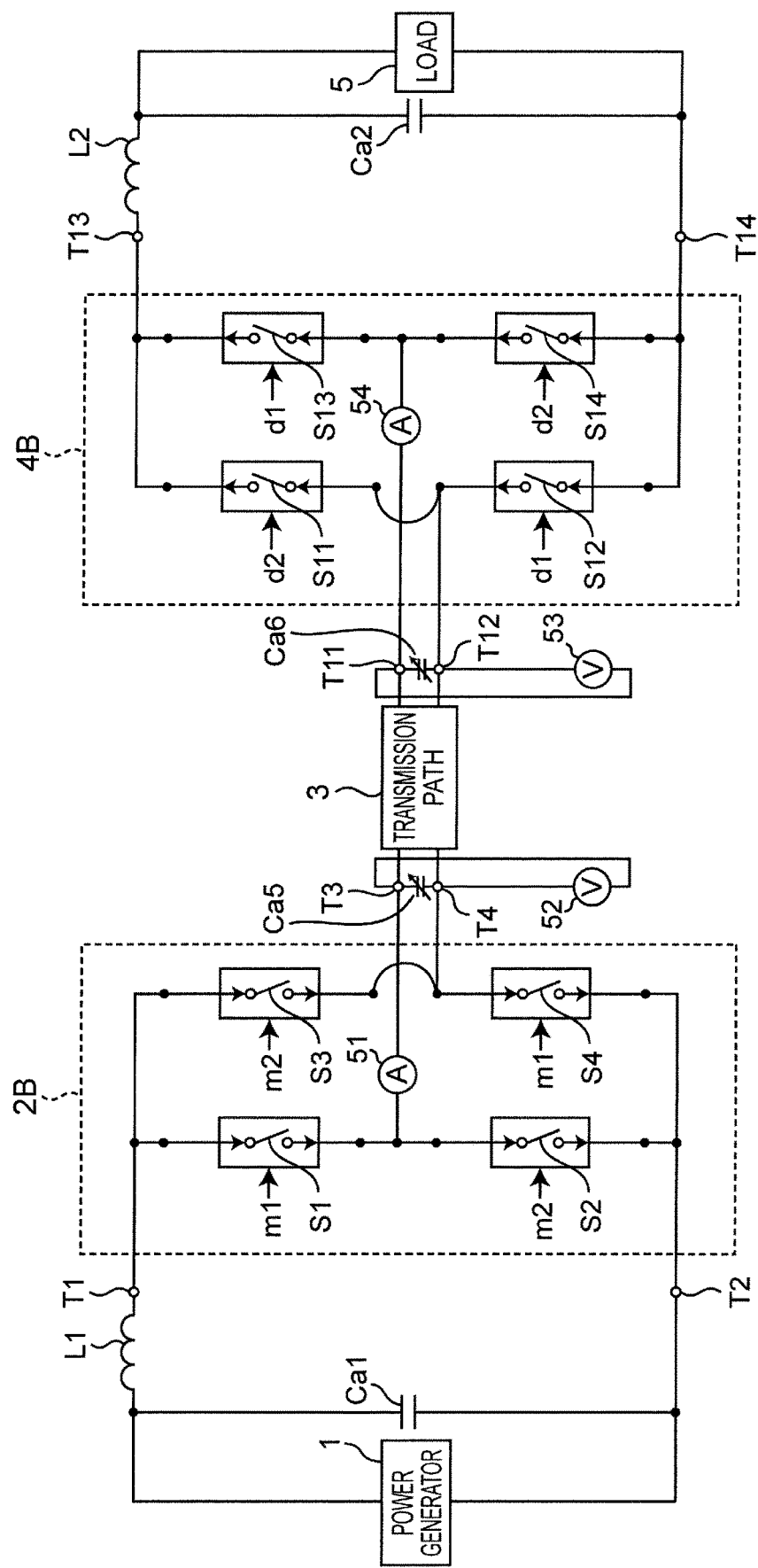
FIG. 59 is a circuit diagram showing the configuration of the power transmission system including the filter circuits according to the ninth example of the seventh embodiment.

FIG. 59 is a circuit diagram showing the configuration of the power transmission system including the filter circuits according to the ninth example of the seventh embodiment. The code modulator 2B is provided with: a variable capacitor Ca5 connected between the ports T3 and T4; a current meter 51; and a voltage meter 52. The current meter 51 measures current outputted from the code modulator 2B to the transmission path 3. The voltage meter 52 measures voltage outputted from the code modulator 2 to the transmission path 3. The code modulator 2B transmits a current value measured by the current meter 51, and a voltage value measured by the voltage meter 52, to the controller 10B, and sets the capacitance of the variable capacitor Ca5 under control of the controller 10B. The code demodulator 4B is provided with: a variable capacitor Ca6 connected between the ports T11 and T12; a voltage meter 53; and a current meter 54. The voltage meter 53 measures voltage inputted from the transmission path 3 to the code demodulator 4B. The current meter 54 measures current inputted from the transmission path 3 to the code demodulator 4B. The code demodulator 4B transmits a voltage value measured by the voltage meter 53, and a current value measured by the current meter 54, to the controller 10B, and sets the capacitance of the variable capacitor Ca6 under control of the controller 10B.

The controller 10B determines the capacitances of the variable capacitors Ca5 and Ca6 as follows.

Firstly, at a time "ta", a voltage V1 outputted from the code modulator 2B to the transmission path 3 is measured, and a voltage V2 inputted from the transmission path 3 to the code demodulator 4B is measured.

For a certain duration from the time "ta" to a time "tb", $\Delta t = tb - ta$, a change of current outputted from the code modulator 2B to the transmission path 3, $\Delta I1 = I1b - I1a$, or a change of current inputted from the transmission path 3 to the code demodulator 4B, $\Delta I2 = I2b - I2a$, is measured.

A voltage applied to the wiring inductance value L of the transmission path 3, $V = V2 - V1$, is given as follows.

$$V = -L\frac{dI1}{dt} \quad \text{[Mathematical Expression 2]}$$

The unknown inductance value L is calculated using this mathematical expression.

Based on a capacitance value C of the variable capacitors Ca5 and Ca6, and the inductance value L, a cutoff frequency fc of the filter circuit is given as follows.

$$fc = \frac{1}{2\pi\sqrt{LC}} \quad \text{[Mathematical Expression 3]}$$

The capacitance value C of the variable capacitors Ca5 and Ca6 is determined such that the cutoff frequency fc is higher than the frequency of the modulation code and the demodulation code.

Thus, it is possible to provide an appropriate filter circuit even when the transmission path 3 has an unknown inductance.

According to the power transmission system of the seventh embodiment, it is possible to prevent power transmission efficiency from degrading due to a delay between the code modulator 2 and the code demodulator 4, and can reduce effects of high frequency noise by providing the filter circuit(s).

Eighth Embodiment

In an eighth embodiment, we describe reduction of switching losses of the code modulator 2 and the code demodulator 4 of the power transmission system according to the seventh embodiment, the power transmission system being provided with LC resonant circuits as filter circuits.

A power transmission system according to the eighth embodiment is configured in a manner similar to that of the power transmission systems of FIGS. 57 to 59.

Figure 60:
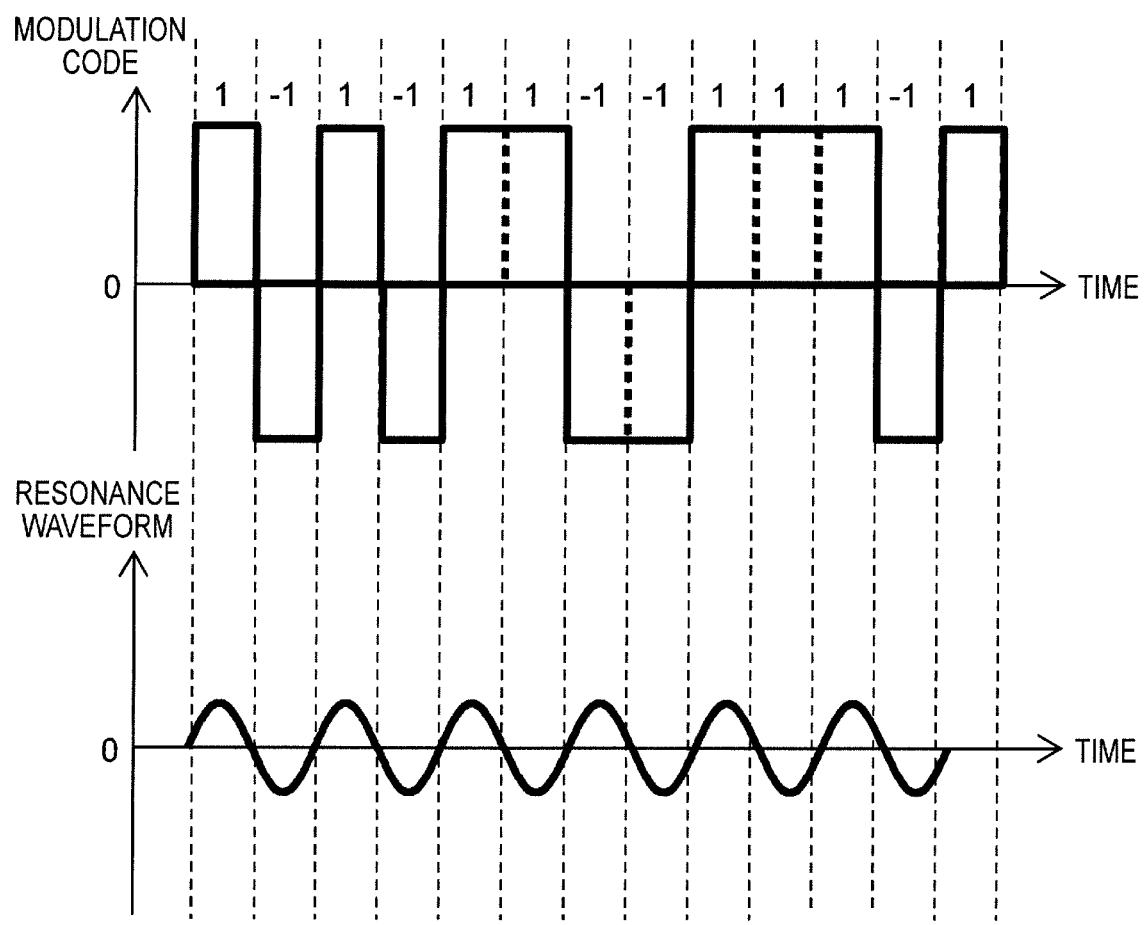
FIG. 60 is a graph showing a relationship between a modulation code and a resonance waveform of a filter circuit in a power transmission system according to an eighth embodiment.

FIG. 60 is a graph showing a relationship between a modulation code and a resonance waveform of the filter circuit in the power transmission system according to the eighth embodiment. The capacitances of the capacitors Ca3 and Ca4 are determined such that a half period of a resonance waveform determined by the inductances of the reactors L1 and L2 and the capacitances of the capacitors Ca3 and Ca4 matches one bit (modulation clock frequency)

of the modulation code and the demodulation code. In this case, the switch elements are turned on or off at each moment when the drain-source voltage of the switch element is zero, and therefore, switching losses are considerably reduced.

Figure 61:
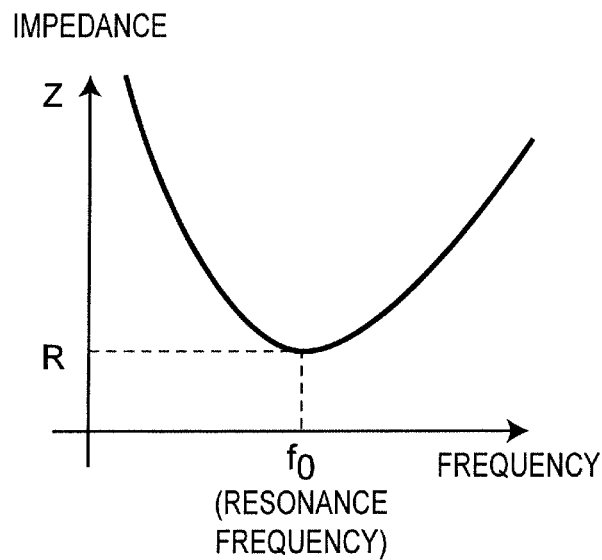
FIG. 61 is a diagram illustrating resonance of the filter circuit in the power transmission system according to the eighth embodiment.
Figure 62:
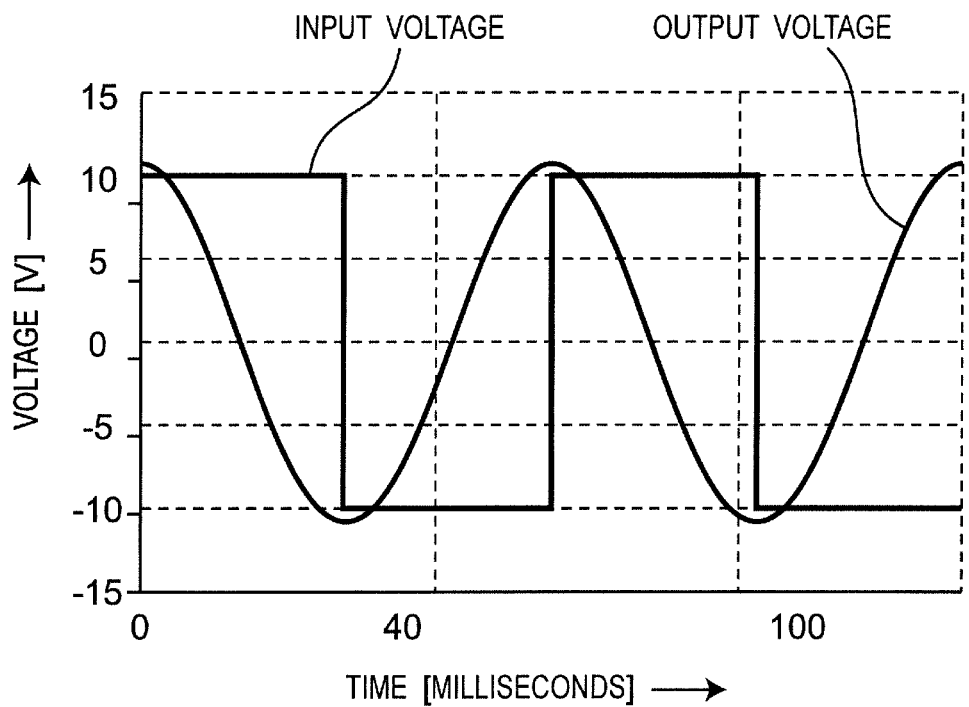
FIG. 62 is a diagram showing a relationship between output voltage of the code modulator 2 and input voltage of the code demodulator 4 when a resonance frequency of the filter circuit in the power transmission system according to the eighth embodiment is identical to a modulation clock frequency.

FIG. 61 is a diagram illustrating resonance of the filter circuit in the power transmission system according to the eighth embodiment. FIG. 62 is a diagram showing a relationship between output voltage of the code modulator 2 and input voltage of the code demodulator 4 when a resonance frequency of the filter circuit in the power transmission system according to the eighth embodiment is identical to a modulation clock frequency. As shown in FIG. 61, the impedance Z is considerably reduced at the resonance frequency of the filter circuit. Accordingly, as shown in FIG. 62, when the switch elements of the code modulator 2 or the code demodulator 4 operate at a frequency equal to the resonance frequency of the filter circuit, a sinusoidal output voltage is generated by a rectangular input voltage.

The resonance frequency of the power transmission system is determined by the total inductances and total capacitances in a current path including the code modulator 2, the transmission path 3, and the code demodulator 4. The capacitor Ca3 or Ca4 having the capacitance value C is provided for the reactors L1 and L2 having very large inductances. In this case, the capacitance value C is determined such that nodes of the following resonance waveform (resonance frequency $f_{res}$) match with respective bits of the modulation code and the demodulation code in one-by-one basis.

$$f_{res} = \frac{1}{2\pi\sqrt{(L1+L2) \times C}}$$ [Mathematical Expression 4]

When $f_{sw}$ is the modulation clock frequency, and N is any integer, the resonance frequency $f_{res}$ is determined as follows.

$$f_{res} = \frac{f_{sw}}{2} \times N$$ [Mathematical Expression 5]

In this case, the voltage is zero at moments of transition of the modulation code and the demodulation code.

Since each of the code modulator 2 and the code demodulator 4 may be provided with at least one capacitor, the capacitance of the capacitor Ca3 or Ca4 may be determined as follows.

$$f_{res} = \frac{1}{2\pi\sqrt{(L1+L2) \times (Ca3+Ca4)}}$$ [Mathematical Expression 6]

Note that in actual design, since there are parasitic components of semiconductor devices, and wiring inductances of a substrate and the transmission path 3, it is necessary to determine the capacitances in consideration of the parasitic components.

Thus, the resonant circuit including the reactors L1 and L2 and the capacitors Ca3 and Ca4 is configured to have a resonance frequency equal to N/2 times the modulation clock frequency, and thus, it is possible to reduce switching losses of the code modulator 2 and the code demodulator 4.

Next, with reference to FIGS. 63 to 73, we describe simulation results of the power transmission system according to the seventh embodiment.

Simulations were performed for the power transmission systems according to the seventh and eighth embodiments, each including the one code modulator 2A and the one code demodulator 4A of the second embodiment. A DC voltage source of 115V was connected to the code modulator 2A. The load 5 of 12Ω was connected to the code demodulator 4A. The inductance of the reactors L1 and L2 was 15 mH. The modulation code and the demodulation code were Gold code sequences of seven stages, and their modulation clock frequency of these codes was 20 kHz.

Figure 63:
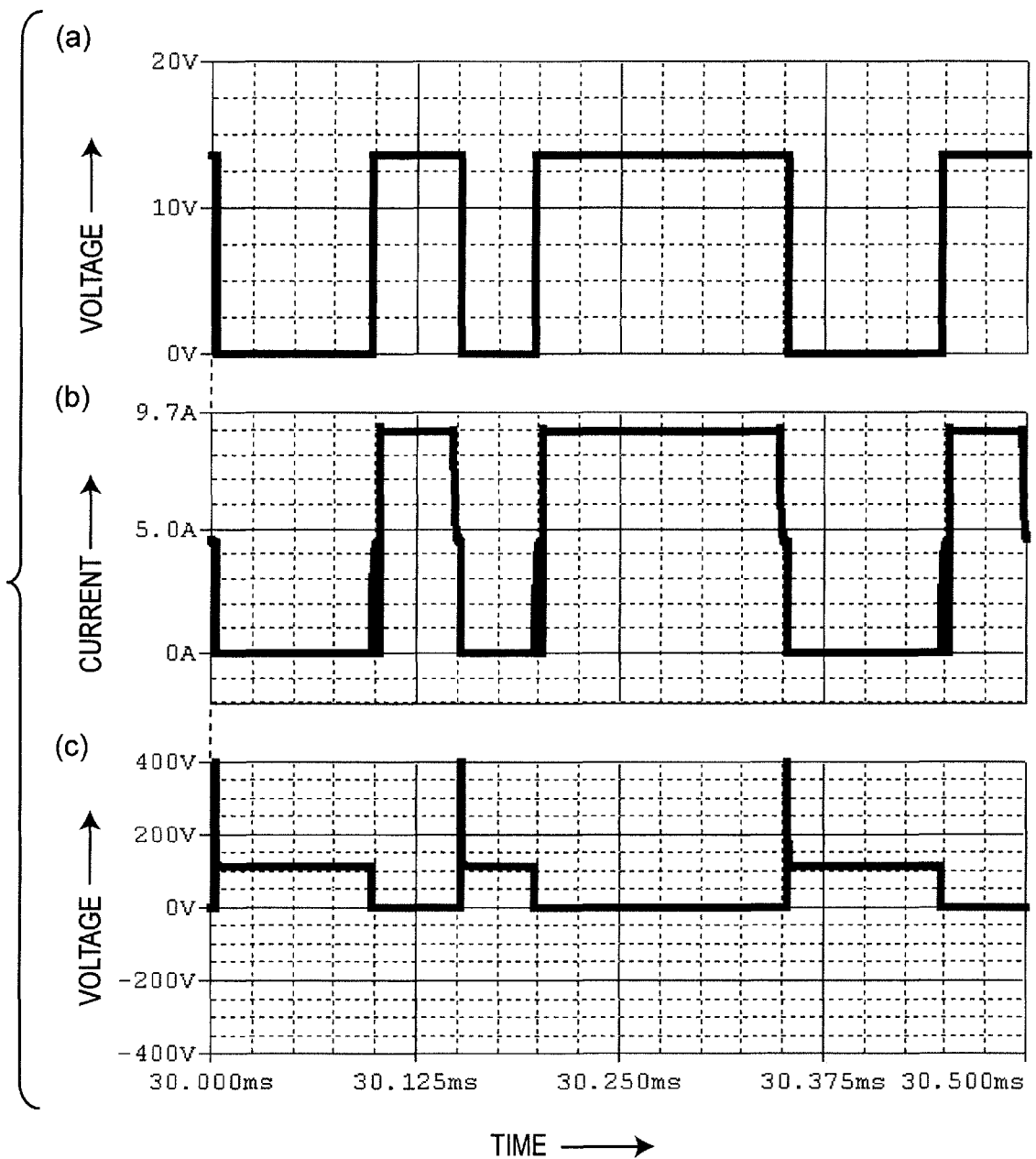
FIG. 63 shows a simulation result of a power transmission system according to a comparison example of the seventh embodiment, in which: (a) is a graph showing gate voltage of switch elements S1 and S4; (b) is a graph showing current flowing in the switch elements S1 and S4; and (c) is a graph showing voltage across both ends of the switch elements S1 and S4.
Figure 64:
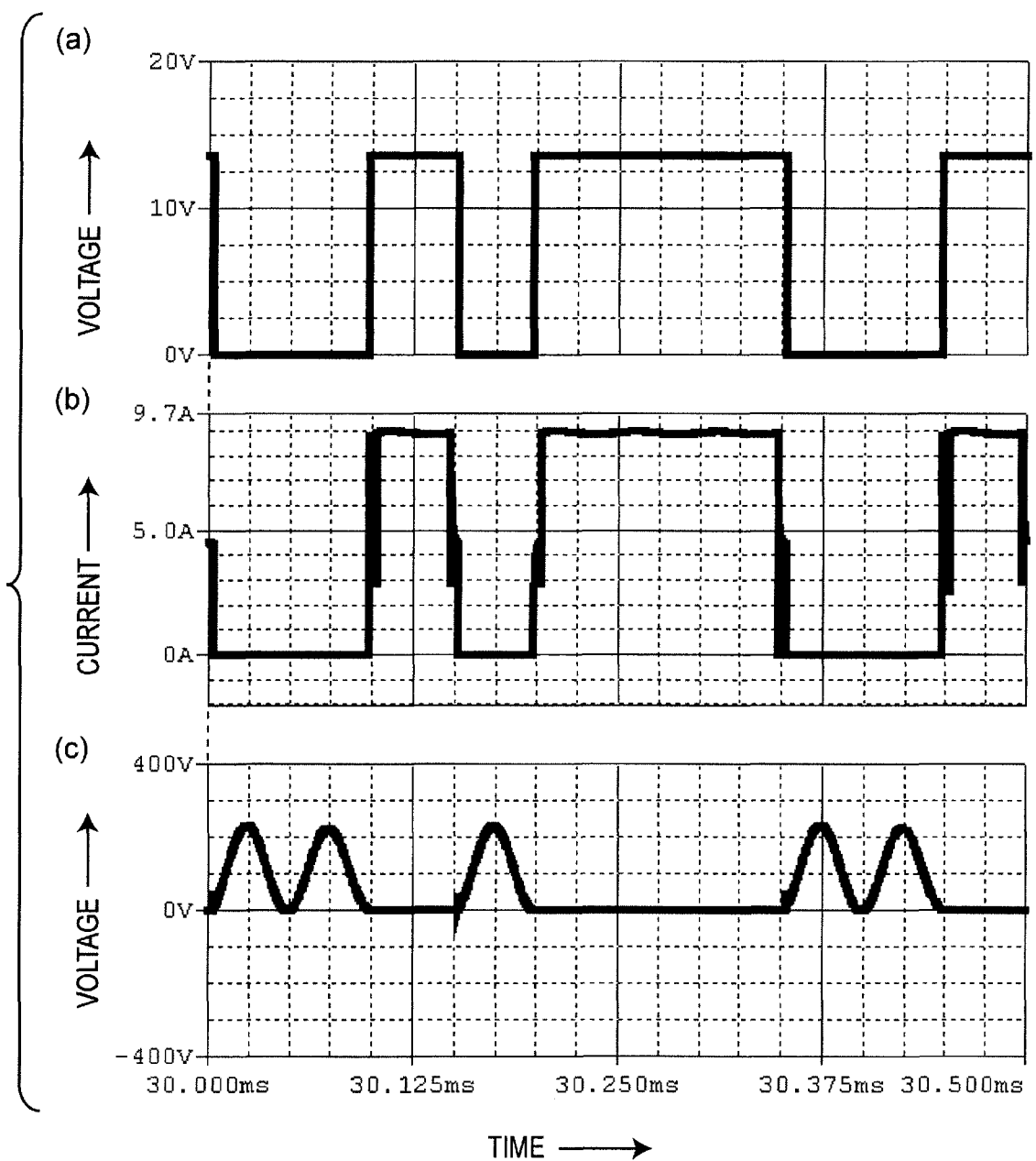
FIG. 64 shows a simulation result of a power transmission system according to a first implementation example of the seventh embodiment, in which: (a) is a graph showing gate voltage of switch elements S1 and S4; (b) is a graph showing current flowing in the switch elements S1 and S4; and (c) is a graph showing voltage across both ends of the switch elements S1 and S4.
Figure 65:
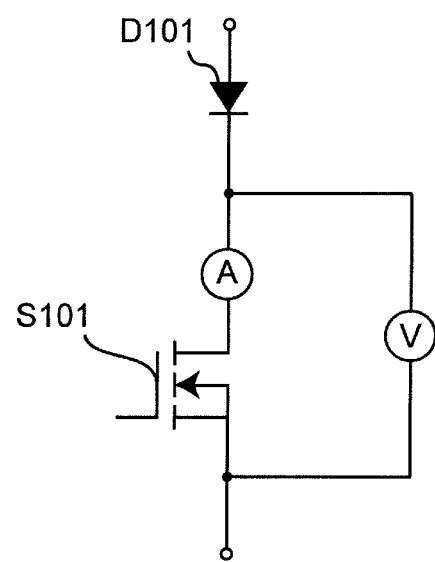
FIG. 65 is a diagram showing how to measure current and voltage of FIGS. 63 and 64.

At first, with reference to FIGS. 63 to 65 we describe a simulation result of the power transmission system according to a first implementation example of the seventh embodiment. FIG. 65 is a diagram showing how to measure current and voltage of FIGS. 63 and 64.

FIG. 63 shows a simulation result of a power transmission system according to a comparison example of the seventh embodiment. In FIG. 63, (a) is a graph showing gate voltage of switch elements S1 and S4, (b) is a graph showing current flowing in the switch elements S1 and S4, and (c) is a graph showing voltage across both ends of the switch elements S1 and S4. FIG. 63 shows current and voltage of the power transmission system without filter circuit. As can be seen from FIG. 63(c), a large voltage peak occurs at moments when the switch elements S1 and S4 are turned off.

FIG. 64 shows a simulation result of a power transmission system according to the first implementation example of the seventh embodiment. In FIG. 64, (a) is a graph showing gate voltage of switch elements S1 and S4, (b) is a graph showing current flowing in the switch elements S1 and S4, and (c) is a graph showing voltage across both ends of the switch elements S1 and S4. FIG. 64 shows current and voltage of the power transmission system provided with: the capacitor Ca3 connected between the ports T3 and T4; and the capacitor Ca4 connected between the ports T11 and T12. As can be seen from comparison between FIG. 63(c) and FIG. 64(c), since the power transmission system according to the implementation example is provided with filter circuits, a sinusoidal voltage, instead of a rectangular voltage, is applied to each of the switch elements S1 and S4, and a voltage peak at the moments of turning off of the switch elements S1 and S4 is significantly reduced. Accordingly, it is possible to reduce switching losses.

At first, with reference to FIGS. 66 to 70, we describe a simulation result of a power transmission system according to a second implementation example of the seventh embodiment. FIG. 71 is a diagram showing how to measure voltage shown in FIGS. 66 to 70.

Figure 66:
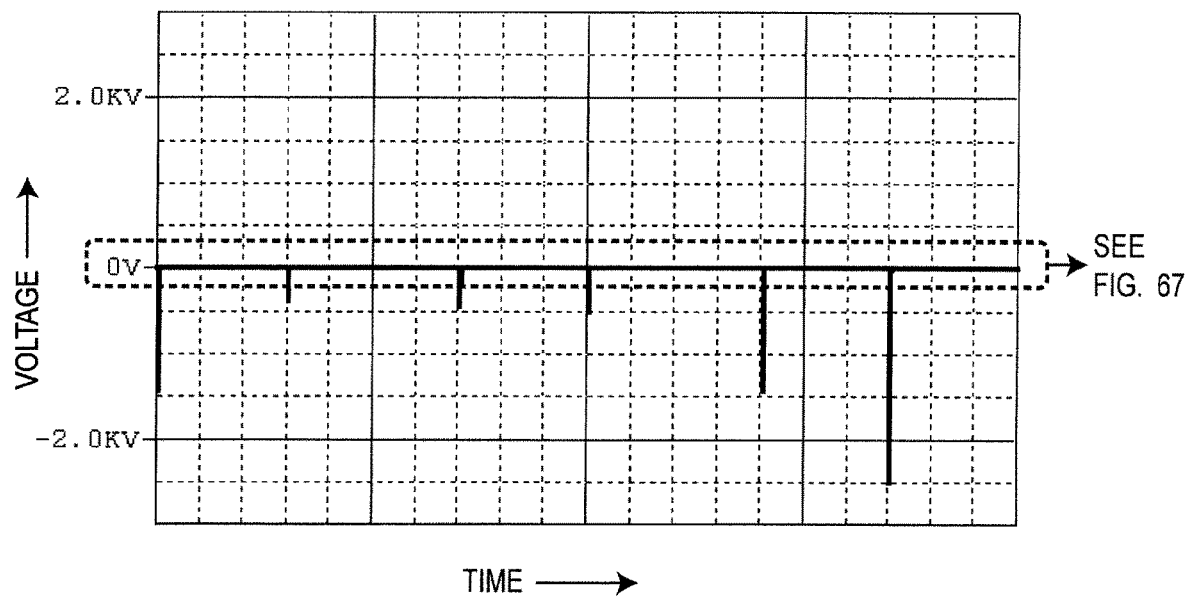
FIG. 66 is a graph showing a simulation result of the power transmission system according to the comparison example of the seventh embodiment, showing voltage applied to both ends of a diode D101 of a switch circuit.
Figure 67:
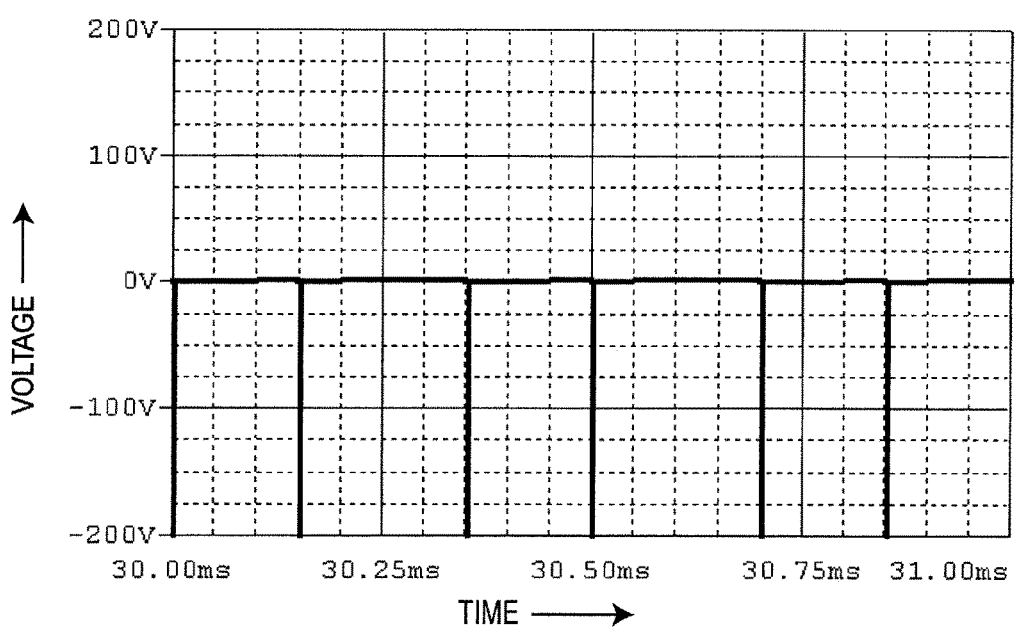
FIG. 67 is a graph showing an enlarged diagram of a part of FIG. 66.
Figure 68:
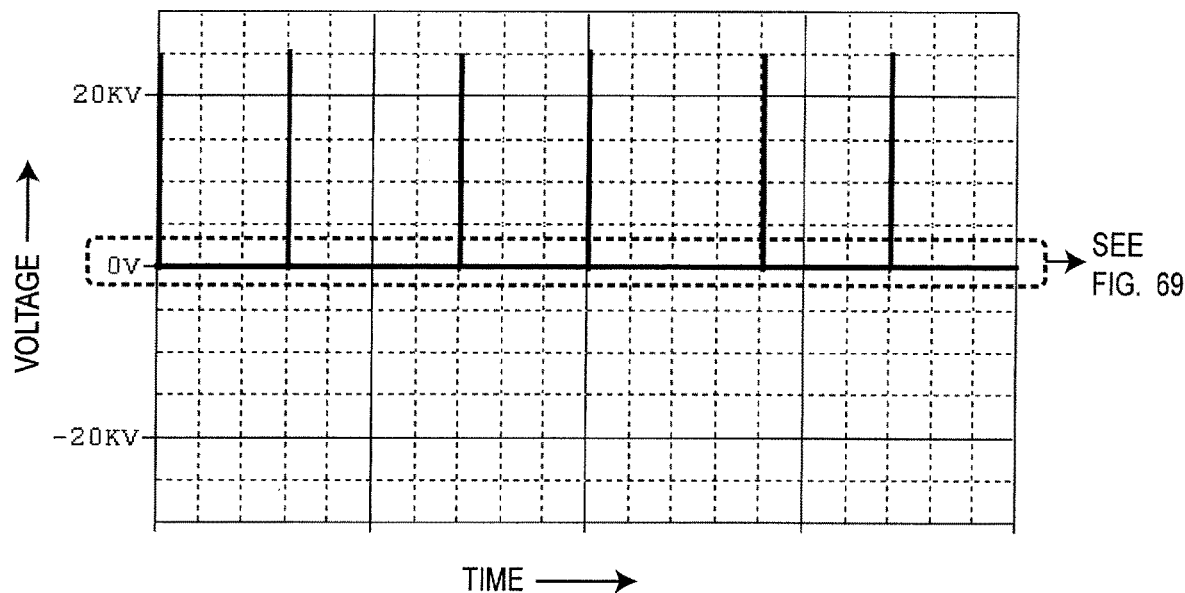
FIG. 68 is a graph showing a simulation result of the power transmission system according to the comparison example of the seventh embodiment, showing voltage applied to both ends of a switch element S101 of the switch circuit.
Figure 69:
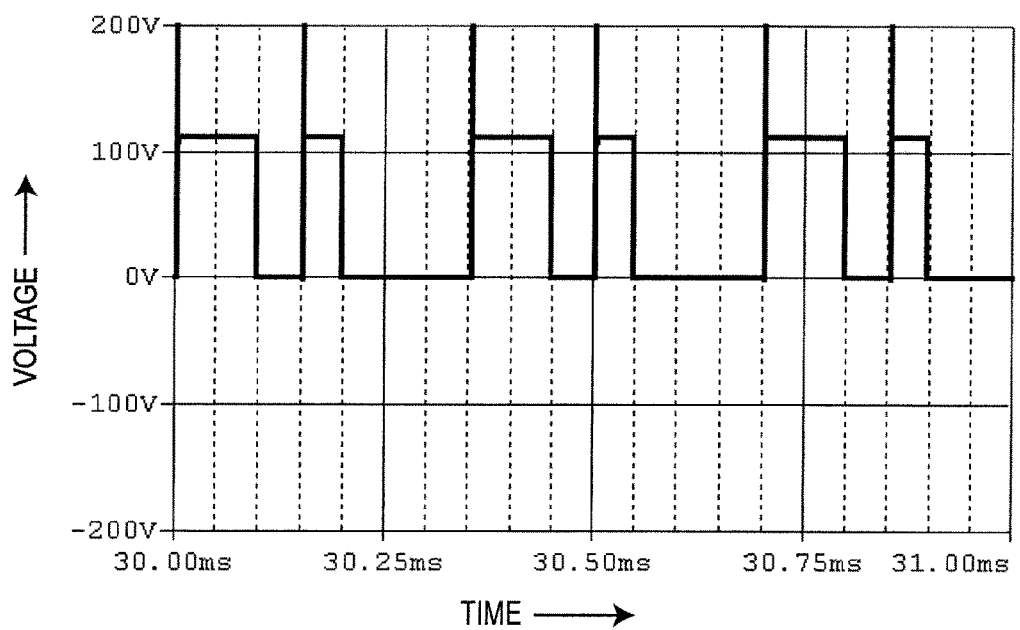
FIG. 69 is a graph showing an enlarged diagram of a part of FIG. 68.

FIG. 66 is a graph showing a simulation result of the power transmission system according to the comparison example of the seventh embodiment, showing voltage applied to both ends of the diode D101 of the switch circuit. FIG. 67 is a graph showing an enlarged diagram of a part of FIG. 66. FIG. 68 is a graph showing a simulation result of the power transmission system according to the comparison example of the seventh embodiment, showing voltage applied to both ends of the switch element S101 of the switch circuit. FIG. 69 is a graph showing an enlarged diagram of a part of FIG. 68. Each of FIGS. 66 to 69 shows current and voltage of the power transmission system without filter circuit. As can be seen from FIGS. 66 to 69, large overvoltages are applied to both the diode D101 and the switch element S101.

Figure 70:
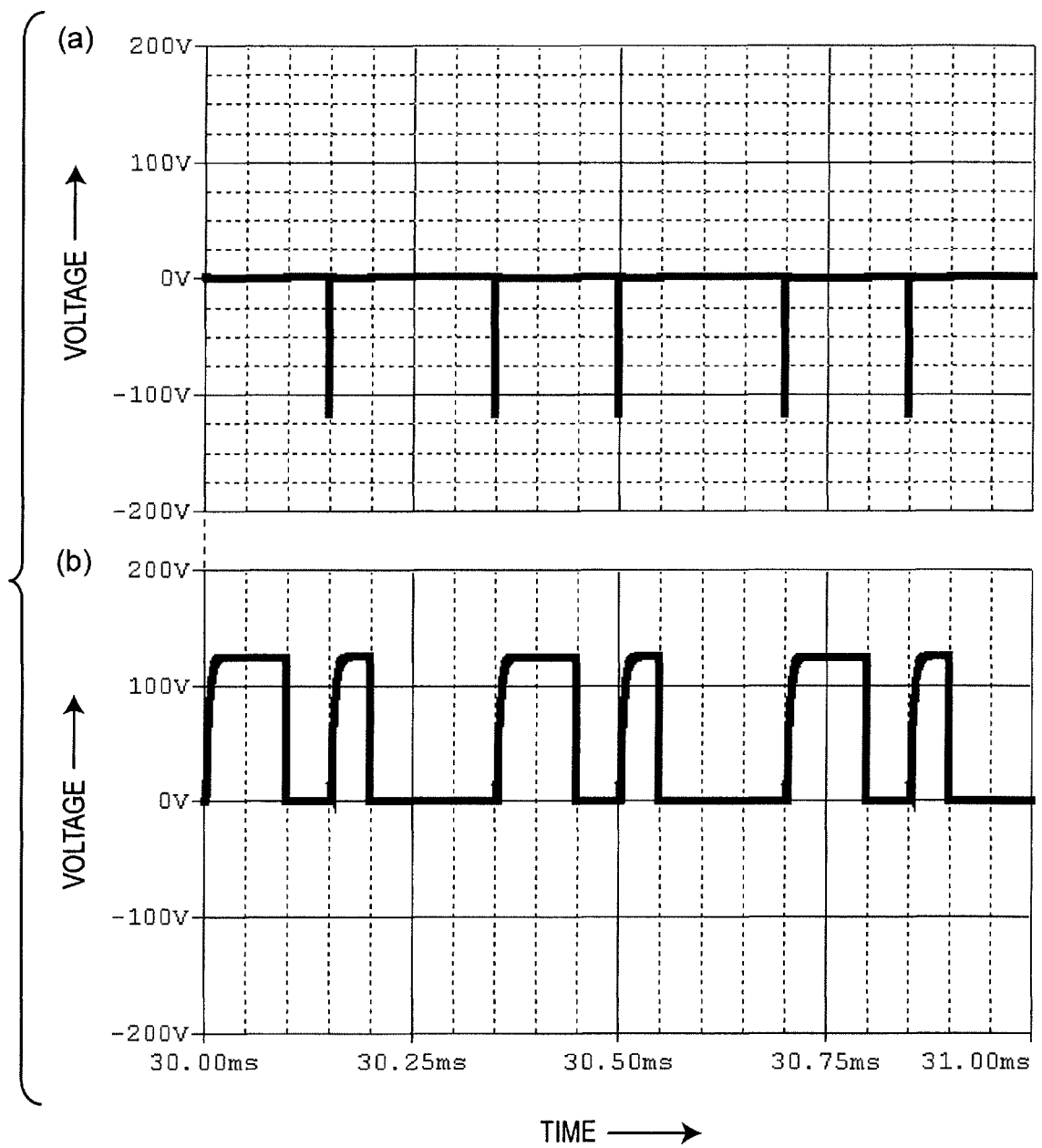
FIG. 70 shows a simulation result of a power transmission system according to a second implementation example of the seventh embodiment, in which: (a) is a graph showing voltage applied to both ends of the diode D101 of the switch circuit; and (b) is a graph showing voltage applied to both ends of the switch element S101 of the switch circuit.
Figure 71:
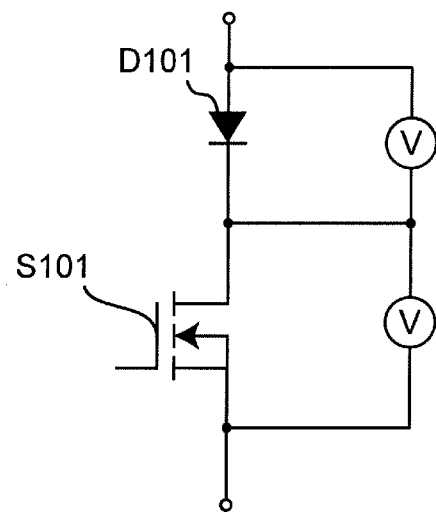
FIG. 71 is a diagram showing how to measure voltages shown in FIGS. 66 to 70.

FIG. 70 shows a simulation result of the power transmission system according to the second implementation example of the seventh embodiment. In FIG. 70, (a) is a graph showing voltage applied to both the ends of the diode D101 of the switch circuit, and (b) is a graph showing voltage applied to both the ends of the switch element S101 of the switch circuit. FIG. 70 shows voltage when the power transmission system is provided with the filter circuits 41 and 44, each provided with a snubber circuit including a resistor of 20Ω and a capacitor of 22 μF connected in series with each other.

A following model was used for the simulation of FIG. 70.

$$i_{peak}(t) = \frac{E}{R_{on}}\left(1 - e^{-\frac{R_{on}}{L}t}\right)$$ [Mathematical Expression 7]

$$i_{out} = \frac{E}{R_{out}}$$ [Mathematical Expression 8]

$$C_s = \frac{L(i_{peak} + i_{out})^2}{(E - V_{cap})^2}$$ [Mathematical Expression 9]

$$i_s(t) = \frac{E}{R_s}e^{-\frac{1}{C_s R_s}t}$$ [Mathematical Expression 10]

$$R_s \leq \frac{1}{C_s f_{sw}\ln 0.9}$$ [Mathematical Expression 11]

Where the following notations are used:
$i_{peak}$: inrush current flowing when code modulator 2 is in simultaneous ON state,
E: input voltage of code modulator 2,
L: inductance of reactor L1,
$R_{on}$: internal resistance of each switch element S1 to S4,
$i_{out}$: output current of code modulator 2,
$R_{out}$: impedance of load 5,
$C_s$: snubber capacitor,
$V_{cap}$: clamp voltage of snubber capacitor,
$i_s$: charge current to snubber capacitor,
$R_s$: snubber resistance, and
$f_{sw}$: switching frequency.

As can be seen from FIG. 70, since the filter circuits 41 and 44 are provided, the voltage applied to both ends of the diode D101 decreased from −2500V to −115V, and the voltage applied to both ends of the switch element S101 decreased from 25000V to 115V. By providing the filter circuits 41 and 44, it is possible to considerably reduce surge voltages generated in the switch elements S1 to S4.

Figure 72:
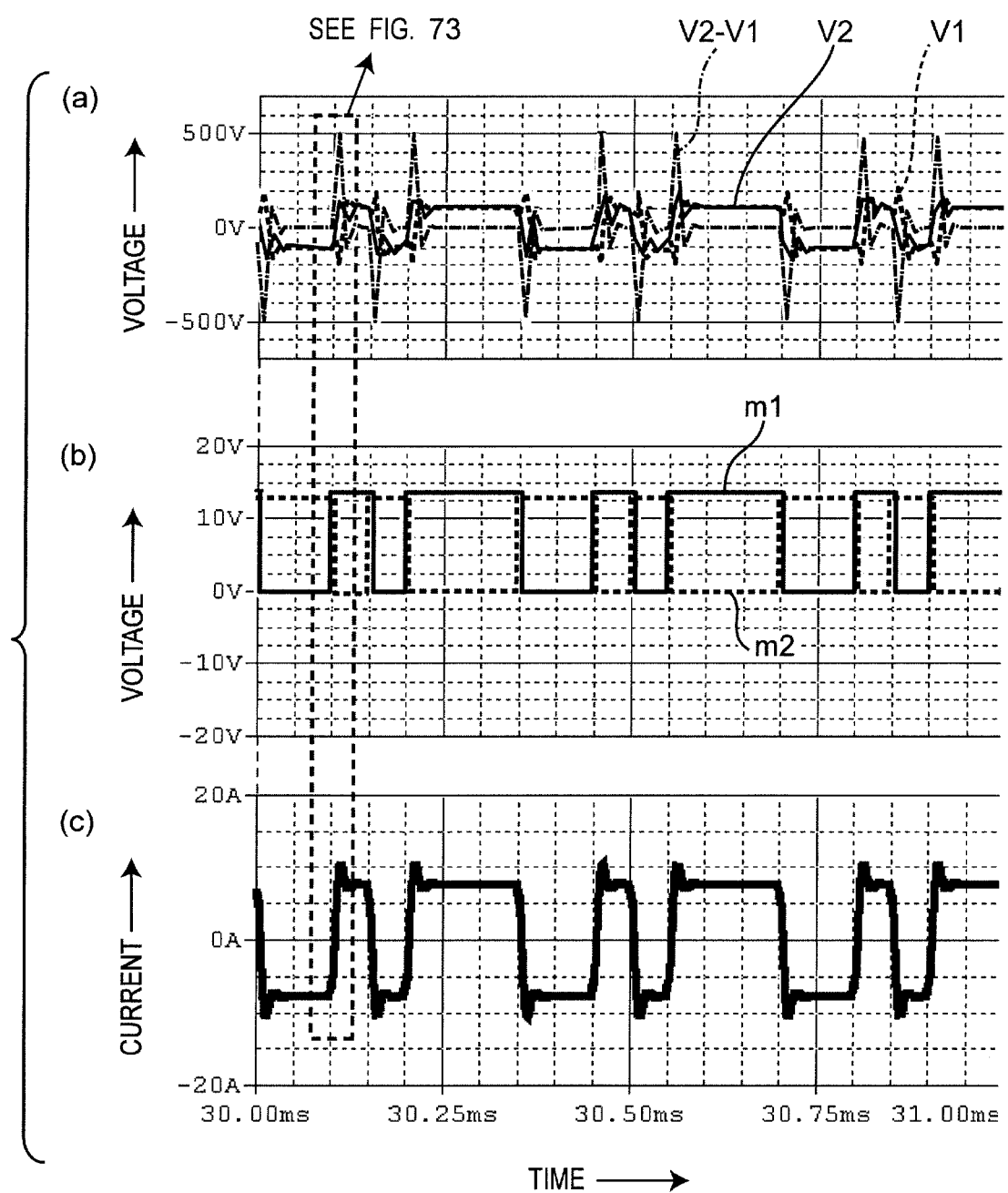
FIG. 72 shows a simulation result of a power transmission system according to a third implementation example of the seventh embodiment, in which: (a) is a graph showing voltage across both ends of the switch elements S1 and S4; (b) is a graph showing gate voltage of the switch elements S1 and S4; and (c) is a graph showing current flowing in the switch elements S1 and S4.
Figure 73:
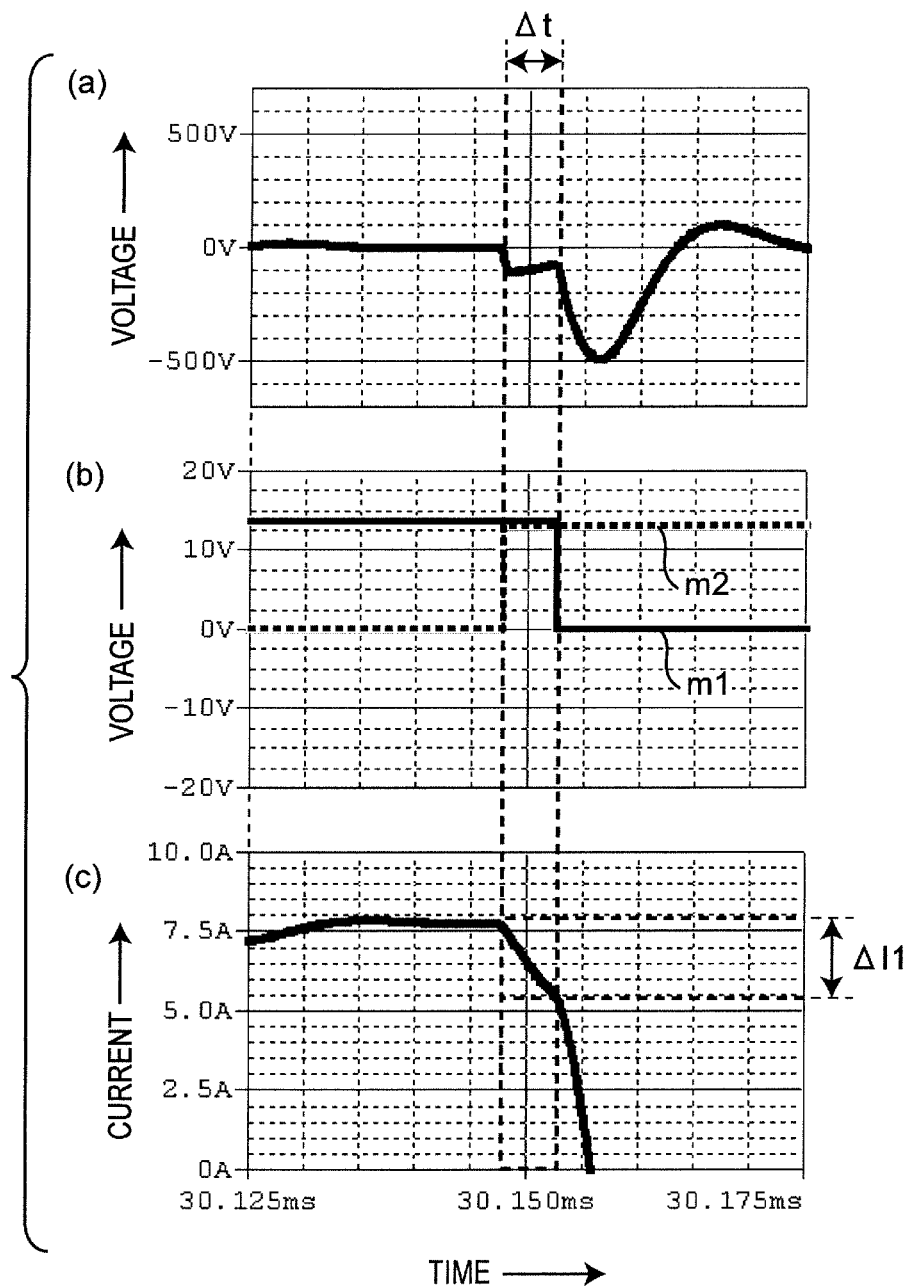
FIG. 73 is a graph showing an enlarged diagram of a part of FIG. 72.

Next, with reference to FIGS. 72 to 73, we describe a simulation result of a power transmission system according to an implementation example of the seventh embodiment.

FIG. 72 shows a simulation result of a power transmission system according to a third implementation example of the seventh embodiment. In FIG. 72, (a) is a graph showing voltage across both ends of the switch elements S1 and S4, (b) is a graph showing gate voltage of the switch elements S1 and S4, and (c) is a graph showing current flowing in the switch elements S1 and S4. FIG. 73 is a graph showing an enlarged diagram of a part of FIG. 72. As shown in FIG. 73, it is possible to measure a change of current outputted from the code modulator 2 to the transmission path 3, ΔI1, for a certain duration Δt. Similarly, it is possible to measure a change of current inputted from the transmission path 3 to the code demodulator 4, ΔI2, for the certain duration Δt.

Thus, it is possible to calculate the wiring inductance of the transmission path 3 based on the waveform of the current, as described above.

Other Embodiments

In the third embodiment, a plurality of code modulators may use the same modulation code, and a plurality of code demodulators may use the same demodulation code. Thus, one code modulator may transmit powers to a plurality of code demodulators, a plurality of code modulators may transmit powers to one code demodulator, and a plurality of code modulators may transmit powers to a plurality of code demodulators.

In the first to eighth embodiments, we have indicated the example in which power is transmitted using code modulation and code demodulation of current, but the power transmission is not limited thereto. Power may be transmitted using code modulation and code demodulation of direct-current or alternating-current voltage. In this case, similar advantageous effects can be achieved.

A power transmitter apparatus, a power receiver apparatus, and a power transmission system according to several aspects of the present disclosure have following configurations.

According to a power transmitter apparatus of a first aspect, a power transmitter apparatus transmits power to at least one power receiver apparatus via a transmission path. The power transmitter apparatus is provided with: a code modulation circuit connected to a power supply via a first reactor and supplied with source power from the power supply, the code modulation circuit modulating the source power to generate a code-modulated wave by code modulation using a modulation code based on a code sequence, and transmitting the code-modulated wave to the power receiver apparatus via the transmission path; and a control circuit that controls the code modulation circuit. The code modulation circuit is provided with: first and second ports connected to the power supply via the first reactor, third and fourth ports connected to the transmission path, a first switch circuit connected between the first and third ports, a second switch circuit connected between the second and third ports, a third switch circuit connected between the first and fourth ports, and a fourth switch circuit connected between the second and fourth ports, The control circuit sets a first state to the code modulation circuit, the first state defined in which the first and fourth switch circuits are turned on, and the second and third switch circuits are turned off. The control circuit sets a second state to the code modulation circuit, the second state defined in which the first and fourth switch circuits are turned off, and the second and third switch circuits are turned on. The control circuit sets a third state to the code modulation circuit during transition from the first state to the second state, and during transition from the second state to the first state, the third state defined in which all the first to fourth switch circuits are turned on.

According to a power receiver apparatus of a second aspect, a power receiver apparatus receives a code-modulated wave from at least one power transmitter apparatus via a transmission path, the code-modulated wave including power modulated by code modulation using a modulation code based on a code sequence. The power receiver apparatus is provided with: a code demodulation circuit connected to a load via a second reactor, the code demodulation circuit demodulating the received code-modulated wave to generate demodulated power by code demodulation using a demodulation code based on a code sequence identical to the code sequence of the modulation code used for the code modulation, and supplying the demodulated power to the load; and a control circuit that controls the code demodulation circuit. The code demodulation circuit is provided with: fifth and sixth ports connected to the transmission path, seventh and eighth ports connected to the load via the second reactor, a fifth switch circuit connected between the sixth and seventh ports, a sixth switch circuit connected between the sixth and eight ports, a seventh switch circuit connected between the fifth and seventh ports, and an eighth switch circuit connected between the fifth and eighth ports. The control circuit sets a fourth state to the code demodulation circuit, the fourth state defined in which the fifth and eighth switch circuits are turned off, the sixth and seventh switch circuits are turned on. The control circuit sets a fifth state to the code demodulation circuit, the fifth state defined in which the fifth and eighth switch circuits are turned on, and the sixth and seventh switch circuits are turned off. The control circuit sets a sixth state to the code demodulation circuit during transition from the fourth state to the fifth state, and during transition from the fifth state to the fourth state, the sixth state defined in which all the fifth to eighth switch circuits are turned on.

According to a power transmission system of a third aspect, a power transmission system includes: at least one power transmitter apparatus of the first aspect; and at least one power receiver apparatus of the second aspect.

According to a power transmission system of a fourth aspect, in the power transmission system of the third aspect, a time length of each of the third and sixth states is set to equal to or longer than a sum of: a maximum of time differences each among operations of the switch circuits of each one of the at least one power transmitting apparatus; a maximum of time differences each between one of the at least one power transmitting apparatus and one of the at least one power receiving apparatus; and a maximum of time differences each among operations of the switch circuits of each one of the at least one power receiving apparatus.

According to a power transmission system of a fifth aspect, in the power transmission system of the third or fourth aspect, a ratio of a time length of the sixth state to a total time length of the fourth and fifth states is set to be smaller than a ratio of an inductance of the second reactor to a sum of inductances of the first and second reactors.

According to a power transmission system of a sixth aspect, A power transmission system includes: at least one power transmitter apparatus of the first aspect; and at least one power receiver apparatus. The power receiver apparatus receives the code-modulated wave from the power transmitter apparatus via the transmission path, demodulates the received code-modulated wave to generate demodulated power by code demodulation using a demodulation code based on a code sequence identical to the code sequence of the modulation code used for the code modulation, and supplies the demodulated power to the load.

According to a power transmission system of a seventh aspect, in the power transmission system of the sixth aspect, the time length of the third state is set to twice or more a maximum of time differences each among operations of the switch circuits of each one of the at least one power receiving apparatus.

According to a power transmission system of an eighth aspect, A power transmission system includes: at least one power transmitter apparatus; and at least one power receiver apparatus as of the second aspect. The power transmitter apparatus modulates power to generate a code-modulated wave by code modulation using a modulation code based on a code sequence, and transmits the code-modulated wave to the power receiver apparatus via the transmission path.

According to a power transmission system of a ninth aspect, in the power transmission system of the eighth aspect, the time length of the sixth state is set to twice or more a maximum of time differences each among operations of the switch circuits of each one of the at least one power transmitting apparatus.

According to a power transmitter apparatus of a 10th aspect, a power transmitter apparatus transmits power to at least one power receiver apparatus via a transmission path. The power transmitter apparatus is provided with: a code modulation circuit connected to a power supply via a first reactor and supplied with source power from the power supply, the code modulation circuit modulating the source power to generate a code-modulated wave by code modulation using a modulation code based on a code sequence, and transmitting the code-modulated wave to the power receiver apparatus via the transmission path; and a control circuit that controls the code modulation circuit. The code modulation circuit is provided with: first and second ports connected to the power supply via the first reactor, third and fourth ports connected to the transmission path, a first switch circuit connected between the first and third ports, a second switch circuit connected between the second and third ports, a third switch circuit connected between the first and fourth ports, and a fourth switch circuit connected between the second and fourth ports, The control circuit sets a first state to the code modulation circuit, the first state defined in which the first and fourth switch circuits are turned on, and the second and third switch circuits are turned off. The control circuit sets a second state to the code modulation circuit, the second state defined in which the first and fourth switch circuits are turned off, and the second and third switch circuits are turned on. The control circuit sets a third state to the code modulation circuit during transition from the first state to the second state, and during transition from the second state to the first state, the third state defined in which all the first to fourth switch circuits are turned on. The power transmitter apparatus is further provided with at least one of: a first filter circuit connected between the first and second ports, a second filter circuit connected between the third and fourth ports, and a third filter circuit connected in parallel to each of the first to fourth switch circuits.

According to a power transmitter apparatus of an 11th aspect, in the power transmitter apparatus of the 10th aspect, the filter circuit is provided with a snubber circuit including a resistor and a capacitor connected in series with each other.

According to a power transmitter apparatus of a 12th aspect, in the power transmitter apparatus of the 11th aspect, the filter circuit is further provided with a diode connected in parallel to the resistor.

According to a power transmitter apparatus of a 13th aspect, in the power transmitter apparatus of the 11th aspect, the filter circuit is further provided with a diode bridge circuit.

According to a power transmitter apparatus of a 14th aspect, in the power transmitter apparatus of the 10th aspect, the filter circuit is provided with a Zener diode.

According to a power transmitter apparatus of a 15th aspect, in the power transmitter apparatus of the 10th aspect, the filter circuit is a low pass filter including an inductor and a capacitor.

According to a power transmitter apparatus of a 16th aspect, in the power transmitter apparatus of the 10th aspect, the filter circuit is a band pass filter including an inductor, a capacitor, and a resistor.

According to a power receiver apparatus of a 17th aspect, a power receiver apparatus receives a code-modulated wave from at least one power transmitter apparatus via a transmission path, the code-modulated wave including power modulated by code modulation using a modulation code based on a code sequence. The power receiver apparatus is provided with: a code demodulation circuit connected to a load via a second reactor, the code demodulation circuit demodulating the received code-modulated wave to generate demodulated power by code demodulation using a demodulation code based on a code sequence identical to the code sequence of the modulation code used for the code modulation, and supplying the demodulated power to the load; and a control circuit that controls the code demodulation circuit. The code demodulation circuit is provided with: fifth and sixth ports connected to the transmission path, seventh and eighth ports connected to the load via the second reactor, a fifth switch circuit connected between the sixth and seventh ports, a sixth switch circuit connected between the sixth and eight ports, a seventh switch circuit connected between the fifth and seventh ports, and an eighth switch circuit connected between the fifth and eighth ports. The control circuit sets a fourth state to the code demodulation circuit, the fourth state defined in which the fifth and eighth switch circuits are turned off, the sixth and seventh switch circuits are turned on. The control circuit sets a fifth state to the code demodulation circuit, the fifth state defined in which the fifth and eighth switch circuits are turned on, and the sixth and seventh switch circuits are turned off. The control circuit sets a sixth state to the code demodulation circuit during transition from the fourth state to the fifth state, and during transition from the fifth state to the fourth state, the sixth state defined in which all the fifth to eighth switch circuits are turned on. The power receiver apparatus is further provided with at least one of: a fourth filter circuit connected between the fifth and sixth ports, a fifth filter circuit connected between the seventh and eighth ports, and a sixth filter circuit connected in parallel to each of the fifth to eighth switch circuits.

According to a power receiver apparatus of an 18th aspect, in the power receiver apparatus of the 17th aspect, the filter circuit is provided with a snubber circuit including a resistor and a capacitor connected in series with each other.

According to a power receiver apparatus of a 19th aspect, in the power receiver apparatus of the 18th aspect, the filter circuit is further provided with a diode connected in parallel to the resistor.

According to a power receiver apparatus of a 20th aspect, in the power receiver apparatus of the 18th aspect, the filter circuit is further provided with a diode bridge circuit.

According to a power receiver apparatus of a 21st aspect, in the power receiver apparatus of the 17th aspect, the filter circuit is provided with a Zener diode.

According to a power receiver apparatus of a 22nd aspect, in the power receiver apparatus of the 17th aspect, the filter circuit is a low pass filter including an inductor and a capacitor.

According to a power receiver apparatus of a 23rd aspect, in the power receiver apparatus of the 17th aspect, the filter circuit is a band pass filter including an inductor, a capacitor, and a resistor.

According to a power transmission system of a 24th aspect, a power transmission system includes: at least one power transmitter apparatus of any one of the 10th to 16th aspects; and at least one power receiver apparatus of any one of the 17th to 23th aspects.

According to a power transmission system of a 25th aspect, A power transmission system including: at least one power transmitter apparatus of the 10th aspect; and at least one power receiver apparatus of the 17th aspect. The filter circuit includes a capacitor. For an integer N, a resonant circuit including the first and second reactors and the capacitor is configured to have a resonance frequency equal to N/2 times a clock frequency of the modulation code and the demodulation code.

INDUSTRIAL APPLICABILITY

A power transmission system according to the present disclosure is suitable for power transmission from a power generator, such as solar power generation, wind power generation, and hydroelectric power generation, to a load, such as a railway and an electric vehicle (EV).

REFERENCE SIGNS LIST

1, 1-1 to 1-2: POWER GENERATOR
1*m*, 1*m*-1, 1*m*-2: POWER METER
2, 2-1, 2-2, 2A, 2A-1 to 2A-2, 2B: CODE MODULATOR
3: TRANSMISSION PATH
4, 4-1, 4-2, 4A, 4A-1 to 4A-2, 4B: CODE DEMODULATOR
5, 5-1 to 5-2: LOAD
5*m*, 5*m*-1 to 5*m*-2: POWER METER
10, 10A to 10B: CONTROLLER
11: CONTROL CIRCUIT
12, 12A, 12B: COMMUNICATION CIRCUIT
20: CONTROL CIRCUIT
21: COMMUNICATION CIRCUIT
22, 22A: CODE GENERATION CIRCUIT
23, 23A: CODE MODULATION CIRCUIT
30: CONTROL CIRCUIT
31: COMMUNICATION CIRCUIT
32, 32A: CODE GENERATION CIRCUIT
33, 33A: CODE DEMODULATION CIRCUIT
41 to 45*d*: FILTER CIRCUIT
51, 54: CURRENT METER
52, 53: VOLTAGE METER
Ca1 to Ca4, C201 to C221: CAPACITOR
Ca5, Cab: VARIABLE CAPACITOR
D1 to D34, D101 to D222: DIODE
L1, L2: REACTOR
R201 to R221: RESISTOR
S1 to S74, S101 to S222: SWITCH ELEMENT
SS1 to SS34, SS21A to SS34A: SWITCH CIRCUIT
T1 to T14: PORT
ZD: ZENER DIODE

The invention claimed is:

1. A power transmitter apparatus for transmitting power to at least one power receiver apparatus via a transmission path, the power transmitter apparatus comprising:
  a code modulation circuit connected to a power supply via a first reactor and supplied with source power from the power supply, the code modulation circuit modulating the source power to generate a code-modulated wave by code modulation using a modulation code based on a code sequence, and transmitting the code-modulated wave to the power receiver apparatus via the transmission path; and
  a control circuit that controls the code modulation circuit, wherein the code modulation circuit comprises:
    first and second ports connected to the power supply via the first reactor, third and fourth ports connected to the transmission path,
a first switch circuit connected between the first and third ports,
a second switch circuit connected between the second and third ports,
a third switch circuit connected between the first and fourth ports, and
a fourth switch circuit connected between the second and fourth ports,
wherein the control circuit sets a first state to the code modulation circuit, the first state defined in which the first and fourth switch circuits are turned on, and the second and third switch circuits are turned off,
wherein the control circuit sets a second state to the code modulation circuit, the second state defined in which the first and fourth switch circuits are turned off, and the second and third switch circuits are turned on,
wherein the control circuit sets a third state to the code modulation circuit during transition from the first state to the second state, and during transition from the second state to the first state, the third state defined in which all the first to fourth switch circuits are turned on, and
wherein the power transmitter apparatus further comprises at least one of: a first filter circuit connected between the first and second ports, a second filter circuit connected between the third and fourth ports, and a third filter circuit connected in parallel to each of the first to fourth switch circuits.

2. The power transmitter apparatus as claimed in claim 1, wherein the filter circuit comprises a snubber circuit including a resistor and a capacitor connected in series with each other.

3. The power transmitter apparatus as claimed in claim 2, wherein the filter circuit further comprises a diode connected in parallel to the resistor.

4. The power transmitter apparatus as claimed in claim 2, wherein the filter circuit further comprises a diode bridge circuit.

5. The power transmitter apparatus as claimed in claim 1, wherein the filter circuit comprises a Zener diode.

6. The power transmitter apparatus as claimed in claim 1, wherein the filter circuit is a low pass filter including an inductor and a capacitor.

7. The power transmitter apparatus as claimed in claim 1, wherein the filter circuit is a band pass filter including an inductor, a capacitor, and a resistor.

8. A power receiver apparatus for receiving a code-modulated wave from at least one power transmitter apparatus via a transmission path, the code-modulated wave including power modulated by code modulation using a modulation code based on a code sequence, the power receiver apparatus comprising:
a code demodulation circuit connected to a load via a second reactor, the code demodulation circuit demodulating the received code-modulated wave to generate demodulated power by code demodulation using a demodulation code based on a code sequence identical to the code sequence of the modulation code used for the code modulation, and supplying the demodulated power to the load; and
a control circuit that controls the code demodulation circuit,
wherein the code demodulation circuit comprises:
fifth and sixth ports connected to the transmission path,
seventh and eighth ports connected to the load via the second reactor,
a fifth switch circuit connected between the sixth and seventh ports,
a sixth switch circuit connected between the sixth and eight ports,
a seventh switch circuit connected between the fifth and seventh ports, and
an eighth switch circuit connected between the fifth and eighth ports,
wherein the control circuit sets a fourth state to the code demodulation circuit, the fourth state defined in which the fifth and eighth switch circuits are turned off, the sixth and seventh switch circuits are turned on,
wherein the control circuit sets a fifth state to the code demodulation circuit, the fifth state defined in which the fifth and eighth switch circuits are turned on, and the sixth and seventh switch circuits are turned off,
wherein the control circuit sets a sixth state to the code demodulation circuit during transition from the fourth state to the fifth state, and during transition from the fifth state to the fourth state, the sixth state defined in which all the fifth to eighth switch circuits are turned on, and
wherein the power receiver apparatus further comprises at least one of: a fourth filter circuit connected between the fifth and sixth ports, a fifth filter circuit connected between the seventh and eighth ports, and a sixth filter circuit connected in parallel to each of the fifth to eighth switch circuits.

9. The power receiver apparatus as claimed in claim 8, wherein the filter circuit comprises a snubber circuit including a resistor and a capacitor connected in series with each other.

10. The power receiver apparatus as claimed in claim 9, wherein the filter circuit further comprises a diode connected in parallel to the resistor.

11. The power receiver apparatus as claimed in claim 9, wherein the filter circuit further comprises a diode bridge circuit.

12. The power receiver apparatus as claimed in claim 8, wherein the filter circuit comprises a Zener diode.

13. The power receiver apparatus as claimed in claim 8, wherein the filter circuit is a low pass filter including an inductor and a capacitor.

14. The power receiver apparatus as claimed in claim 8, wherein the filter circuit is a band pass filter including an inductor, a capacitor, and a resistor.

15. A power transmission system including: at least one power transmitter apparatus and at least one power receiver apparatus, the at least one power transmitter apparatus transmitting power to the at least one power receiver apparatus via a transmission path,
wherein the power transmitter apparatus comprises:
a code modulation circuit connected to a power supply via a first reactor and supplied with source power from the power supply, the code modulation circuit modulating the source power to generate a code-modulated wave by code modulation using a modulation code based on a code sequence, and transmitting the code-modulated wave to the power receiver apparatus via the transmission path; and
a first control circuit that controls the code modulation circuit,
wherein the code modulation circuit comprises:
first and second ports connected to the power supply via the first reactor,
third and fourth ports connected to the transmission path, a first switch circuit connected between the first and third ports,
a second switch circuit connected between the second and third ports,
a third switch circuit connected between the first and fourth ports, and
a fourth switch circuit connected between the second and fourth ports,
wherein the first control circuit sets a first state to the code modulation circuit, the first state defined in which the first and fourth switch circuits are turned on, and the second and third switch circuits are turned off,
wherein the first control circuit sets a second state to the code modulation circuit, the second state defined in which the first and fourth switch circuits are turned off, and the second and third switch circuits are turned on,
wherein the first control circuit sets a third state to the code modulation circuit during transition from the first state to the second state, and during transition from the second state to the first state, the third state defined in which all the first to fourth switch circuits are turned on,
wherein the power transmitter apparatus further comprises at least one of: a first filter circuit connected between the first and second ports, a second filter circuit connected between the third and fourth ports, and a third filter circuit connected in parallel to each of the first to fourth switch circuits,
wherein the power receiver apparatus comprises:
a code demodulation circuit connected to a load via a second reactor, the code demodulation circuit demodulating the received code-modulated wave to generate demodulated power by code demodulation using a demodulation code based on a code sequence identical to the code sequence of the modulation code used for the code modulation, and supplying the demodulated power to the load; and
a second control circuit that controls the code demodulation circuit,
wherein the code demodulation circuit comprises:
fifth and sixth ports connected to the transmission path,
seventh and eighth ports connected to the load via the second reactor,
a fifth switch circuit connected between the sixth and seventh ports,
a sixth switch circuit connected between the sixth and eight ports,
a seventh switch circuit connected between the fifth and seventh ports, and
an eighth switch circuit connected between the fifth and eighth ports,
wherein the second control circuit sets a fourth state to the code demodulation circuit, the fourth state defined in which the fifth and eighth switch circuits are turned off, the sixth and seventh switch circuits are turned on,
wherein the second control circuit sets a fifth state to the code demodulation circuit, the fifth state defined in which the fifth and eighth switch circuits are turned on, and the sixth and seventh switch circuits are turned off,
wherein the second control circuit sets a sixth state to the code demodulation circuit during transition from the fourth state to the fifth state, and during transition from the fifth state to the fourth state, the sixth state defined in which all the fifth to eighth switch circuits are turned on, and
wherein the power receiver apparatus further comprises at least one of: a fourth filter circuit connected between the fifth and sixth ports, a fifth filter circuit connected between the seventh and eighth ports, and a sixth filter circuit connected in parallel to each of the fifth to eighth switch circuits.

16. A power transmission system as claimed in claim 15,
wherein the filter circuit includes a capacitor, and
wherein, for an integer N, a resonant circuit including the first and second reactors and the capacitor is configured to have a resonance frequency equal to N/2 times a clock frequency of the modulation code and the demodulation code.

* * * * *